United States Patent
Ren et al.

(10) Patent No.: US 9,535,201 B2
(45) Date of Patent: Jan. 3, 2017

(54) RETARDATION FILM, ELONGATED CIRCULARLY POLARIZING PLATE AND ORGANIC EL DISPLAY PRODUCED USING SAID RETARDATION FILM

(71) Applicant: Konica Minolta, Inc., Tokyo (JP)

(72) Inventors: Rieko Ren, Kobe (JP); Yukihito Nakazawa, Hino (JP); Norie Tanihara, Kobe (JP); Kenji Mishima, Tokyo (JP); Midori Kogure, Kobe (JP); Kouji Tashiro, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/430,426

(22) PCT Filed: Aug. 27, 2013

(86) PCT No.: PCT/JP2013/005035
§ 371 (c)(1),
(2) Date: Mar. 23, 2015

(87) PCT Pub. No.: WO2014/049954
PCT Pub. Date: Apr. 3, 2014

(65) Prior Publication Data
US 2015/0253480 A1 Sep. 10, 2015

(30) Foreign Application Priority Data

Sep. 26, 2012 (JP) .................. 2012-212795

(51) Int. Cl.
*G02B 5/30* (2006.01)
*C08L 1/10* (2006.01)

(52) U.S. Cl.
CPC ............... *G02B 5/3083* (2013.01); *C08L 1/10* (2013.01)

(58) Field of Classification Search
CPC ................................ G02B 5/3083; C08L 1/10
(Continued)

(56) References Cited

U.S. PATENT DOCUMENTS

2006/0141243 A1* 6/2006 Ibuki .................. B32B 7/02
428/334
2006/0222786 A1* 10/2006 Oya .................... C08B 3/16
428/1.31
(Continued)

FOREIGN PATENT DOCUMENTS

JP         8-321381 A    12/1996
JP      2007052079 A     3/2007
(Continued)

OTHER PUBLICATIONS

Machine Translation of JP 2012-068,438 A which was downloaded (retrieved) from https://www4.j-platpat.inpit.go.jp/cgi-bin/tran_web_cgi_ejje?u=http://www4.j-platpat.inpit.go.jp/eng/translation/201604150218587381609299711008735A5CA582FDCD61558D3A57326522F737D on Apr. 14, 2016.*

(Continued)

*Primary Examiner* — Frank Font
(74) *Attorney, Agent, or Firm* — Lucas & Mercanti, LLP

(57) ABSTRACT

The retardation film has a slow axis with an angle of 10 to 80° with respect to a longitudinal direction thereof and contains cellulose acylate having a degree of acyl substitution of 2.0 to 2.7 and a regulating agent. The retardation film has an in-plane retardation, measured at a wavelength of 550 nm, Ro550, of 115 to 260 nm. The retardation film has a ΔRo is 3 to 30 nm, where ΔRo is Ro550−Ro450, where Ro450 is the in-plane retardation of the film measured at a wavelength of 450 nm. The retardation film without the regulating agent has an in plane retardation, measured at a wavelength of 550 nm, Rc550, and ΔRc(Rc550−Rc450) equal to or greater than (Continued)

0, where Rc450 is the in-plane retardation measured a wavelength of 450 nm.

11 Claims, 5 Drawing Sheets

(58) Field of Classification Search
USPC .................................................. 359/489.07
See application file for complete search history.

(56) References Cited

U.S. PATENT DOCUMENTS

| | | | |
|---|---|---|---|
| 2007/0258032 A1* | 11/2007 | Kaihoko | G02F 1/133514 349/141 |
| 2008/0158488 A1* | 7/2008 | Yanai | G02F 1/133371 349/107 |
| 2009/0159857 A1 | 6/2009 | Uehira et al. | |
| 2009/0322997 A1* | 12/2009 | Kaihoko | C09K 19/0275 349/117 |
| 2010/0026940 A1* | 2/2010 | Takegami | B29C 55/00 349/102 |
| 2010/0245725 A1* | 9/2010 | Kaihoko | G02B 5/3083 349/96 |
| 2010/0245744 A1 | 9/2010 | Yoshida et al. | |
| 2011/0052837 A1* | 3/2011 | Hashimoto | B29C 47/0021 428/1.3 |
| 2011/0234952 A1* | 9/2011 | Shi | B29C 47/0021 349/117 |
| 2013/0044267 A1* | 2/2013 | Ishiguro | G02B 27/26 349/15 |

FOREIGN PATENT DOCUMENTS

| | | |
|---|---|---|
| JP | 2008107767 A | 5/2008 |
| JP | 2010020925 A | 1/2010 |
| JP | 2010031223 A | 2/2010 |
| JP | 2010254949 A | 11/2010 |
| JP | 2012037899 A | 2/2012 |
| JP | 20120268438 A | 4/2012 |
| JP | 2012088408 A | 5/2012 |
| JP | 2012098646 A | 5/2012 |

OTHER PUBLICATIONS

International Search Report dated Nov. 5, 2013 for PCT/JP2013/005035.

* cited by examiner

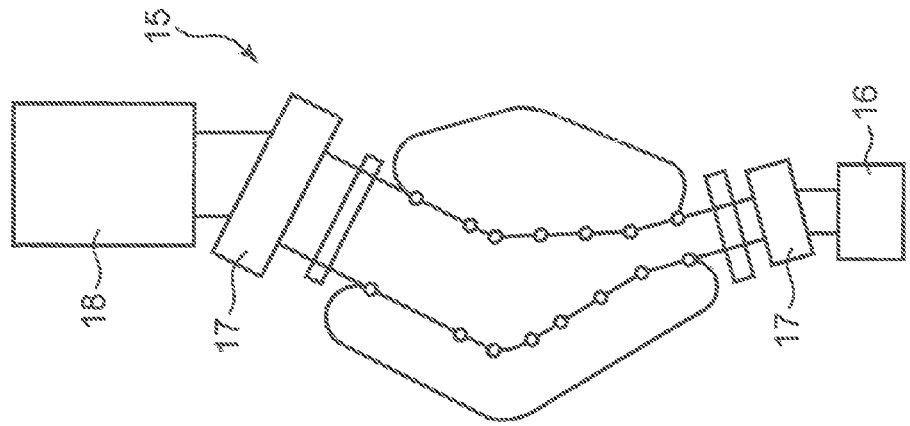
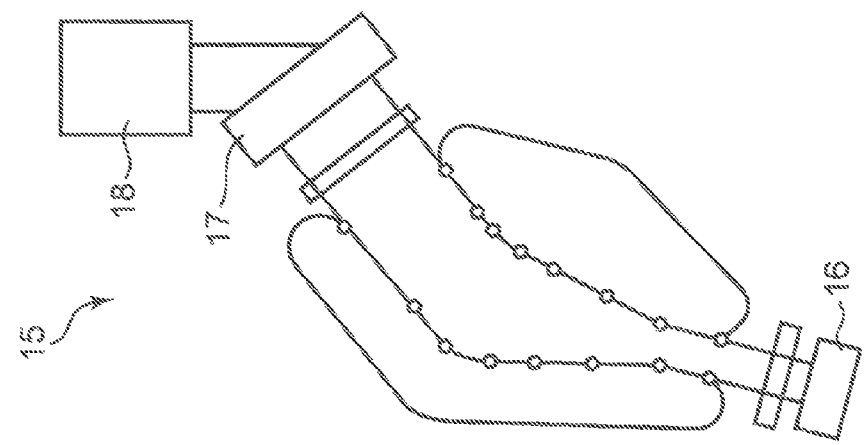
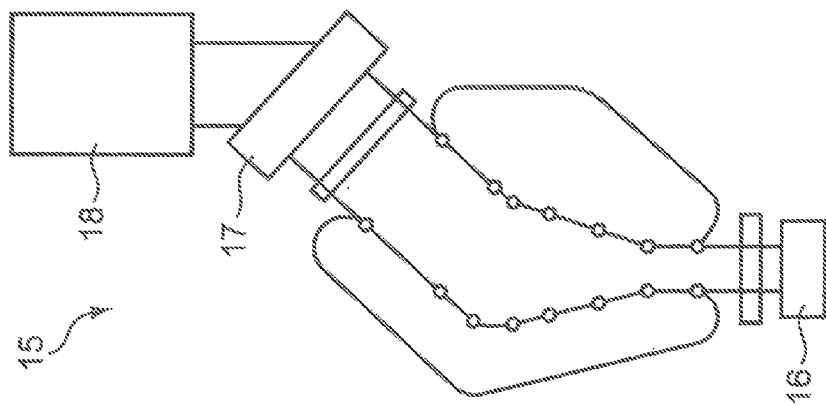

FIG. 4A
FIG. 4B
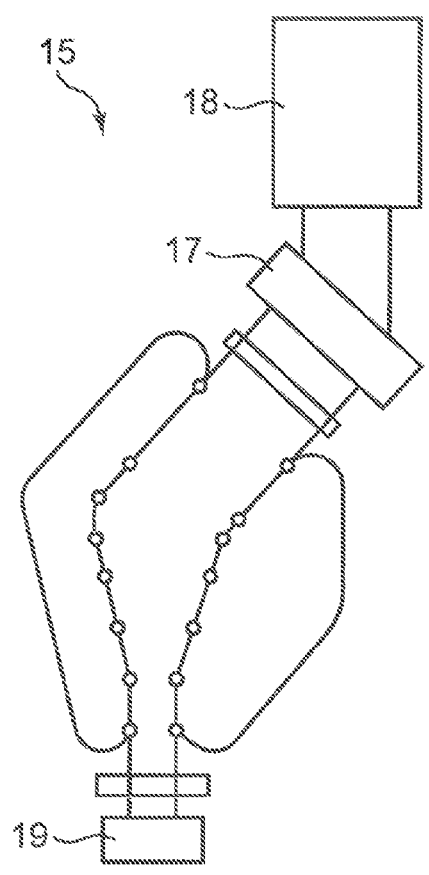
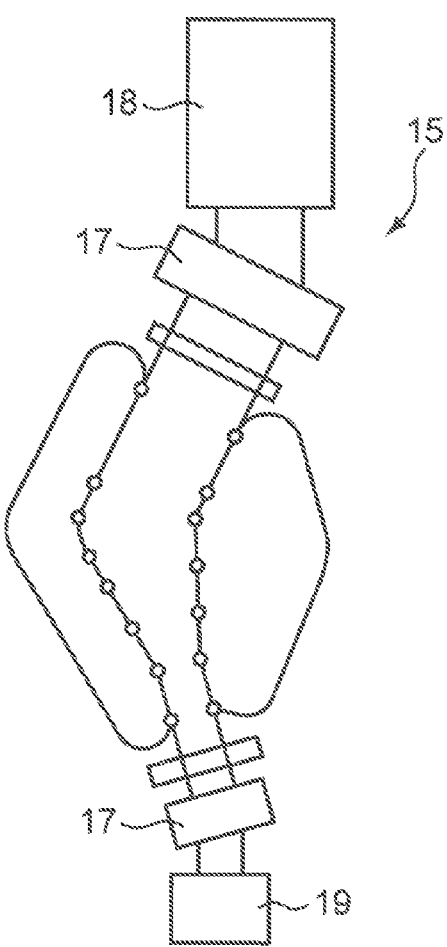

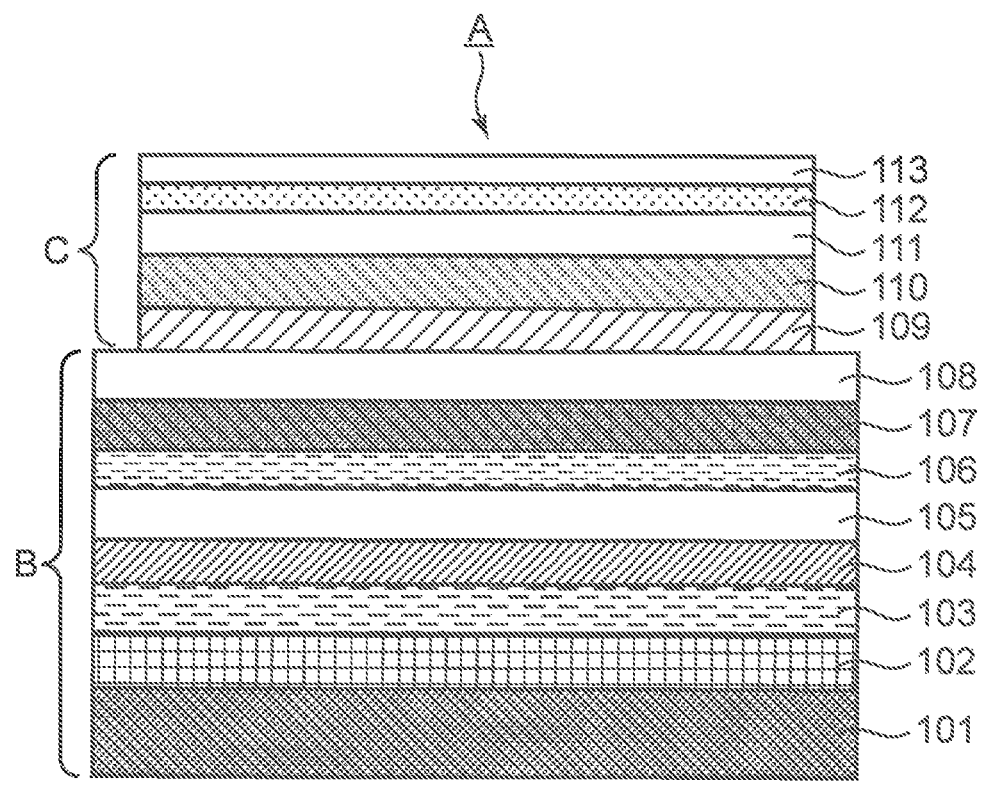

RETARDATION FILM, ELONGATED CIRCULARLY POLARIZING PLATE AND ORGANIC EL DISPLAY PRODUCED USING SAID RETARDATION FILM

CROSS REFERENCE TO RELATED APPLICATION

This Application is a 371 of PCT/JP2013/005035 filed on Aug. 27, 2012, which claimed the priority of Japanese Patent Application No. 2012-212795 filed on Sep. 26, 2012, both applications are incorporated herein by reference in their entirety.

TECHNICAL FIELD

The present invention relates to a retardation film, an elongated circularly polarizing film and an organic EL display produced using the retardation film.

BACKGROUND ART

Recent years, an organic electroluminescence element (hereinafter referred to simply and occasionally as "organic EL element") in which a voltage is applied to a luminescent layer provided between electrodes to cause the luminescent layer to emit light has been actively researched and developed. Because of having excellent properties: luminous efficacy, low-voltage drivability, lightweight and low cost, the organic EL element is utilized as a planar type illumination, a light source for an optic fiber, a backlight for a liquid crystal display, a backlight for a liquid crystal projector, and various other light sources for a display device and others, and great interest has been shown therein.

In the organic EL element, electrons and holes are injected, respectively, from a negative electrode and a positive electrode, and recombined together in the luminescent layer to thereby cause the luminescent layer to emit visible light corresponding to luminescence properties thereof.

The positive electrode is made of a transparent electrical conductive material. Among various transparent electrical conductive materials, indium tin oxide (ITO) is primarily used, in view highest electrical conductivity and relatively large work function, thereby being capable of obtaining high hole-injection efficiency.

On the other hand, the negative electrode is generally made of a metal material. Among various metal electrodes, metal materials such as Mg, Mg/Ag, Mg/In, Al and Li/Al are primarily used, in view of electron-injection efficiency and from the point of work function. Such a metal material has high light reflectance, and therefore takes on a function of reflecting light emitted from the luminescent layer to increase an outgoing light amount (light-emission brightness), in addition to its function as an electrode (negative electrode). That is, light emitted toward the negative electrode is specularly reflected by a surface of the metal material of the negative electrode, and extracted as outgoing light from the transparent ITO electrode (positive electrode).

However, in the organic EL element having such a structure, due to the negative electrode having a mirror surface with strong light reflectivity, outside-light reflection undesirably becomes prominent in a non-luminous state. That is, there is a problem that reflected glare of indoor lighting is so terrific during observation, and it becomes difficult to achieve color expression of black under bright conditions, i.e., contrast under bright conditions is extremely poor for use as a light source for a display device.

As measures for improving this problem, there has been disclosed a technique using a circularly polarizing element as a means to prevent the outside-light reflection by the mirror surface (see, for example, the following Patent Literature 1). In a circularly polarizing element disclosed in the Patent Literature 1, an absorption-type linear polarizer and a retardation film having an in-plane retardation of substantially a quarter-wavelength are laminated in such a manner that optical axes thereof intersect at 45° or 135°.

Assume here that the retardation film having an in-plane retardation of substantially a quarter-wavelength is formed, for example, using one sheet of stretched film. In this case, due to wavelength dispersion in which a refractive index of a resulting stretched film varies with respect to each wavelength, the retardation can become approximately just a quarter-wavelength with respect to a certain wavelength, but it can deviate from a quarter-wavelength with respect to another wavelength. As a result, depending on wavelength, the above retardation film is likely to fail to function as a retardation film having an in-plane retardation of a quarter-wavelength. That is, there is a problem that, when the retardation film is configured to function as a retardation film having an in-plane retardation of a quarter-wavelength with respect to green light of 550 nm wavelength, it becomes difficult to completely prevent reflection of red light having a longer wavelength and blue light having a shorter wavelength, as compared to the green light, and, in particular, a deviation of retardation with respect to blue light is large, resulting in bluish reflected hue.

In this situation, for preventing reflection for all wavelengths of visible light, it is necessary to have a reverse wavelength dispersion property (in which a retardation value becomes larger as the wavelength becomes longer) capable of exhibiting a quarter-wavelength retardation value in the entire wavelength range. As a film capable of exhibiting such a reverse wavelength dispersion property, there have been known films described in the following Patent Literatures 2 to 4.

The Patent Literatures 2 discloses a retardation plate, wherein a specific resin is used to form a single layer having a reverse wavelength dispersion property capable of exhibiting a $\lambda/4$ retardation value in the entire wavelength range. The Patent Literatures 2 also discloses that a retardation film obtained by providing a perpendicularly-oriented liquid crystal layer on an obliquely-stretched cellulose acylate film has a quarter-wavelength retardation in a wide wavelength range, and an organic EL display device provided with the retardation film is improved in terms of hue fluctuation due to outside-light reflection. However, an elongated circularly polarizing plate produced by using the retardation film described in the Parent Literature 2 has a problem that, due to degradation of outside-light reflection preventive property, a hue thereof in a non-luminous state is shifted from black. The retardation film described in the Patent Literature 2 is configured to use a component other than the cellulose acylate to develop the retardation and the reverse wavelength dispersion property, which causes a problem of a large variation in the reverse wavelength dispersion property due to stress.

The Patent Literature 3 discloses a retardation film, wherein a cellulose acylate resin containing cellulose ether is used to form a single layer having a reverse wavelength dispersion property. However, the retardation film described in the Parent Literature 3 has a problem that a wavelength dispersion property varies according to changes in humidity environment. This results in a problem that a hue of an obtained circularly polarizing plate undesirably varies.

Moreover, the retardation film described in the Patent Literature 3 is configured to use the cellulose acylate resin to develop the reverse wavelength dispersion property, which causes a problem that the hue is more likely to fluctuate in an environment where humidity fluctuates.

The Parent Literature 4 discloses a retardation film, wherein a cellulose acetate resin containing a compound with a specific structure is used to form a single layer having a reverse wavelength dispersion property. However, an elongated circularly polarizing plate produced by using the retardation film described in the Parent Literature 4 has a problem that both the hue variation and the hue fluctuation along with humidity environments occur. Moreover, the retardation film described in the Patent Literature 4 is insufficient in terms of retardation developability, and therefore a film thickness thereof needs to be increased to achieve a quarter-retardation, which caused a problem of an increase in cost and difficulty in thickness reduction of an image display device.

CITATION LIST

Patent Literature

Patent Literature 1: JP 8-321381A
Patent Literature 2: JP 2012-37899A
Patent Literature 3: JP 2007-52079A
Patent Literature 4: JP 2010-254949A

SUMMARY OF INVENTION

The present invention has been made in view of the above conventional problems, and an object thereof is to provide a retardation film which has high retardation developability and excellent reverse wavelength dispersion property even with a reduced film thickness, and can exhibit an in-plane retardation of substantially a quarter-wavelength in a wide band while reducing fluctuation of the reverse wavelength dispersion property, an elongated circularly polarizing film and an organic EL display produced using the retardation film.

As a result of diligent studies, with a focus on a phenomenon that, with respect to a retardation developability or a reverse wavelength dispersion property, when a contribution of cellulose acylate is excessively large, hue fluctuation along with humidity environments becomes large, whereas when a contribution of a component other than the cellulose acylate is excessively large, the reverse wavelength dispersion property varies due to stress applied during production of an elongated circularly polarizing plate, the inventors found that hue variation between elongated circularly polarizing plates and hue fluctuation along with humidity environments can be improved by allowing both cellulose acylate and a component other than the cellulose acylate to contribute to the retardation developability and the reverse wavelength dispersion property.

According to one aspect of the present invention, there is provided a retardation film which has a slow axis with an angle of 10 to 80° with respect to a longitudinal direction thereof, wherein the retardation film contains cellulose acylate having a degree of acyl substitution of 2.0 to 2.7, and wherein: $Ro_{550}$ is 115 to 160 nm; a wavelength dispersion property $\Delta Ro$ defined by the following formula (1) is 3 to 30 nm, $$\Delta Ro = Ro_{550} - Ro_{450} \tag{1};$$

all of a wavelength dispersion property $\Delta Rc$ originating from the cellulose acylate and defined by the following formula (2), a wavelength dispersion property $\Delta Ra$ originating from the component other than the cellulose acylate and defined by the following formula (3), an in-plane retardation Rc at a wavelength of 550 nm, and an in-plane retardation Ra at a wavelength of 550 nm, are equal to or greater than 0, $$\Delta Rc = Rc_{550} - Rc_{450} \tag{2}$$

$$\Delta Ra = Ra_{550} - Ra_{550} \tag{3; and}$$

a retardation share ratio of $Ra_{550}$ to $Ro_{550}$ ($Ra_{550}/Ro_{550} \times 100$) is 10 to 80, and a wavelength-dispersion share ratio of $\Delta Ra$ to $\Delta Ro$ ($\Delta Ra/\Delta Ro \times 100$) is 0 to 80; wherein $Ro_X$, $Rc_X$ and $Ra_X$ represent, respectively, an in-plane retardation, an in-plane retardation originating from the cellulose acylate and an in-plane retardation originating from a component of the retardation film other than the cellulose acylate, at a wavelength of X nm.

These and other objects, features, and advantages of the present invention will become apparent from the detailed description and the accompanying drawings.

BRIEF DESCRIPTION OF DRAWINGS

FIGS. 3A to 3C are schematic diagrams illustrating a production process for one embodiment of the present invention.

FIGS. 4A and 4B are schematic diagrams illustrating a production process for one embodiment of the present invention.

FIG. 5 is a schematic explanatory of a configuration of an organic EL display according to one embodiment of the present invention.

DESCRIPTION OF EMBODIMENTS

Figure 1:
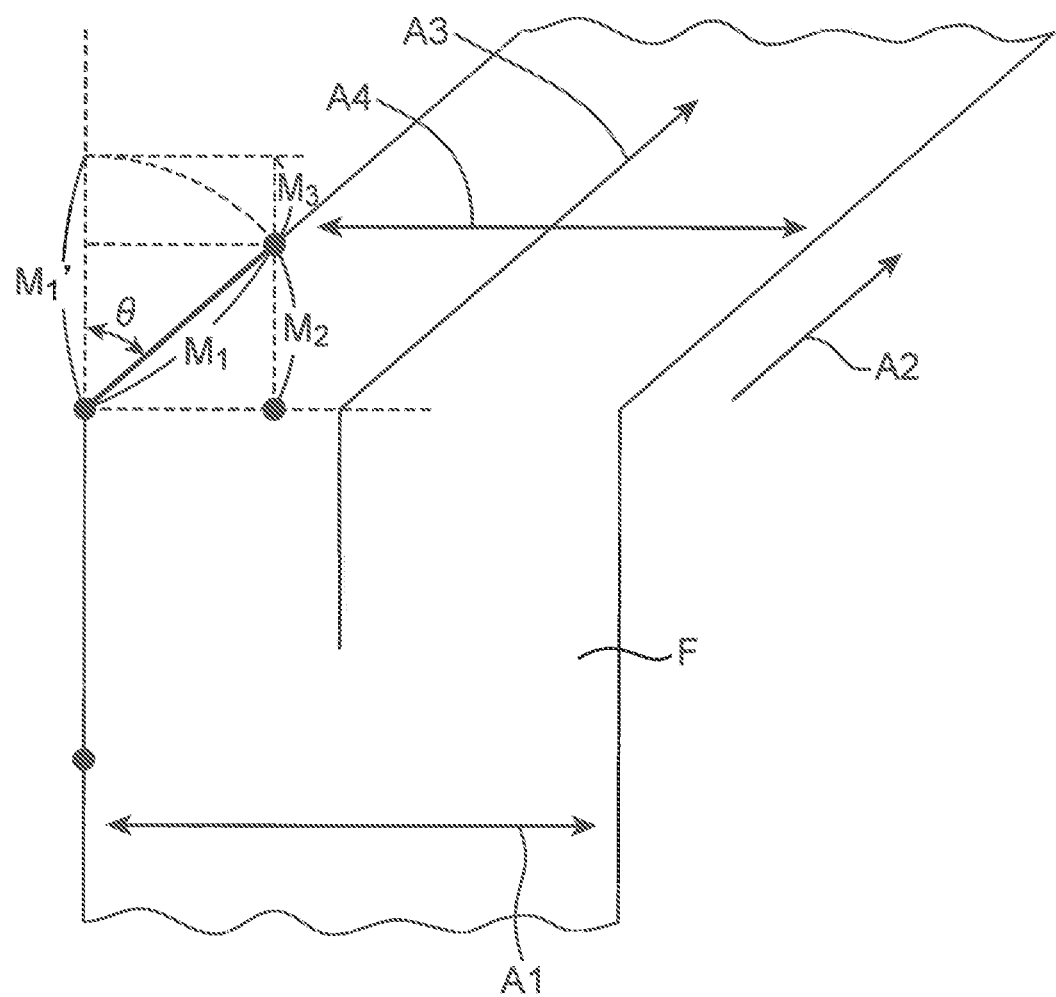
FIG. 1 is a schematic diagram illustrating a contraction ratio in oblique stretching.

An embodiment of the present invention will now be described in detail. However, the present invention is not limited thereto.

<Retardation Film>

A retardation film according to this embodiment (this retardation film will hereinafter be referred to simply and occasionally as "cellulose acylate film") comprises a resin component (a thermoplastic resin such as cellulose acylate) and an additive component (a component other than cellulose acylate, such as an optical performance regulating agent), and has a slow axis with an angle of 10 to 80° with respect to a longitudinal direction thereof. As a technique for setting the angle of the slow axis with respect to the longitudinal direction to 10 to 80°, it is conceivable to employ a method of subjecting an unstretched film to aftermentioned oblique stretching. As used in this specification, the term "retardation film" means an optical film having an optical function of imparting a desired retardation to transmitted light, wherein examples of the optical function include a function of converting linearly polarized light having a certain specific wavelength to elliptically polarized light or circularly polarized light, a function of converting elliptically polarized light or circularly polarized light to linearly polarized light, etc. Particularly, the term "λ/4 retardation film" means a film in which an in-plane retardation of the film becomes about ¼ of a wavelength of given light (generally, in a visible light region).

With a view to obtaining almost-perfect circularly polarized light in a wavelength range of visible light, the retardation film is preferably a wide-band λ/4 retardation film having a retardation of approximately a quarter-wavelength in the wavelength range of visible light. Further, as used in this specification, the term "a retardation of approximately ¼ of each wavelength in the wavelength range of visible light" means a retardation of approximately a quarter-wavelength, with respect to light in the entire wavelength range of 400 to 700 nm.

An in-plane retardation $Ro_X$ and a thickness-wise retardation $Rt_X$ of the retardation film according to this embodiment are expressed by the following formula 1 (i). In this regard, a value of the retardation may be calculated, for example, by measuring a birefringence at each wavelength in an environment of 23° C. and 55% RH, using Axoscan produced by Axometrics Inc.

$$Ro_X = (nx_X - ny_X) \times d$$

$$Rt_X = [(nx_X + ny_X)/2 - nz_X] \times d \quad \text{Formula (i)}$$

(where: X represents a measurement wavelength (nm); nx, ny and nz are, respectively, a maximum in-plane refractive index (refractive index in a direction of a slow axis) of the retardation film, an in-plane refractive index in a direction perpendicular to the slow axis of the retardation film, and a refractive index in a thickness direction perpendicular to an in-plane direction of the retardation film, each measured in an environment of 23° C. and 55% RH; and d represents a thickness (nm) of the retardation film.)

Here, assuming that an in-plane retardation of the retardation film at a wavelength of X nm is indicated by $Ro_X$, wherein an in-plane retardation originating from cellulose acylate is indicated by $Rc_X$, and an in-plane retardation originating from a remaining component other than the cellulose acylate is indicated by $Ra_X$ ($Ro_X = Rc_X + Ra_X$), the retardation film according to this embodiment is characterized in that $Ro_{550}$ is 115 to 160 nm, and a wavelength dispersion property $\Delta Ro$ defined by the following formula (1) is 3 to 30 nm, $$\Delta Ro = Ro_{550} - Ro_{450} \quad (1)$$

$Ro_{550}$ may be set to 115 to 160 nm, preferably, 120 to 160 nm, more preferably, 130 to 150 nm. If $Ro_{550}$ is beyond the range of 115 to 160 nm, a resulting retardation at a wavelength of 550 nm does not become approximate a quarter-wavelength. Thus, when an elongated circularly polarizing plate is produced using such a retardation film and applied, for example, to an organic EL display, it tend to have a situation where reflected glare of indoor lighting is so terrific, and it becomes difficult to achieve color expression of black under bright conditions.

The wavelength dispersion property $\Delta Ro$ may be set to 3 to 30 nm, preferably, 8 to 30 nm, more preferably, 15 to 30 nm. If $\Delta Ro$ is beyond the range of 3 to 30 nm, a resulting retardation does not exhibit an adequate reverse wavelength dispersion property. Thus, for example, when an elongated circularly polarizing plate is produced, hue variation and hue fluctuation along with humidity environments tend to occur.

Further, a ratio of $Ro_{450}$ to $Ro_{550}$ ($Ro_{450}/Ro_{550}$) is preferably in the range of 0.72 to 1.00, more preferably, in the range of 0.78 to 0.92, particularly preferably, in the range of 0.80 to 0.88.

On the other hand, a thickness-wise retardation $Rt_{550}$ measured at a wavelength of 550 nm is preferably in the range of 60 to 200 nm, more preferably, in the range of 70 to 150 nm, particularly preferably, in the range of 70 to 100 nm. If $Rt_{550}$ is beyond the range of 60 to 200 nm, a hue when viewing a large-sized screen from an oblique angle tends to deteriorate.

The retardation film according to this embodiment is also characterized in that all of a wavelength dispersion property $\Delta Rc$ originating from the cellulose acylate and defined by the following formula (2), a wavelength dispersion property $\Delta Ra$ ($\Delta Ro = \Delta Rc + \Delta Ra$) originating from the component other than the cellulose acylate and defined by the following formula (3), an in-plane retardation Rc at a wavelength of 550 nm, and an in-plane retardation Ra at a wavelength of 550 nm, are equal to or greater than 0, $$\Delta Rc = Rc_{550} - Rc_{450} \quad (2)$$

$$\Delta Ra = Ra_{550} - Ra_{450} \quad (3)$$

The retardation film according to this embodiment is configured such that both of the wavelength dispersion property $\Delta Rc$ to be developed based on cellulose acylate as a component thereof and the wavelength dispersion property $\Delta Ra$ to be developed based on a component thereof other than the cellulose acylate, as shown in the respective formulas (2) and (3), are equal to or greater than 0, so that it exhibits a reverse wavelength dispersion property. That is, the wavelength dispersion property $\Delta Ro$ of the retardation film according to this embodiment is not based on contribution of either one of cellulose acylate as a component thereof and a component thereof other than the cellulose acylate, but based on contribution of both of them. Both of the wavelength dispersion property $\Delta Rc$ and the wavelength dispersion property $\Delta Ra$ may be set to be equal to or greater than 0, preferably, 2 to 50 nm, more preferably, 4 to 30 nm.

In the case where the retardation film exhibits a reverse wavelength dispersion property based on contribution of both the cellulose acylate and the component other than the cellulose acylate, respective shares (contribution ratios) of the two components are indicated, respectively, by a retardation share ratio of $Ra_{550}$ to $Ro_{550}$ ($Ra_{550}/Ro_{550} \times 100$), and a wavelength-dispersion share ratio of $\Delta Ra$ to $\Delta Ro$ ($\Delta Ra/\Delta Ro \times 100$).

In the retardation film according to this embodiment, the retardation share ratio of $Ra_{550}$ to $Ro_{550}$ ($Ra_{550}/Ro_{550} \times 100$) is 10 to 80, preferably, 15 to 70, more preferably, 20 to 60. If the retardation share ratio of $Ra_{550}$ to $Ro_{550}$ is beyond the range of 10 to 80, a black display property of a display device tends to deteriorate due to variation in wavelength dispersion property caused by stress during production of an elongated circularly polarizing plate. Particularly, if it is less than 10, a hue of the display device tends to fluctuate due to fluctuation in wavelength dispersibility in terms of retardation due to humidity. On the other hand, the wavelength-dispersion share ratio of $\Delta Ra$ to $\Delta Ro$ ($\Delta Ra/\Delta Ro \times 100$) is 0 to 80, preferably, 10 to 75, more preferably, 20 to 75. If the wavelength-dispersion share ratio of $\Delta Ra$ to $\Delta Ro$ is beyond the range of 0 to 80, a black display property of a display device tends to deteriorate due to variation in wavelength dispersion property caused by stress during production of an elongated circularly polarizing plate. Particularly, if it is less than 0, i.e. $\Delta Ra$ is a negative value, a hue of the display device tends to fluctuate due to fluctuation in wavelength dispersibility in terms of retardation due to humidity.

Further, both of the in-plane retardation Rc at a wavelength of 550 nm and the in-plane retardation Ra at a wavelength of 550 nm or more are equal to or greater than 0. When both of the in-plane retardation Rc at a wavelength of 550 nm and the in-plane retardation Ra at a wavelength of 550 nm are equal to or greater than 0, both of the deterioration in black display property of an elongated circularly polarizing plate and the hue fluctuation along with humidity fluctuation can be suppressed. Both of the in-plane retardation Rc at a wavelength of 550 nm and the in-plane retardation Ra at a wavelength of 550 nm may be set to be equal to or greater than 0, preferably, 10 to 140 nm, more preferably, 30 to 120 nm. Preferably, each of the in-plane retardation Rc and the in-plane retardation Ra is equal to or greater than 0, in the entire wavelength range of 400 to 700 nm.

Generally, it is possible to increase the in-plane retardation (e.g., $Ro_{550}$) by increasing a film thickness d of the retardation film. However, an increase in the film thickness is undesirable in terms of cost, and leads to problems of an increase in thickness of an image display device such as an organic EL display, and deterioration in light transmissibility, resulting in deteriorated light extraction efficiency. Differently, the retardation film according to this embodiment makes it possible to allow both of the cellulose acylate and the component other than the cellulose acylate to contribute to the retardation developability and the reverse wavelength dispersion property, so that it becomes possible to exhibit excellent retardation developability and reverse wavelength dispersion property, even when the film thickness is reduced as described later.

Next, components of the retardation film according to this embodiment will be described.

<Resin Component>

The retardation film contains, as a primary component, cellulose acylate having a degree of acyl substitution (acyl substitution degree) of 2.0 to 2.7. As used in this specification, the term "primary component" means a component contained in a thermoplastic resin component constituting the retardation film, in an amount of 70 mass % or more.

The cellulose acylate may be a type acylated by one kind of acyl group or may be a type acylated by two or more kinds of acyl groups.

The acyl substitution degree of the cellulose acylate may be set to 2.0 to 2.7, preferably, 2.3 to 2.6, more preferably, 2.4 to 2.5. If the acyl substitution degree of the cellulose acylate is less than 2.0, a wavelength dispersion property in terms of retardation tends to become close to flat or exhibit normal wavelength dispersibility, although the retardation developability is enhanced. On the other hand, if the acyl substitution degree of the cellulose acylate is greater than 2.7, the wavelength dispersion property in terms of retardation tends to have more significant reverse dispersibility (exhibit reverse wavelength dispersion property), although the retardation developability is deteriorated. As use in this specification, the term "degree of acyl substitution (acyl substitution degree)" means an average degree of acyl substitution (average acyl substitution degree), wherein the average acyl substitution degree is indicated by an average of the number of esterified hydroxy groups among three hydroxy groups of each anhydroglucose constituting cellulose, and has a value of 0 to 3.0.

The acyl group is not particularly limited, but may be an aliphatic group or may be an aromatic group. Examples thereof may include an acetyl group, a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an isobutanoyl group, a tert-butanoyl group, a cyclohexane a carbonyl group, an oleoyl group, a benzoyl group, a naphthyl carbonyl group, and a cinnamoyl group.

From the viewpoint of an advantage of being able to enhance an effect of improving hydrophobicity of the cellulose acylate to suppress fluctuation of wavelength dispersibility in terms of retardation due to humidity, a ratio of an acyl group having a carbon number of 3 or more to an entirety of acyl groups contained in the cellulose acylate is preferably 0 to 80%. If the ratio of an acyl group having a carbon number of 3 or more is beyond the range of 0 to 80%, humidity-caused fluctuation of wavelength dispersibility tends to become larger.

The acyl group having a carbon number of 3 or more is not particularly limited. Examples thereof include a propionyl group, a butyryl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an isobutanoyl group, a t-butanoyl group, a cyclohexanyl group, an oleoyl group, a benzoyl group, a naphthoyl group, and a cinnamoyl group.

A portion of the cellulose acylate which is not substituted by the acyl group generally exists as a hydroxy group. This cellulose acylate can be synthesized by a heretofore-known process. The acyl substitution degree can be derived according to a method prescribed in ASTM-D817-96 (test procedure for cellulose acylate, etc.)

From the viewpoint of an advantage of increasing mechanical strength of an obtained retardation film, a number-average molecular weight (Mn) of the cellulose acylate is preferably 30,000 to 300,000, more preferably, 50,000 to 200,000. A ratio (Mw/Mn) of a weight-average molecular weight (Mw) to the number average molecular weight (Mn) of the cellulose acylate is preferably 1.4 to 3.0.

Each of the weight-average molecular weight (Mw) and the number average molecular weight (Mn) of the cellulose acylate can be measured using Gel Permeation Chromatography (GPC). One example of specific measurement conditions will be given below.

(Measurement Conditions)
Solvent: methylene chloride
Column: Shodex K806, K805, K803G (the three columns produced by Showa Denko K. K. were connected together and used)
Column temperature: 25° C.
Sample concentration: 0.1 mass %
Detector: RI Model 504 (produced by GL Science Co.)
Pump: L6000 (produced by Hitachi, Ltd.)
Flow rate: 1.0 ml/min
Calibration curve: a calibration curve based on 13 samples of standard polystyrene STK, standard polystyrene (produced by Tosoh Corp.) having Mw ranging from 500 to 1,000,000, was used. The 13 samples were used at approximately even intervals.

The retardation film may comprise a thermoplastic resin other than the cellulose acylate. As used in this specification, the term "thermoplastic resin" means a resin having a property capable of being softened by heating up to its glass transition temperature or melting point, and formed into an intended shape.

As the thermoplastic resins, it is possible to use, for example, polyethylene (PE), high-density polyethylene, medium-density polyethylene, low-density polyethylene, polypropylene (PP), polyvinyl chloride (PVC), polyvinylidene chloride, polystyrene (PS), polyvinyl acetate (PVAc), polytetrafluoroethylene (PTFE), acrylonitrile-butadiene-styrene resin (ABS resin), AS resin, or acrylic resin (PMMA). Further, in the case where strength and breakage resistance are particularly required, it is possible to use, for example, polyamide (PA), nylon, polyacetal (POM), polycarbonate (PC), modified polyphenylene ether (m-PPE, modified PPE, PPO), polybutylene terephthalate (PBT), polyethylene terephthalate (PET), glass fiber-reinforced polyethylene terephthalate (GF-PET), or cyclic polyolefin (COP). In the case where a high heat distortion temperature and durability for long-term usage are required, it is possible to use polyphenylene sulfide (PPS), PTFE, polysulfone, polyether sulfone, amorphous polyarylate, liquid crystal polymer, polyether ether ketone, thermoplastic polyimide (PI), polyamide-imide (PAI), or the like. Depending on the intended use, these may be used in combination in terms of a type and/or a molecular weight.

<Optical Performance Regulating Agent>

Preferably, the retardation film contains, as an optical performance regulating agent, a compound represented by the following general formula (A).

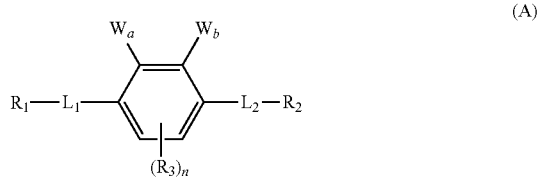

(In the formula: $L_1$ and $L_2$ each independently represents a single bond or divalent linking group; $R_1$, $R_2$ and $R_3$ each independently represents a substituent group; n represents an integer number of 0 to 2; and Wa and Wb each represents a hydrogen atom or a substituent group, wherein (I) Wa and Wb may be bonded together to form a ring, or (II) at least one of Wa and Wb may have a ring structure, or (III) at least one of Wa and Wb may be an alkenyl group or an alkynyl group.)

Preferably, each of L1 and L2 is O, COO, or OCO.

Specific examples of each of R1, R2 and R3 include: halogen atoms (such as a fluorine atom, a chlorine atom, a bromine atom, and an iodine atom); alkyl groups (such as a methyl group, an ethyl group, a n-propyl group, an isopropyl group, a tert-butyl group, a n-octyl group, and a 2-ethylhexyl group); cycloalkyl groups (such as a cyclohexyl group, a cyclopentyl group, and a 4-n-dodecylcyclohexyl group); alkenyl groups (such as a vinyl group and an allyl group); cycloalkenyl groups (such as 2-cyclopentene-1-yl and 2-cyclohexene-1-yl); alkynyl groups (such as an ethynyl group and a propargyl group); aryl groups (such as a phenyl group, a p-tolyl group, and a naphthyl group); heterocyclic groups (such as a 2-furyl group, a 2-thienyl group, a 2-pyrimidinyl group, and a 2-benzothiazolyl group); cyano groups; hydroxyl groups; nitro groups; carboxyl groups; alkoxy groups (such as a methoxy group, an ethoxy group, an isopropoxy group, a tert-butoxy group, an n-octyloxy group, and a 2-methoxyethoxy group); aryloxy groups (such as a phenoxy group, a 2-methylphenoxy group, a 4-tert-butyl-phenoxy group, a 3-nitrophenoxy group, and a 2-tetradecanoylaminophenoxy group); acyloxy groups (such as a formyloxy group, an acetyloxy group, a pivaloyloxy group, a stearoyloxy group, a benzoyloxy group, and a p-methoxyphenylcarbonyloxy group); amino groups (such as an amino group, a methylamino group, a dimethylamino group, an anilino group, an N-methyl-anilino group, and a diphenylamino group); acylamino groups (such as a formylamino group, an acetylamino group, a pivaloylamino group, a lauroylamino group, and a benzoylamino group); alkylsulfonylamino and arylsulfonylamino groups (such as a methylsulfonylamino group, a butylsulfonylamino group, a phenylsulfonylamino group, a 2,3,5-trichlorophenylsulfonylamino group, and a p-methylphenylsulfonylamino group); mercapto groups; alkylthio groups (such as a methylthio group, an ethylthio group, and an n-hexadecylthio group); arylthio groups (such as a phenylthio group, a p-chlorophenylthio group, and an m-methoxyphenylthio group); sulfamoyl groups (such as an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, and an N—(N'-phenylcarbamoyl)sulfamoyl group); sulfo groups; acyl groups (such as an acetyl group and a pivaloylbenzoyl group); and carbamoyl groups (such as a carbamoyl group, an N-methylcarbamoyl group, an N,N-dimethylcarbamoyl group, an N,N-di-n-octylcarbamoyl group, and an N-(methylsulfonyl)carbamoyl group).

Each of R1 and R2 is preferably a substituted or non-substituted benzene ring or a substituted or non-substituted cyclohexane ring, more preferably, a benzene ring having a substituent group or cyclohexane ring having a substituent group, particularly preferably, a benzene ring having a substituent group at the 4-position in view of being capable of allowing a main chain of the compound represented by the general formula (A) to be oriented in the slow axis direction of the retardation film to increase a refraction index nx in the slow axis direction.

Specific examples of each of Wa and Wb include: halogen atoms (such as a fluorine atom, a chlorine atom, a bromine atom, and an iodine atom); alkyl groups (such as a methyl group, an ethyl group, a n-propyl group, an isopropyl group, a tert-butyl group, a n-octyl group, and a 2-ethylhexyl group); cycloalkyl groups (such as a cyclohexyl group, a cyclopentyl group, and a 4-n-dodecylcyclohexyl group); alkenyl groups (such as a vinyl group and an allyl group); cycloalkenyl groups (such as 2-cyclopentene-1-yl and 2-cyclohexene-1-yl); alkynyl groups (such as an ethynyl group and a propargyl group); aryl groups (such as a phenyl group, a p-tolyl group, and a naphthyl group); heterocyclic groups (such as a 2-furyl group, a 2-thienyl group, a 2-pyrimidinyl group, and a 2-benzothiazolyl group); cyano groups; hydroxyl groups; nitro groups; carboxyl groups; alkoxy groups (such as a methoxy group, an ethoxy group, an isopropoxy group, a tert-butoxy group, an n-octyloxy group, and a 2-methoxyethoxy group); aryloxy groups (such as a phenoxy group, a 2-methylphenoxy group, a 4-tert-butyl-phenoxy group, a 3-nitrophenoxy group, and a 2-tetradecanoylaminophenoxy group); acyloxy groups (such as a formyloxy group, an acetyloxy group, a pivaloyloxy group, a stearoyloxy group, a benzoyloxy group, and a p-methoxyphenylcarbonyloxy group); amino groups (such as an amino group, a methylamino group, a dimethylamino group, an anilino group, an N-methyl-anilino group, and a diphenylamino group); acylamino groups (such as a formylamino group, an acetylamino group, a pivaloylamino group, a lauroylamino group, and a benzoylamino group); alkylsulfonylamino and arylsulfonylamino groups (such as a methylsulfonylamino group, a butylsulfonylamino group, a phenylsulfonylamino group, a 2,3,5-trichlorophenylsulfonylamino group, and a p-methylphenylsulfonylamino group); mercapto groups; alkylthio groups (such as a methylthio group, an ethylthio group, and an n-hexadecylthio group); arylthio groups (such as a phenylthio group, a p-chlorophenylthio group, and an m-methoxyphenylthio group); sulfamoyl groups (such as an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, and an N—(N'-phenylcarbamoyl)sulfamoyl group); a sulfo group; an acyl group (such as an acetyl group or a pivaloylbenzoyl group); and carbamoyl groups (such as a carbamoyl group, an N-methylcarbamoyl group, an N,N-dimethylcarbamoyl group, an N,N-di-n-octylcarbamoyl group, and an N-(methylsulfonyl)carbamoyl group).

One of the above substituent groups may be substituted by another one of the above substituent groups.

In the case where Wa and Wb are bonded together to form a ring, examples of the result include the following structures.

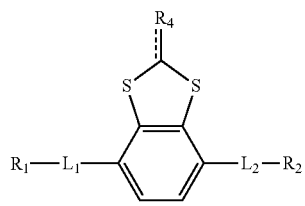
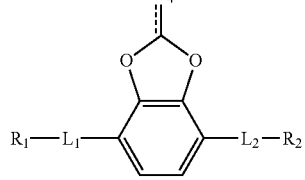
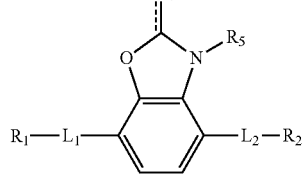
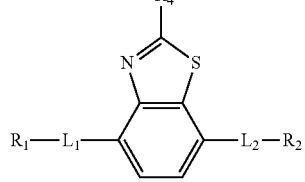
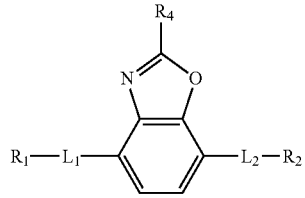
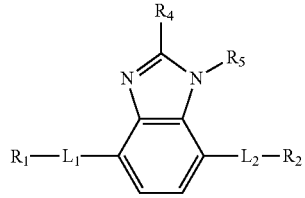

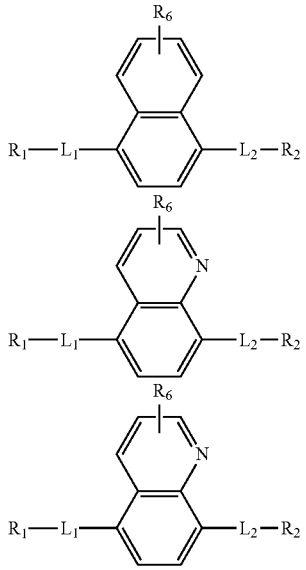

In the above formulas, R4, R5, R6 each represents a hydrogen atom or a substituent group, wherein examples of the substituent group may be the same as the specific examples of the substituent group represented by each of the aforementioned R1, R2 and R3.

In the case where Wa and Wb in the general formula (A) are bonded together to form a ring, a resulting compound preferably comprises a nitrogen-containing five-membered ring or a sulfur-containing five-membered ring. Example of the compound may include a compound represented by the following general formula (1).

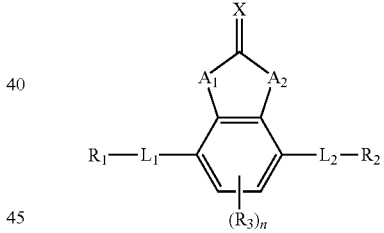

In the formula, A1 and A2 each independently represents O, S, NRX (RX represents a hydrogen atom or a substituent group), or CO. Examples of the substituent group represented by RX are equivalent to the specific examples of the substituent group represented by each of the aforementioned Wa and Wb. X represents a non-metal atom of Groups XIV to XVI in the 3rd period and subsequent periods of the periodic table, or a substituent group containing a non-metal atom of Groups XIV to XVI in the 3rd period and subsequent periods of the periodic table or a conjugated system thereof. Preferably, X is O, S, NRc, or C (Rd) Re, wherein each of Rc, Rd and Re represents a substituent group, and examples thereof are equivalent to the specific examples of the substituent group represented by each of the aforementioned Wa and Wb. Each of L1, L2, R1, R2, R3 and n is equivalent to a respective one of L1, L2, R1, R2, R3 and n in the general formula (A).

Specific examples of the compound represented by the general formula (A) will be presented below. However, the compound represented by the general formula (A) and usable in this embodiment is not limited to the following specific examples.

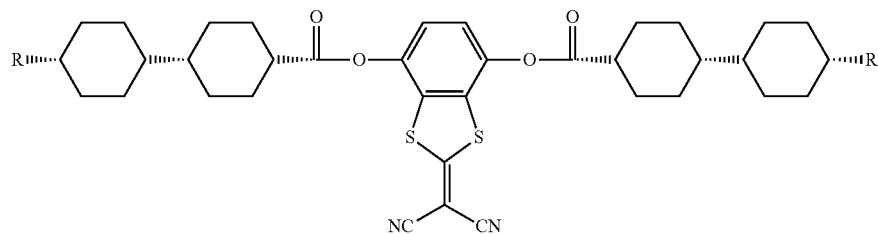
(1)
R = —C$_5$H$_{11}$
(2)
—C$_4$H$_9$
(3)
—C$_3$H$_7$
(4)
—C$_2$H$_5$
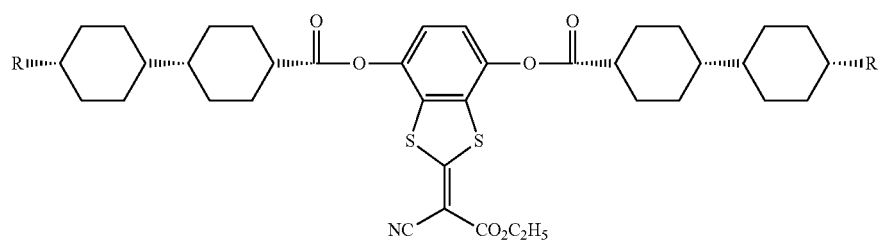
(5)
R = —C$_5$H$_{11}$
(6)
—C$_4$H$_9$
(7)
—C$_3$H$_7$
(8)
—C$_2$H$_5$
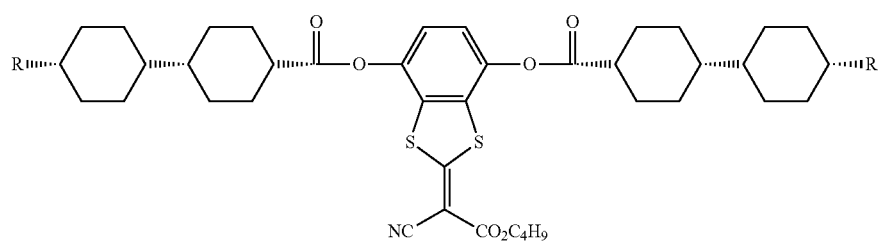
(9)
R = —C$_5$H$_{11}$
(10)
—C$_4$H$_9$
(11)
—C$_3$H$_7$
(12)
—C$_2$H$_5$

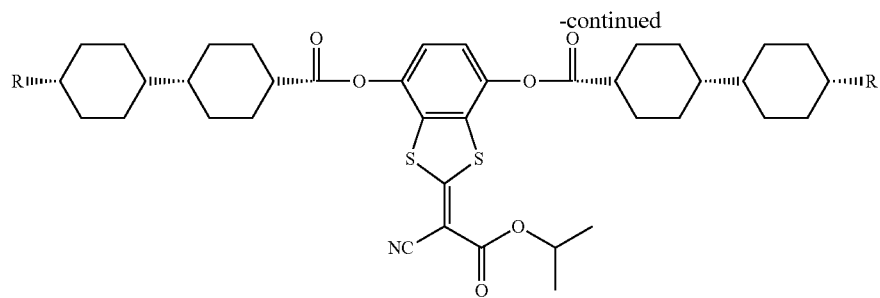
(13)
R =  —C₅H₁₁
(14)
   —C₄H₉
(15)
   —C₃H₇
(16)
   —C₂H₅
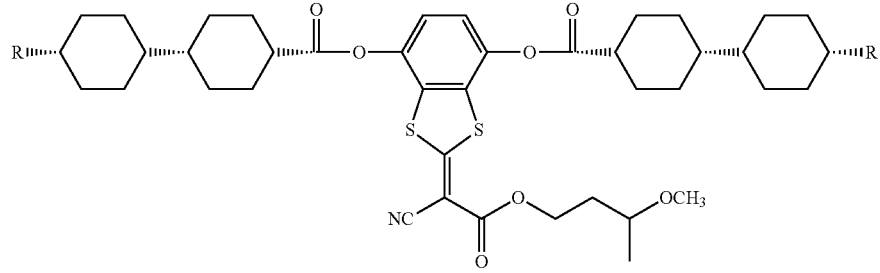
(17)
R =  —C₅H₁₁
(18)
   —C₄H₉
(19)
   —C₃H₇
(20)
   —C₂H₅
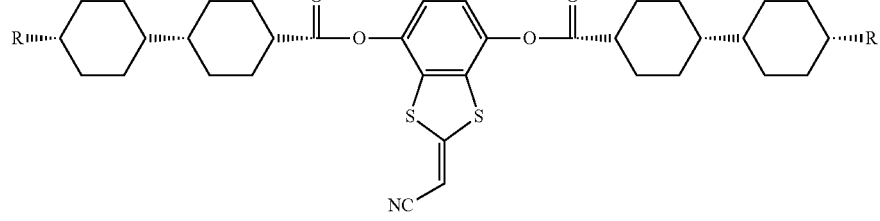
(21)
R =  —C₅H₁₁
(22)
   —C₄H₉
(23)
   —C₃H₇
(24)
   —C₂H₅
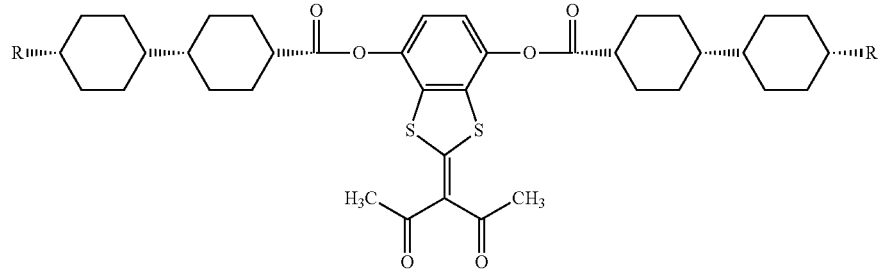

-continued
(25)
(26)
(27)
(28)
R = —C₅H₁₁
—C₄H₉
—C₃H₇
—C₂H₅
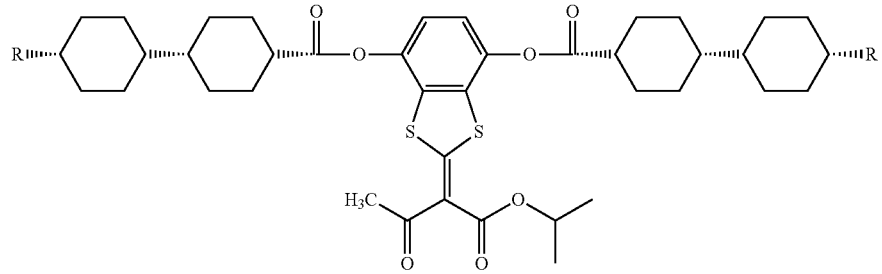
(29)
(30)
(31)
(32)
R = —C₅H₁₁
—C₄H₉
—C₃H₇
—C₂H₅
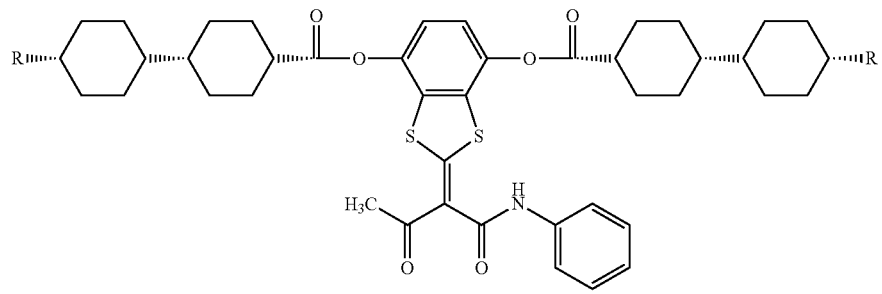
(33)
(34)
(35)
(36)
R = —C₅H₁₁
—C₄H₉
—C₃H₇
—C₂H₅
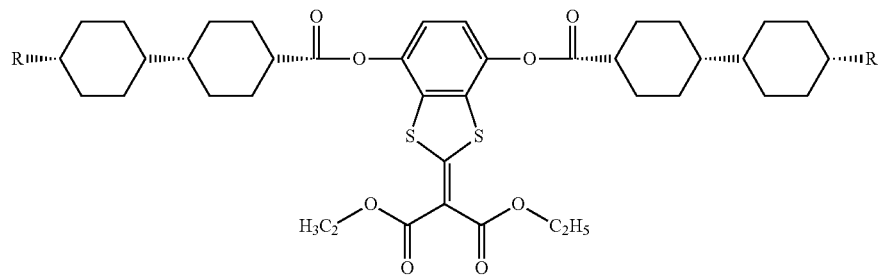

-continued
(37)
R = —C₅H₁₁
(38)
—C₄H₉
(39)
—C₃H₇
(40)
—C₂H₅
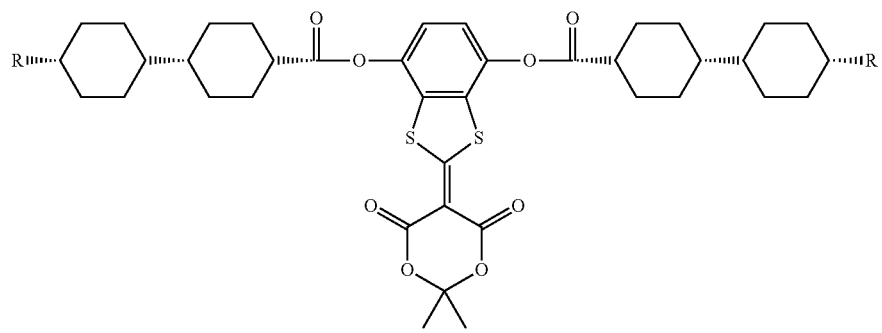
(41)
R = —C₅H₁₁
(42)
—C₄H₉
(43)
—C₃H₇
(44)
—C₂H₅
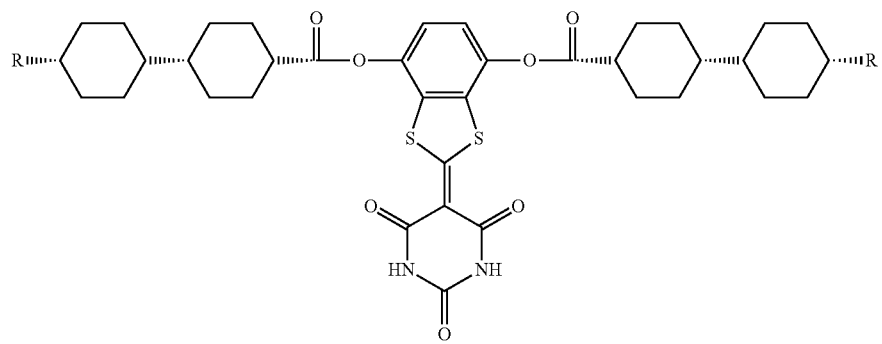
(45)
R = —C₅H₁₁
(46)
—C₄H₉
(47)
—C₃H₇
(48)
—C₂H₅

-continued
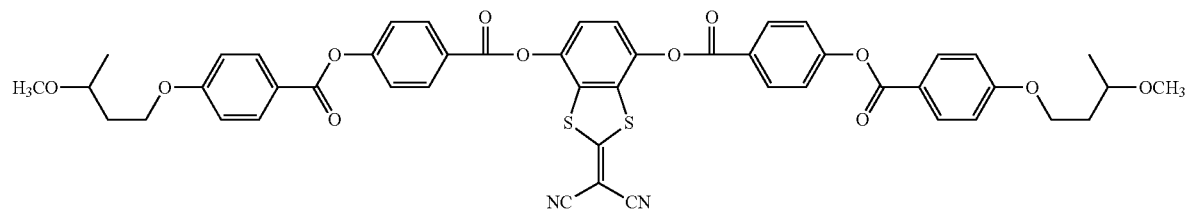
(49)
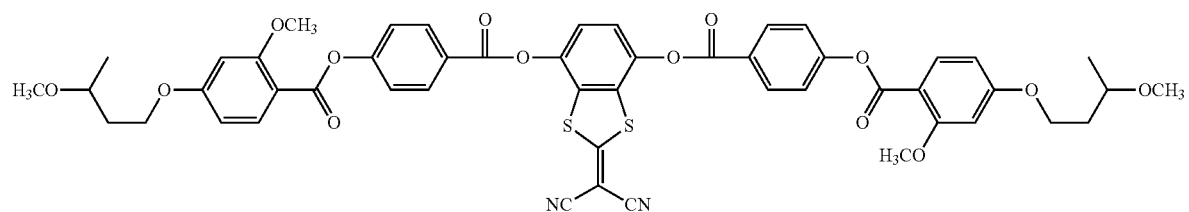
(50)
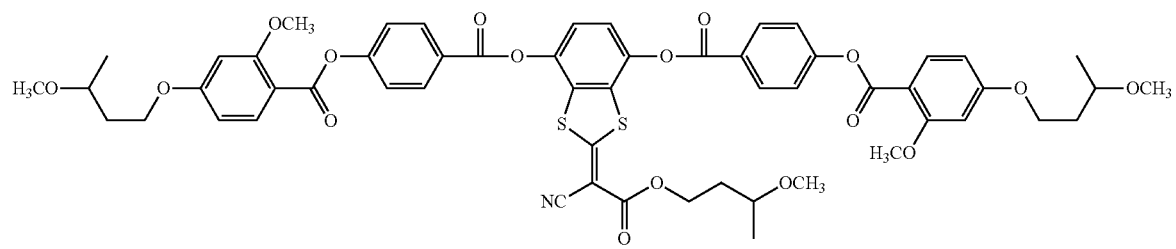
(51)
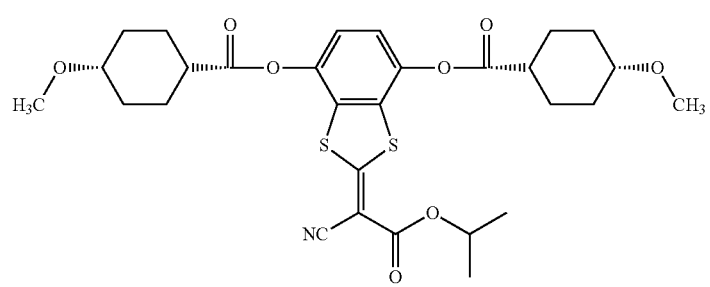
(52)
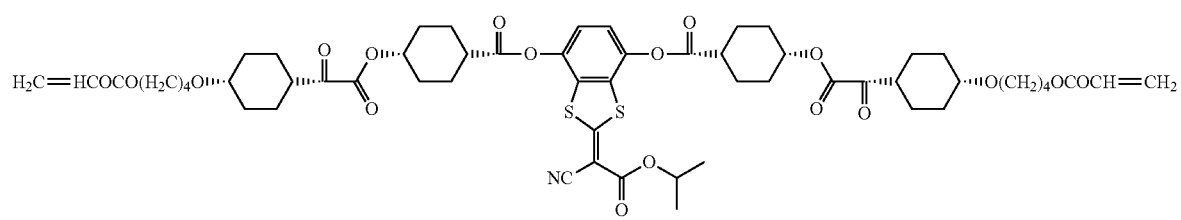
(53)
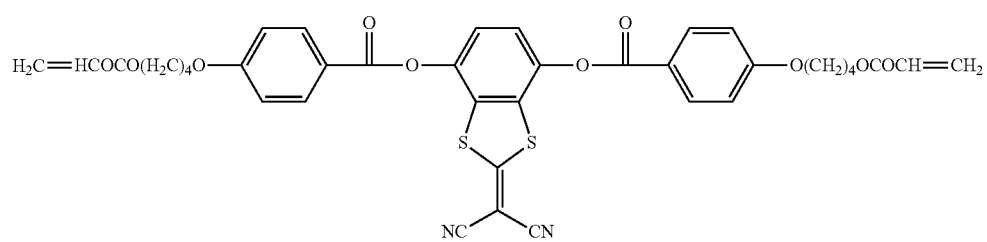
(54)

-continued
(55)
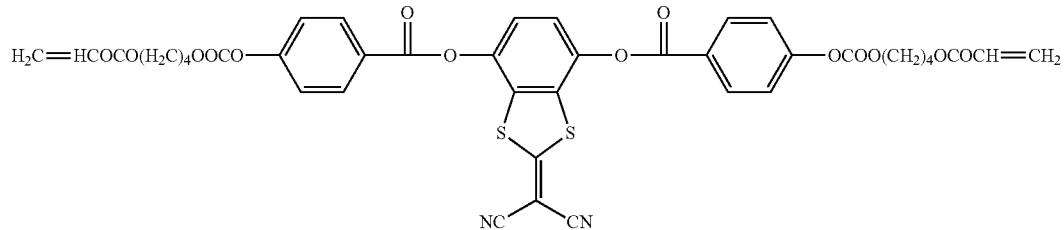
(56)
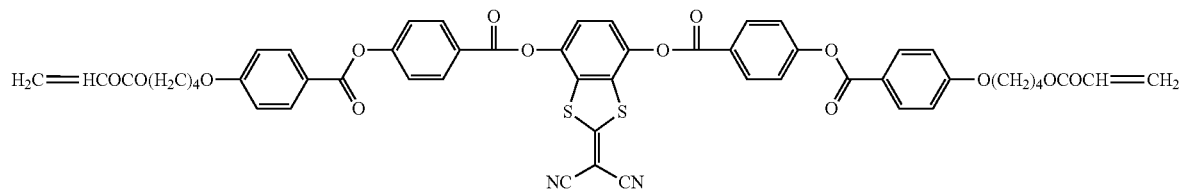
(57)
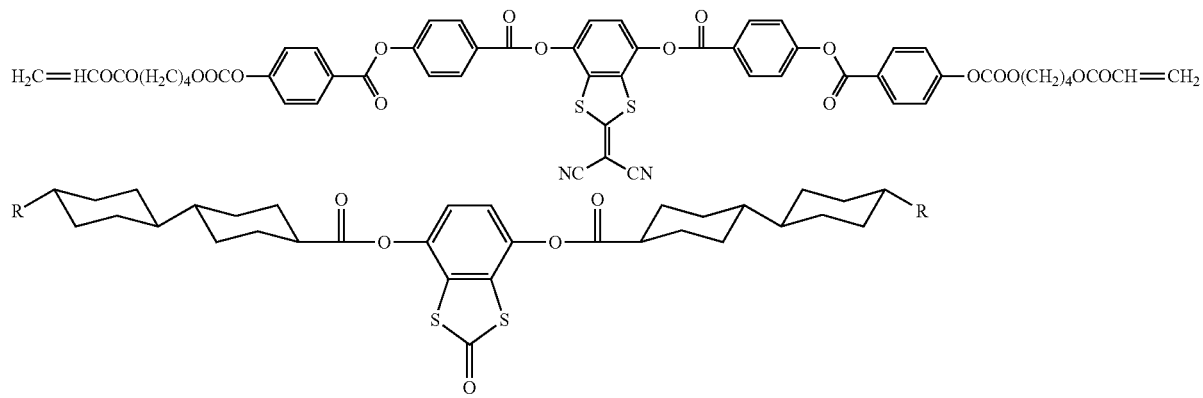
(58)
R = —C$_5$H$_{11}$
(59)
—C$_4$H$_9$
(60)
—C$_3$H$_7$
(61)
—C$_2$H$_5$
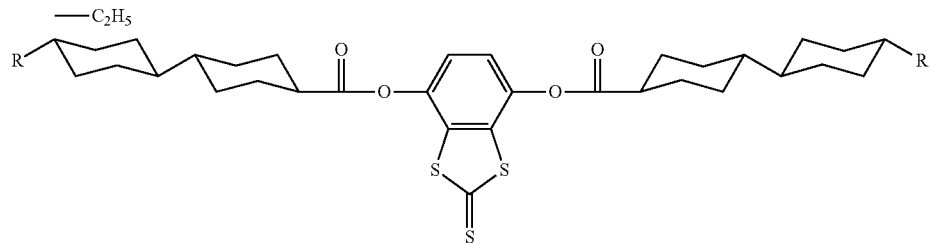
(62)
R = —C$_5$H$_{11}$
(63)
—C$_4$H$_9$
(64)
—C$_3$H$_7$
(65)
—C$_2$H$_5$ -continued
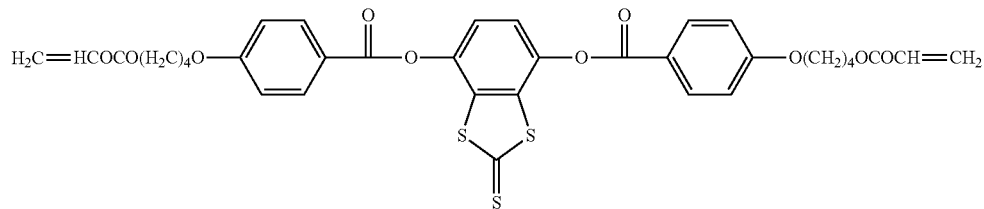
(66)
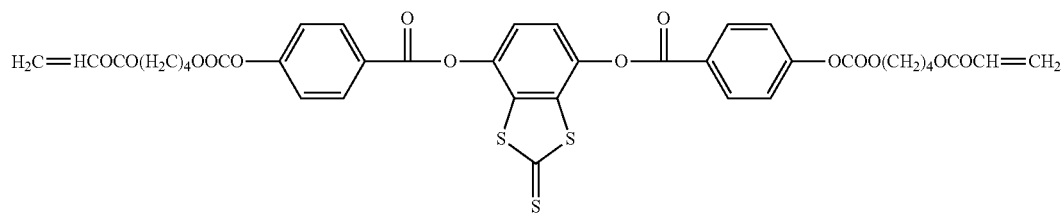
(67)
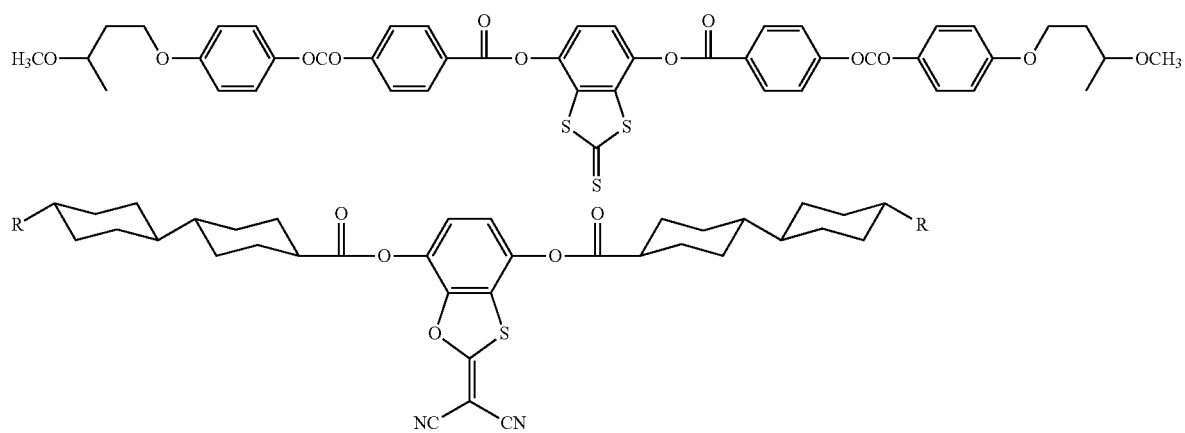
(68)
(69) R = —C₅H₁₁
(70) —C₄H₉
(71) —C₃H₇
(72) —C₂H₅
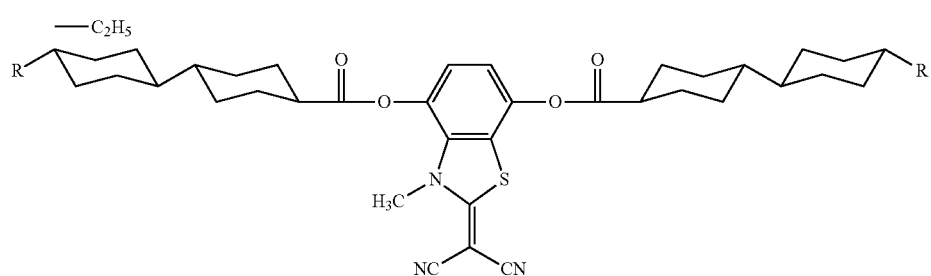
(73) R = —C₅H₁₁
(74) —C₄H₉
(75) —C₃H₇

-continued
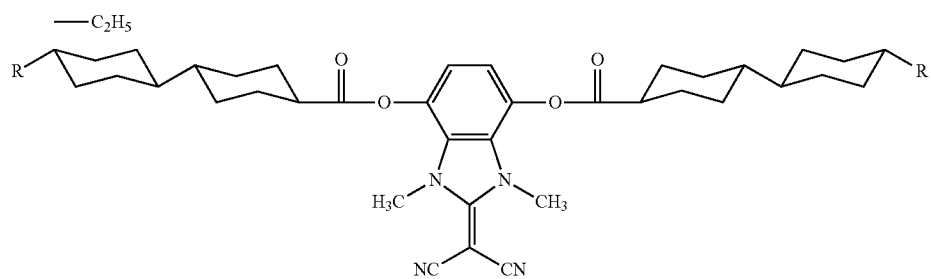
(76)
R =  —C$_5$H$_{11}$ (77)
—C$_4$H$_9$ (78)
—C$_3$H$_7$ (79)
—C$_2$H$_5$ (80)
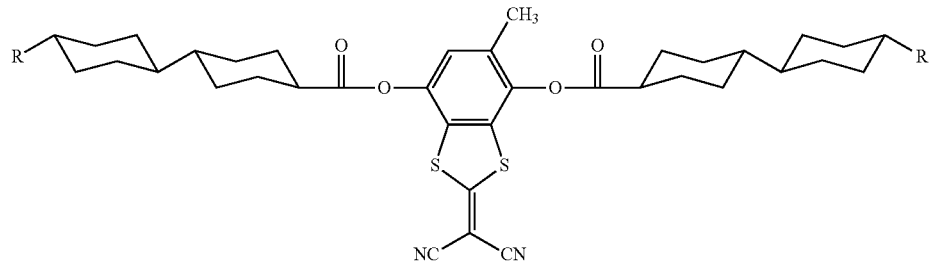
(80)
R =  —C$_5$H$_{11}$ (81)
—C$_4$H$_9$ (82)
—C$_3$H$_7$ (83)
—C$_2$H$_5$ (84)
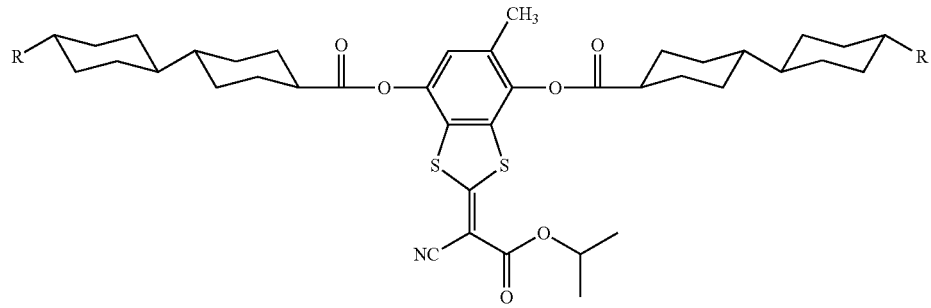
R =  —C$_5$H$_{11}$ (85)
—C$_4$H$_9$ (86)
—C$_3$H$_7$ (87)
—C$_2$H$_5$ (88)

-continued
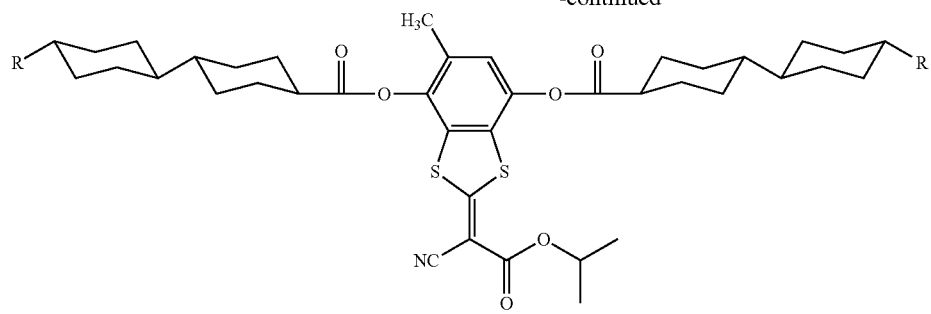
(89)
R = —C$_5$H$_{11}$
(90)
—C$_4$H$_9$
(91)
—C$_3$H$_7$
(92)
—C$_2$H$_5$
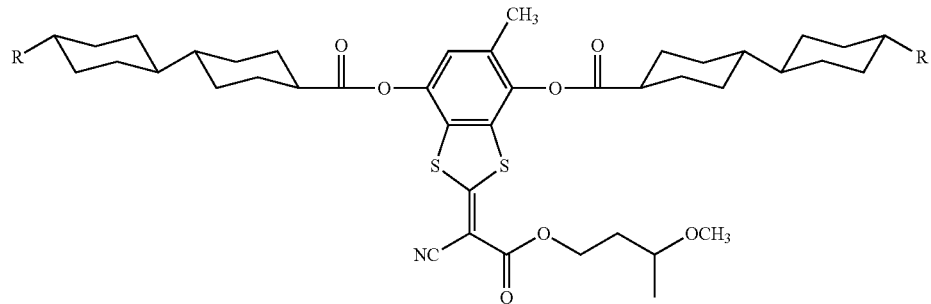
(93)
R = —C$_5$H$_{11}$
(94)
—C$_4$H$_9$
(95)
—C$_3$H$_7$
(96)
—C$_2$H$_5$
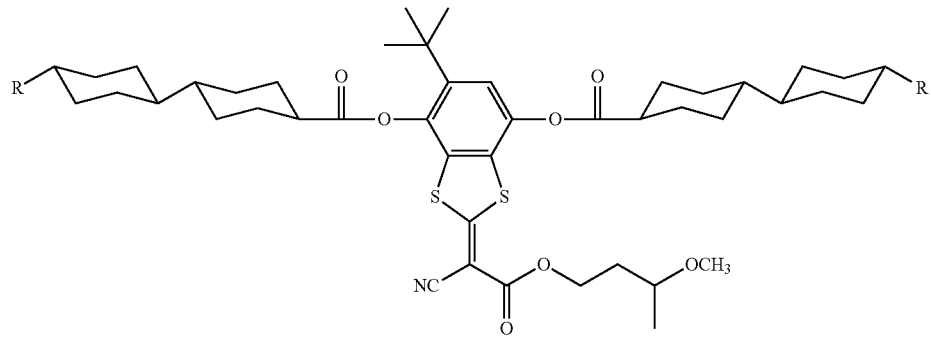
(97)
R = —C$_5$H$_{11}$
(98)
—C$_4$H$_9$
(99)
—C$_3$H$_7$
(100)
—C$_2$H$_5$ -continued
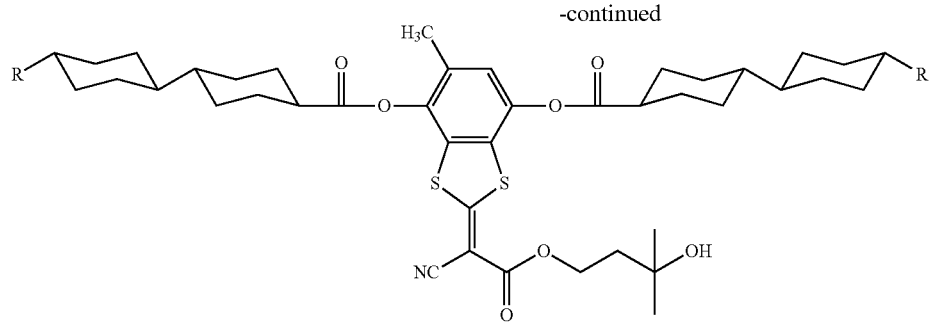
(101)
R = —C₅H₁₁ (102)
—C₄H₉ (103)
—C₃H₇ (104)
—C₂H₅
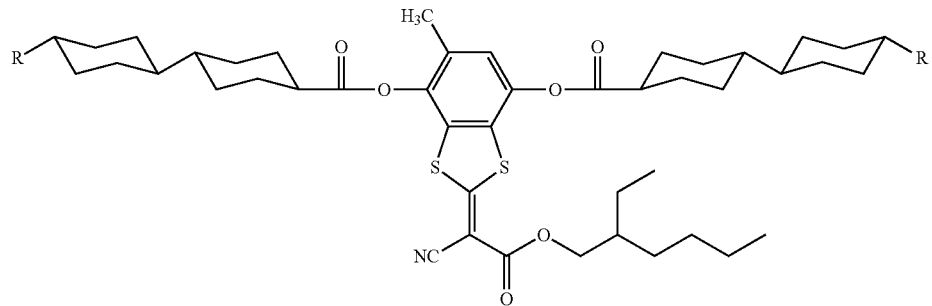
(105)
R = —C₅H₁₁ (106)
—C₄H₉ (107)
—C₃H₇ (108)
—C₂H₅
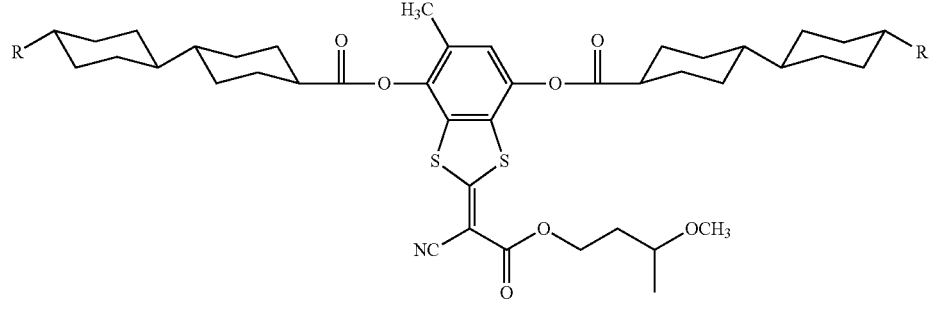
(109)
R = —C₅H₁₁ (110)
—C₄H₉ (111)
—C₃H₇ (112)
—C₂H₅

-continued
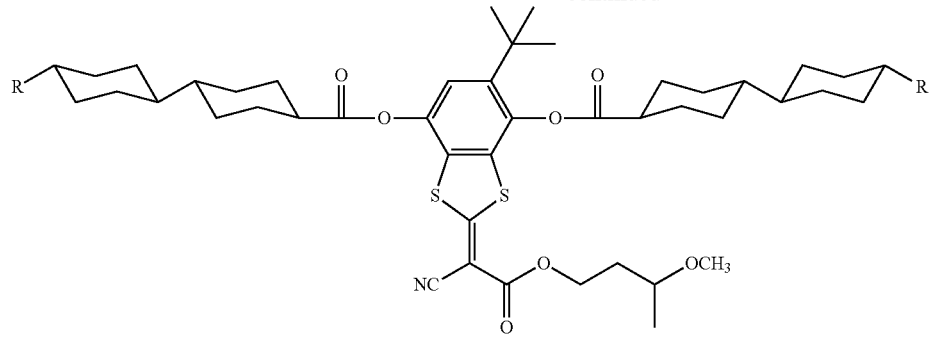
(113)
R = —C$_5$H$_{11}$
(114)
—C$_4$H$_9$
(115)
—C$_3$H$_7$
(116)
—C$_2$H$_5$
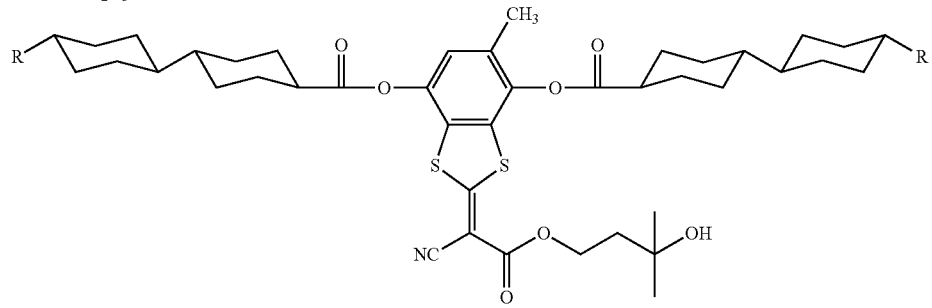
(117)
R = —C$_5$H$_{11}$
(118)
—C$_4$H$_9$
(119)
—C$_3$H$_7$
(120)
—C$_2$H$_5$
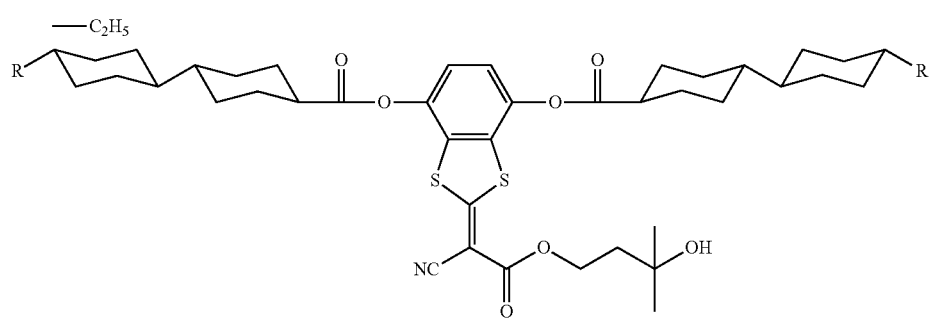
(121)
R = —C$_5$H$_{11}$
(122)
—C$_4$H$_9$
(123)
—C$_3$H$_7$
(124)
—C$_2$H$_5$ -continued
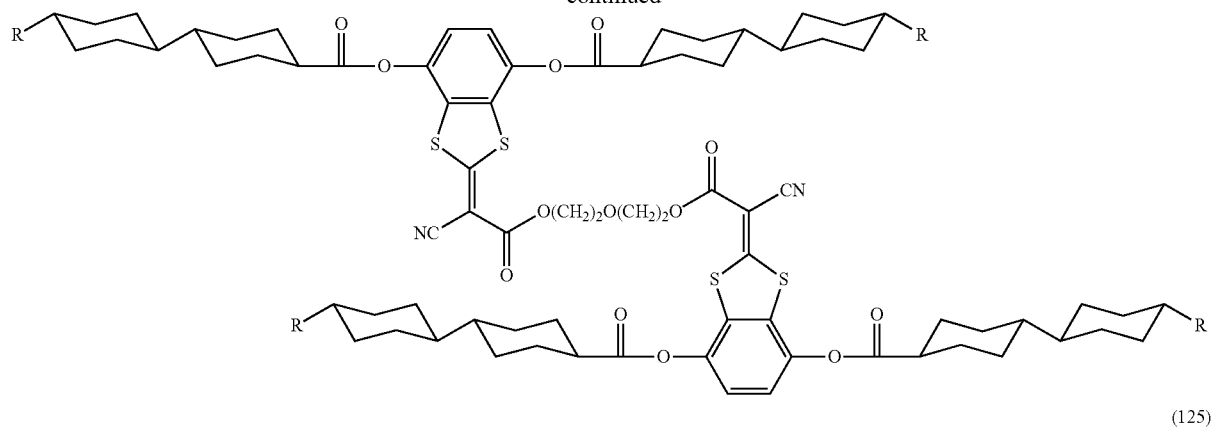
(125)
R = —C₅H₁₁ (126)
—C₄H₉ (127)
—C₃H₇ (128)
—C₂H₅
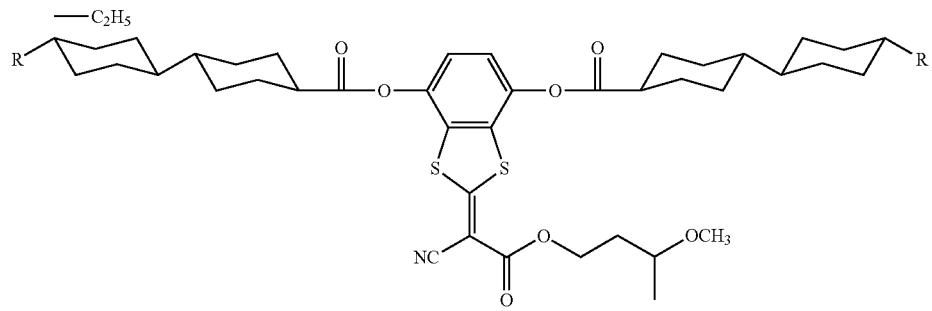
(129)
R = —C₅H₁₁ (130)
—C₄H₉ (131)
—C₃H₇ (132)
—C₂H₅
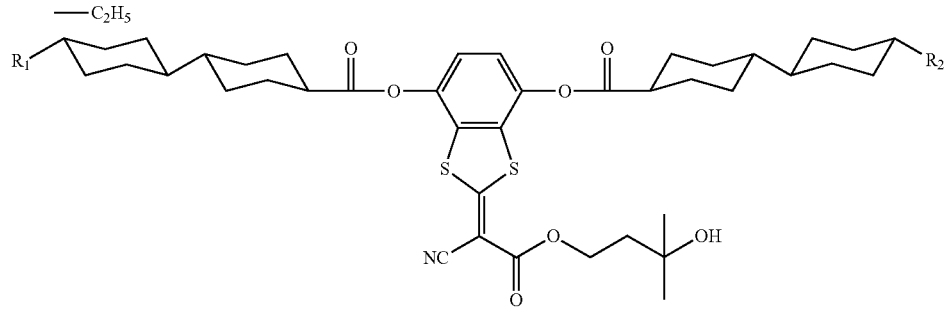
(133)
R₁ = —C₂H₅   R₂ = —C₄H₉ (134)
—C₂H₅   —C₃H₇ (135)
—C₃H₇   —C₄H₉

-continued
(136)
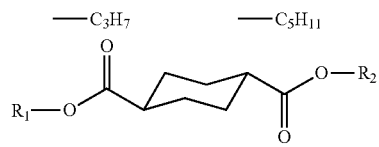
(137)
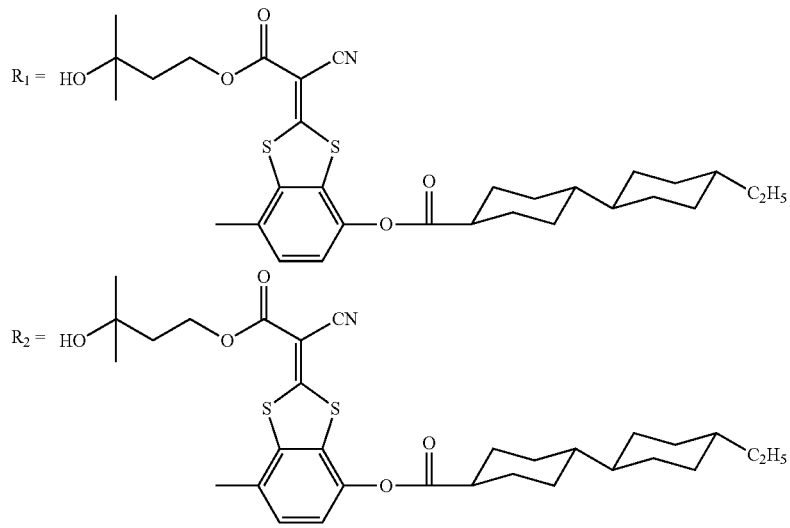
(138)
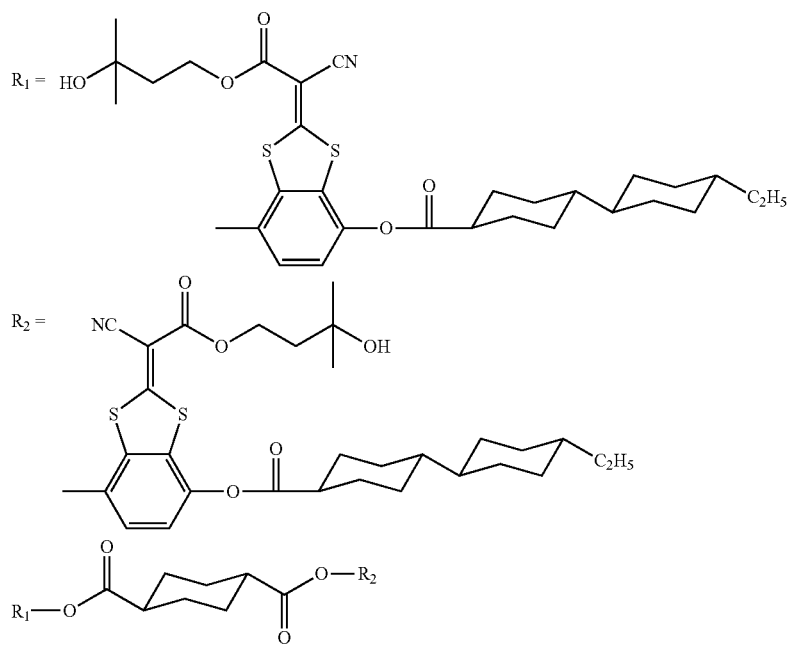
(139)
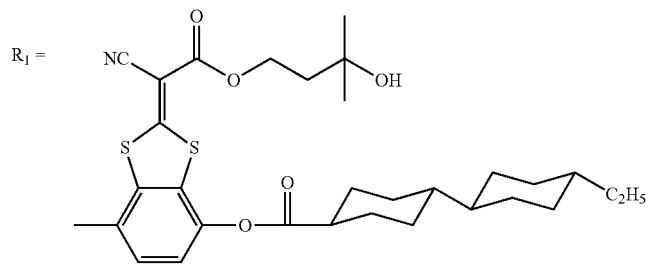

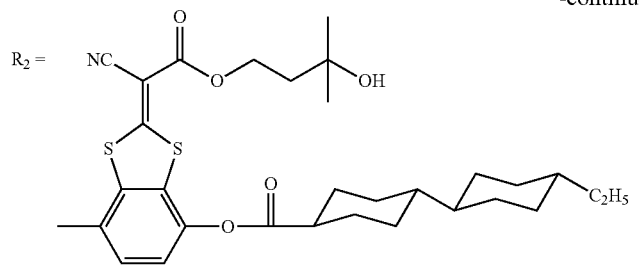
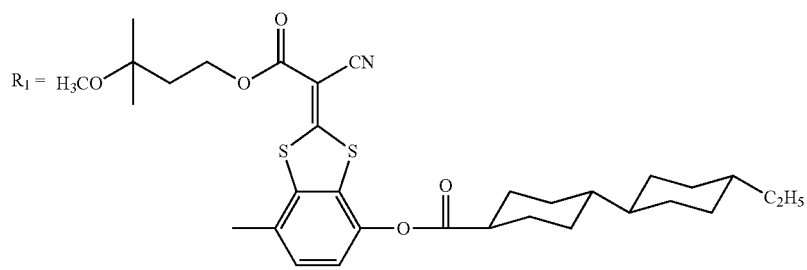
(140)
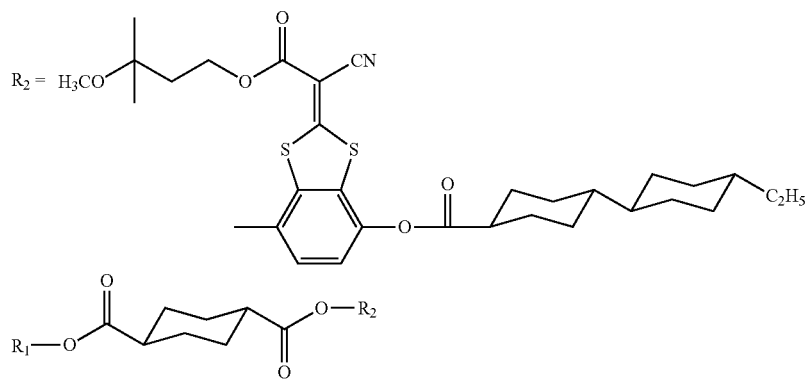
(141)
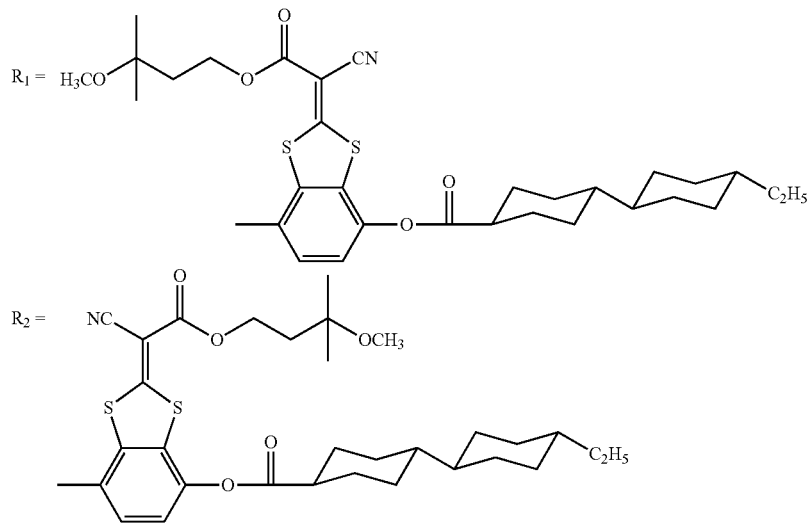

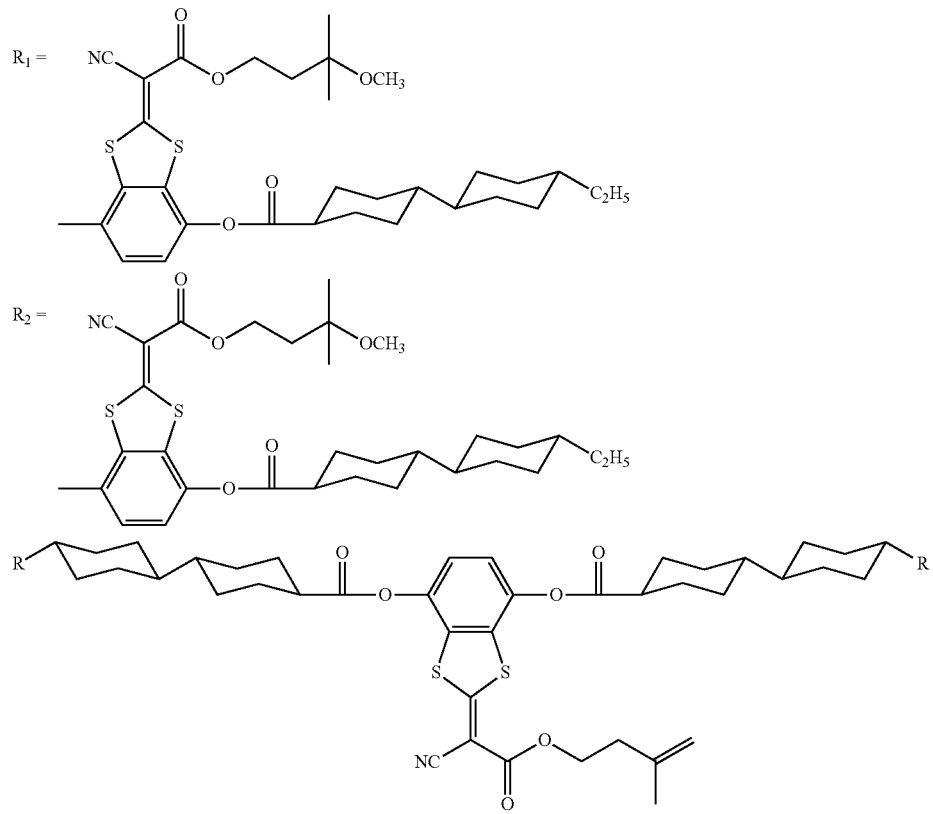
(142)
(143) R = —C$_5$H$_{11}$
(144) —C$_4$H$_9$
(145) —C$_3$H$_7$
(146) —C$_2$H$_5$
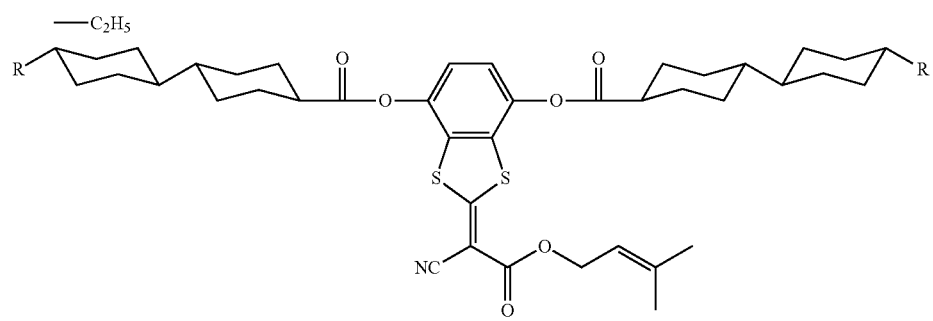
(147) R = —C$_5$H$_{11}$
(148) —C$_4$H$_9$
(149) —C$_3$H$_7$
(150) —C$_2$H$_5$

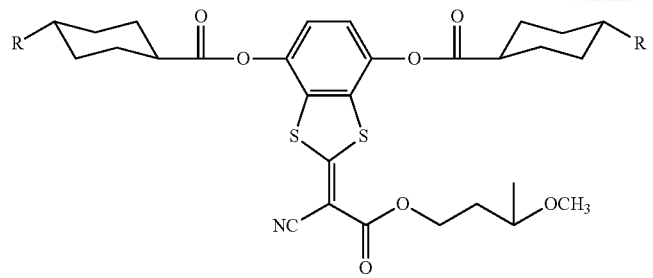
(151) R = —H
(152) —C₄H₉
(153) —C₅H₁₁
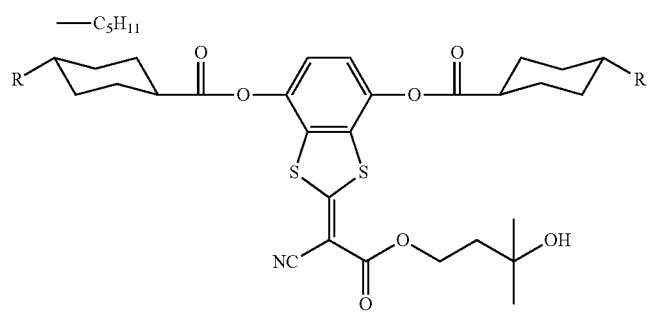
(154) R = —H
(155) —C₄H₉
(156) —C₅H₁₁
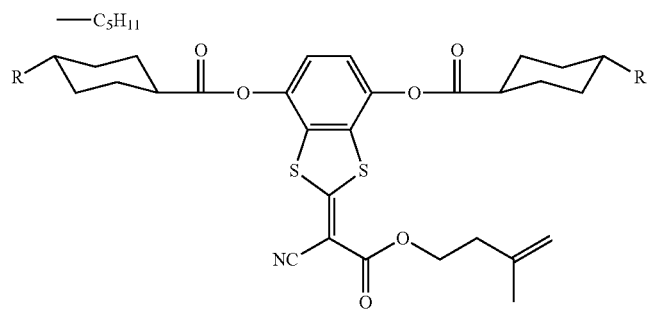
(157) R = —H
(158) —C₄H₉
(159) —C₅H₁₁
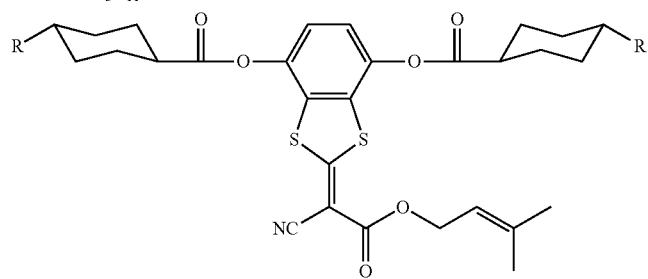

-continued
(160)
R = —H
(161)
—C4H9
(162)
—C5H11
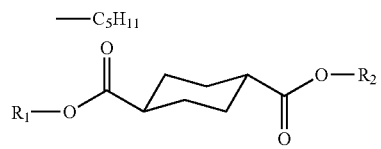
(163)
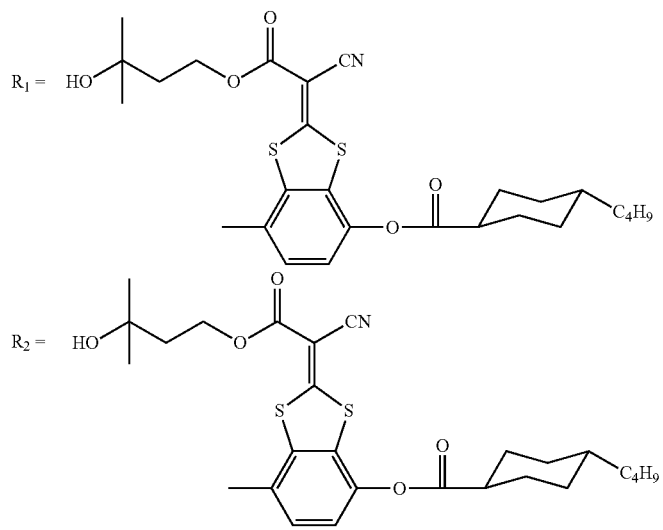
(164)
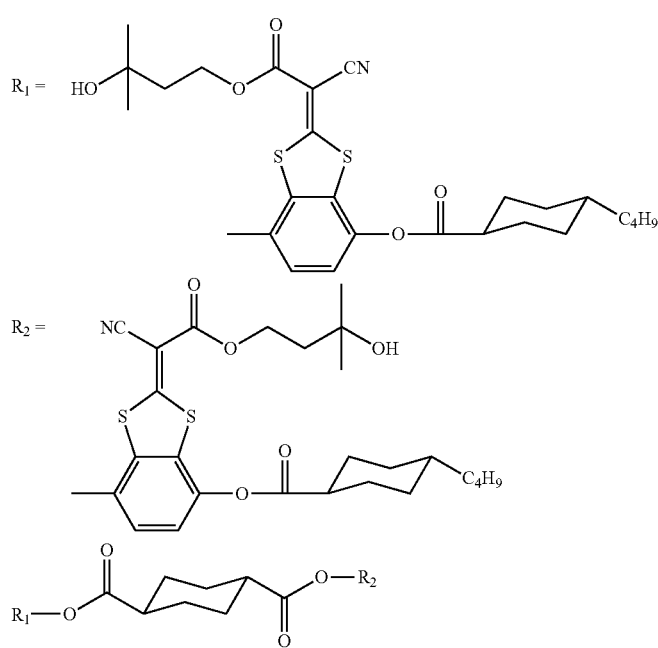

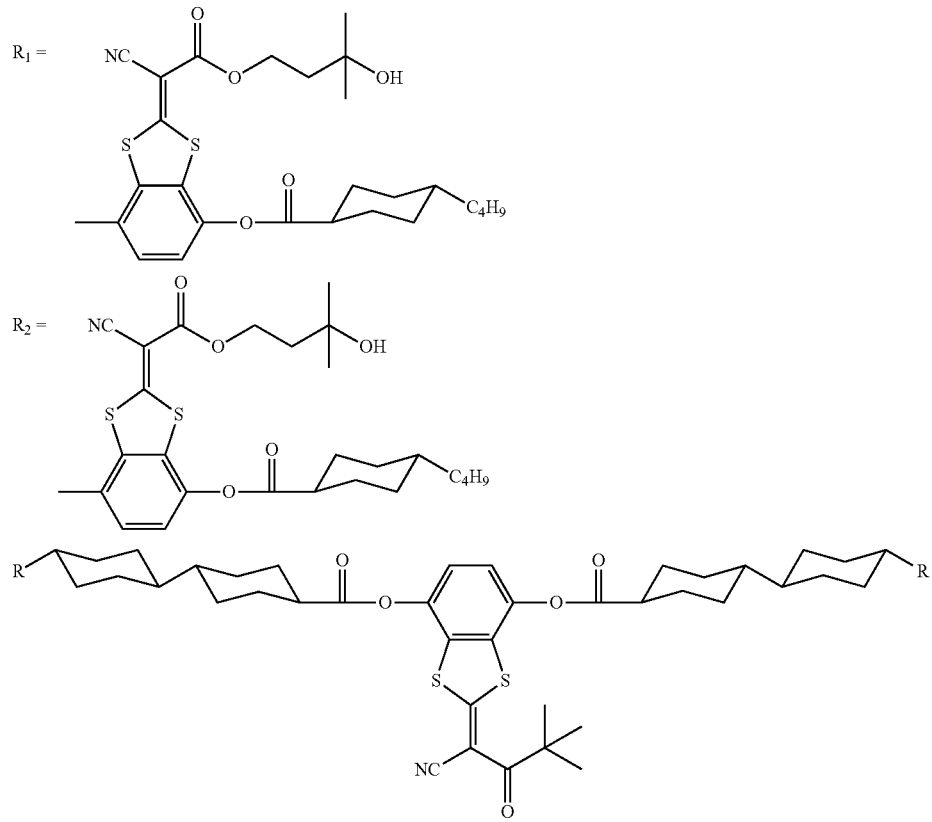
(165)
R = —C$_5$H$_{11}$
(166)
—C$_4$H$_9$
(167)
—C$_3$H$_7$
(168)
—C$_2$H$_5$
(169)
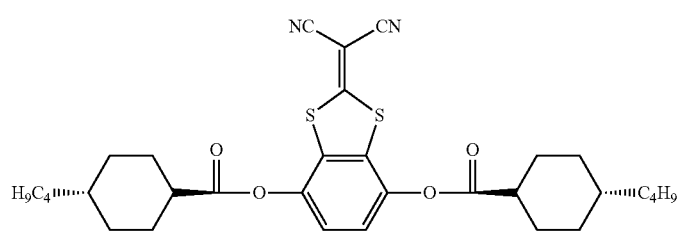
(170)
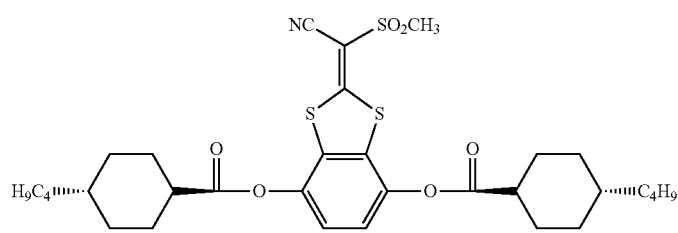
(171)

(172)
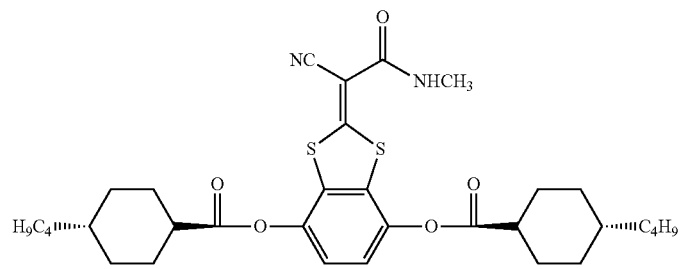
(173)
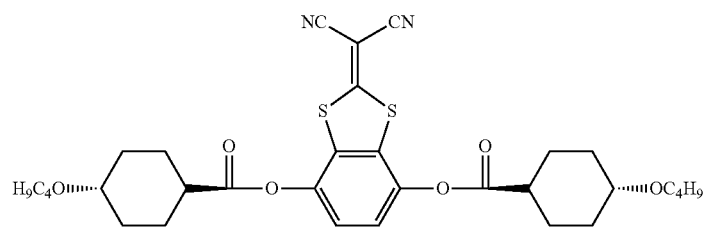
(174)
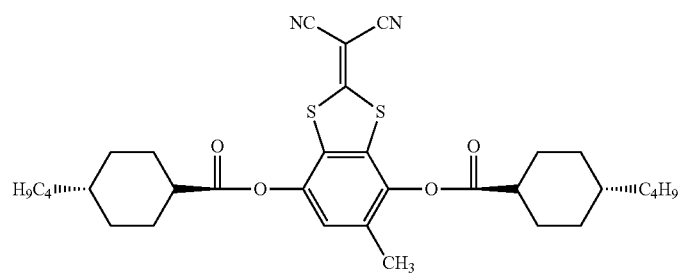
(175)
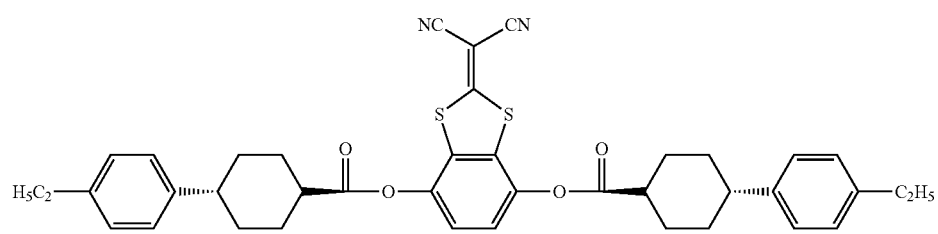
(176)
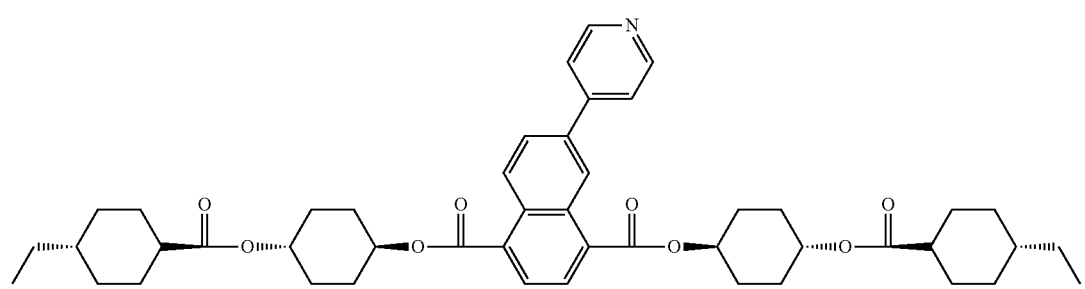

-continued
(177)
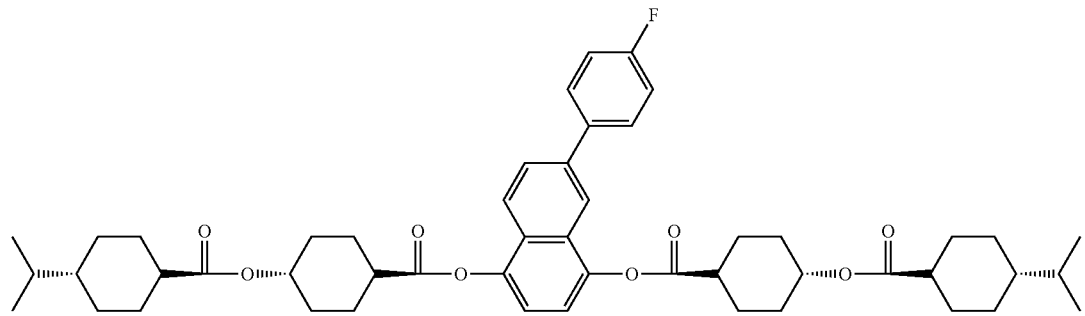
(178)
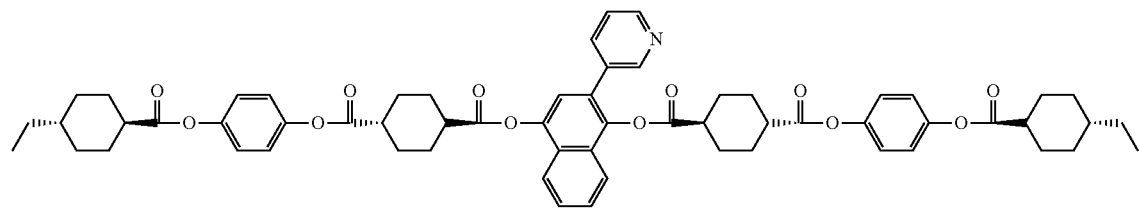
(179)
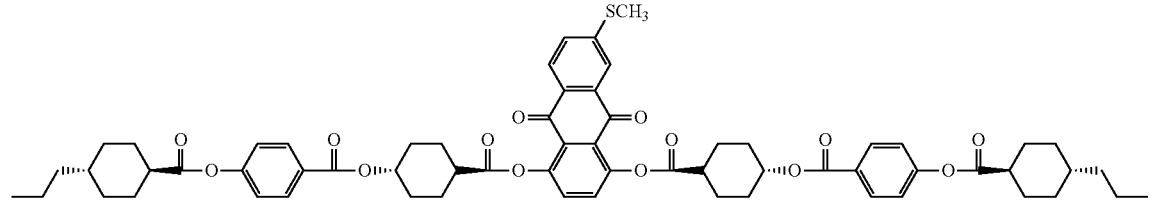
(180)
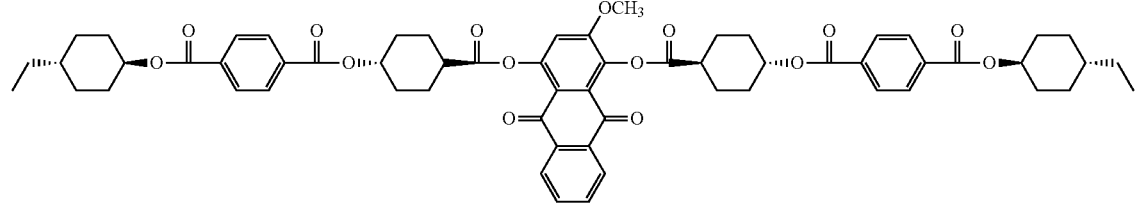
(181)
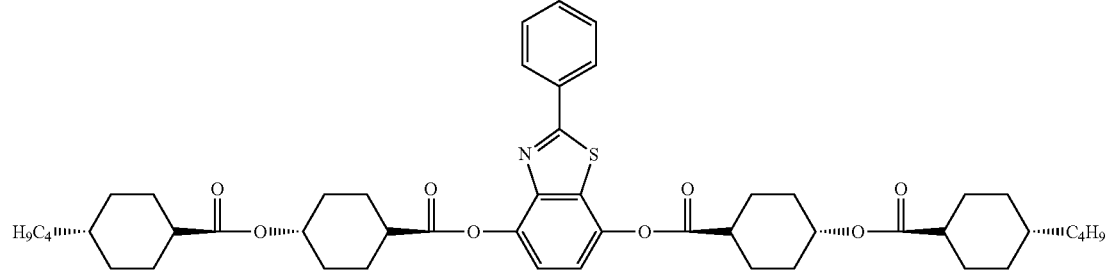
(182)
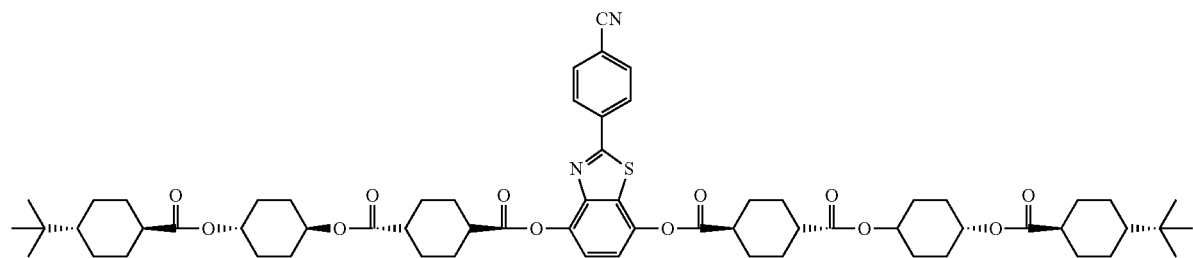

(183)
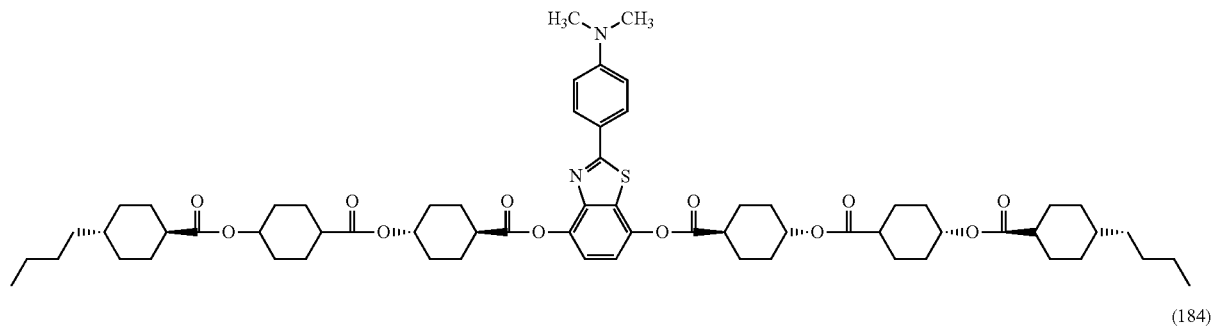
(184)
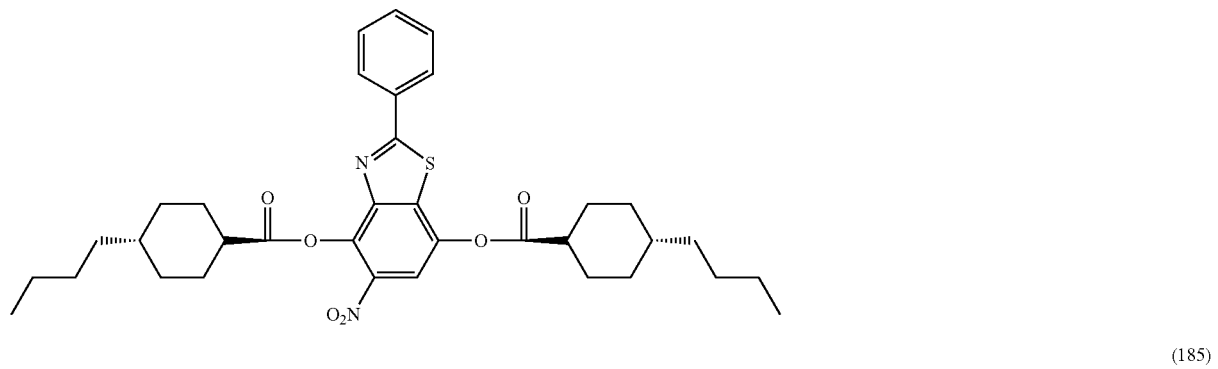
(185)
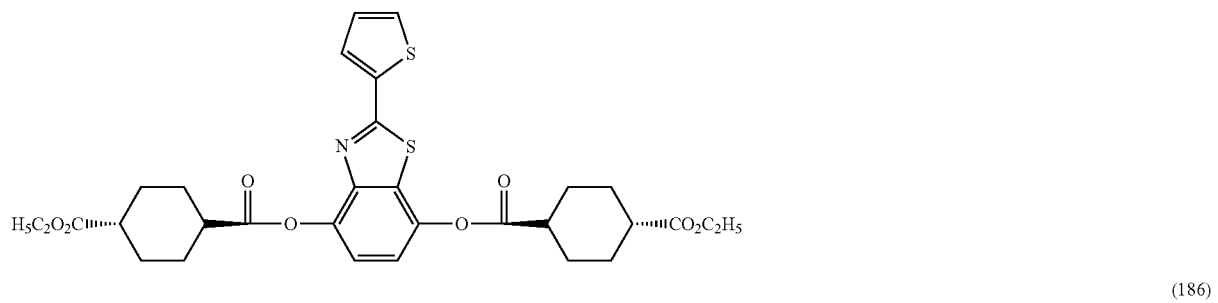
(186)
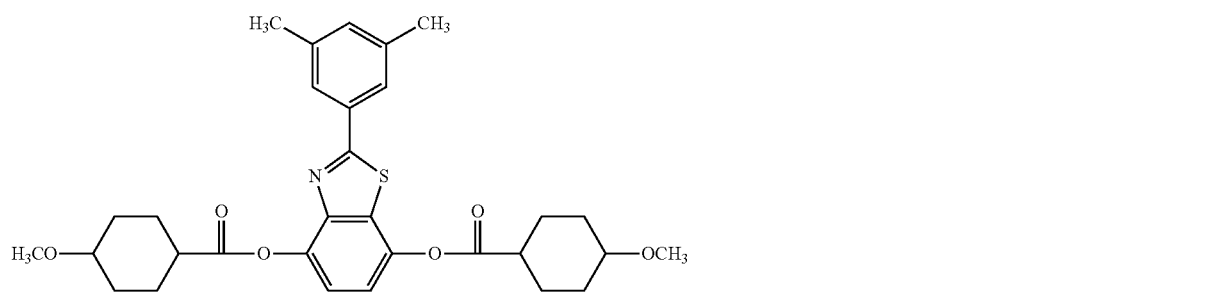
(187)
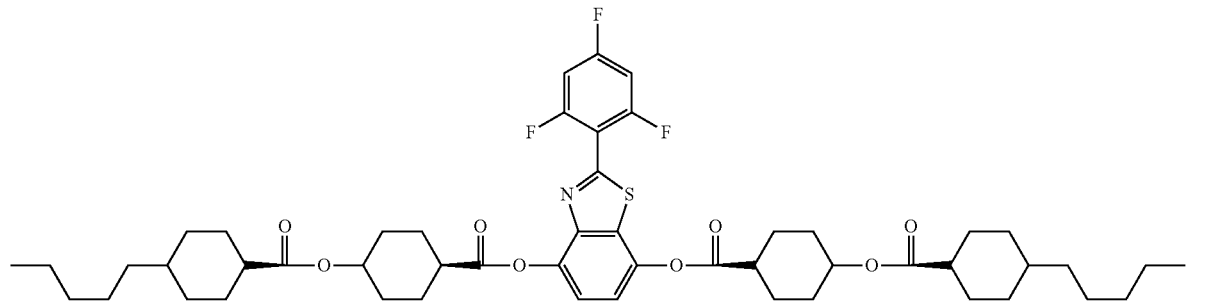

(188)
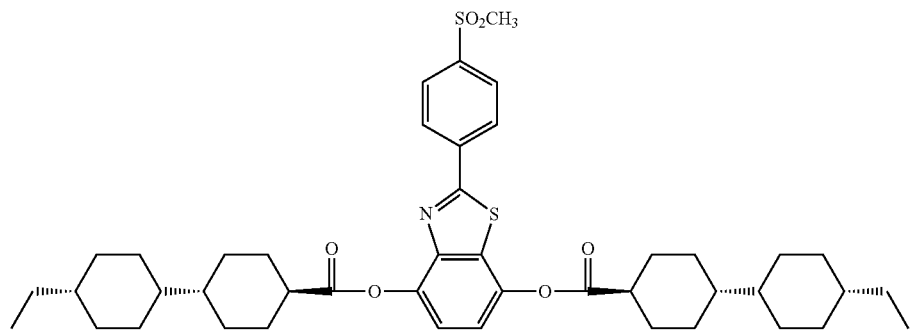
(189)
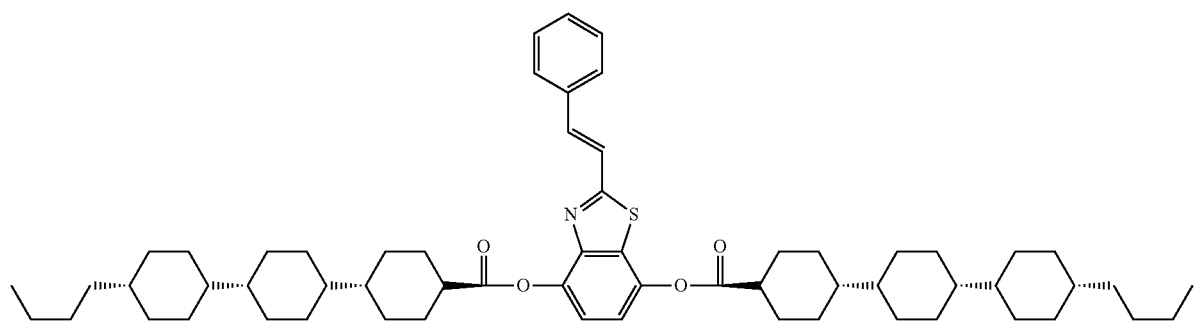
(190)
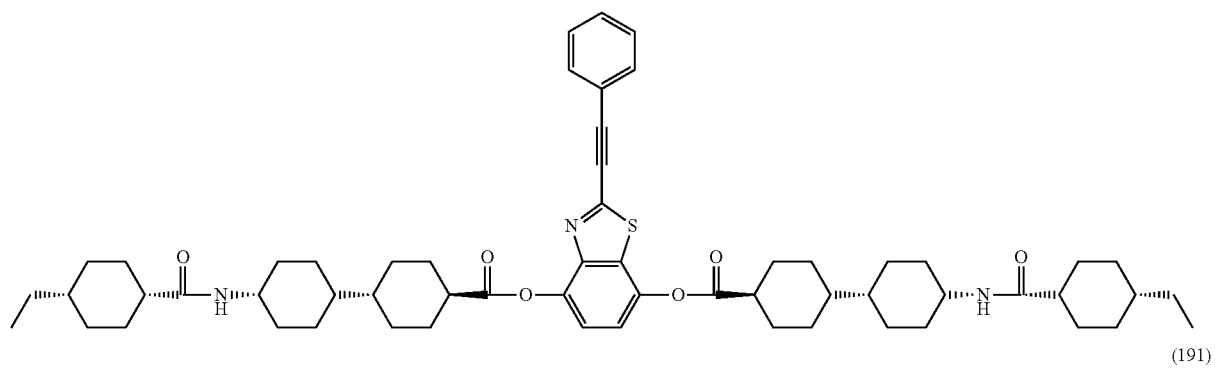
(191)
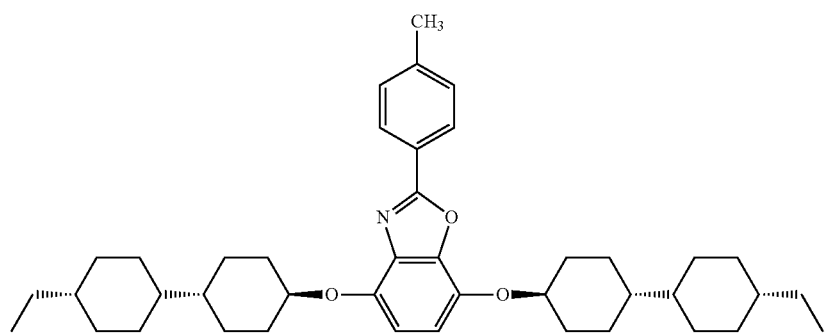

(192)
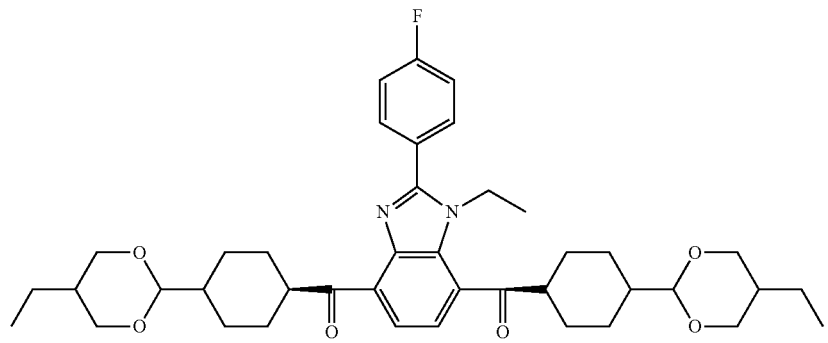
(193)
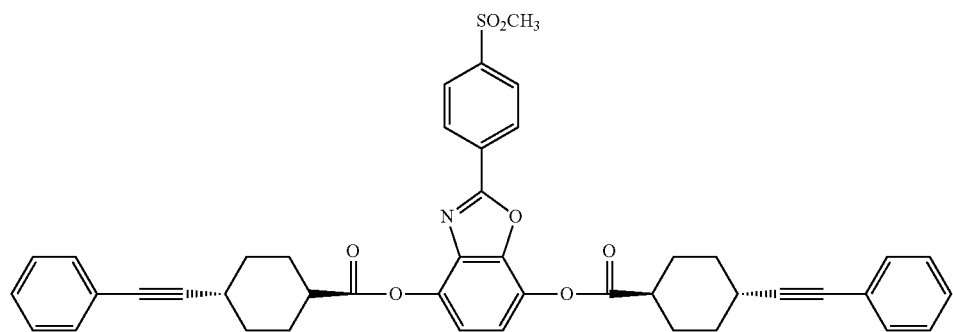
(194)
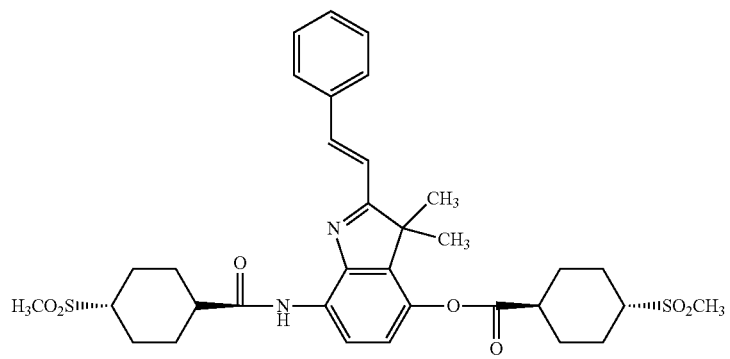
(195)
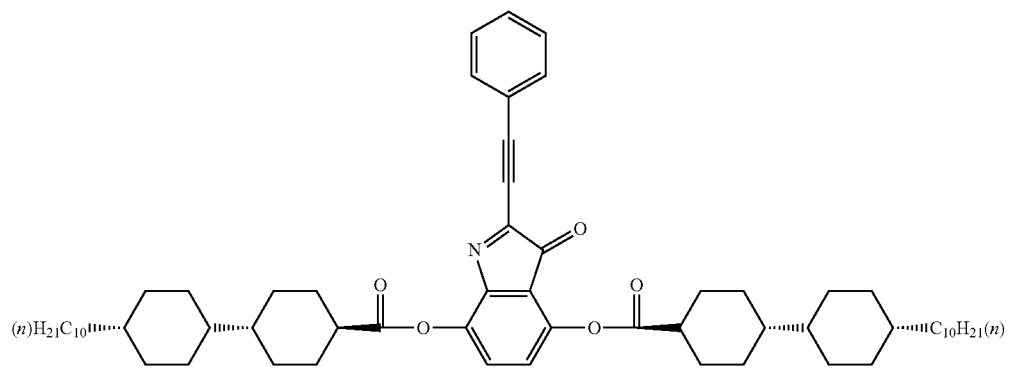

-continued
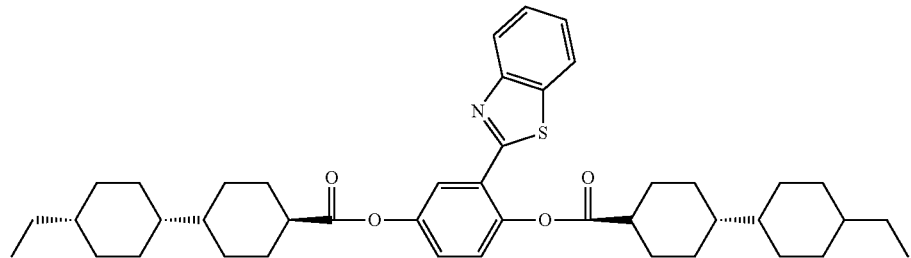
(196)
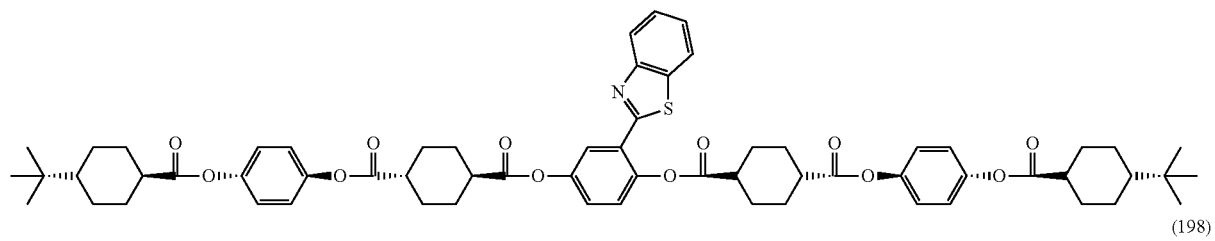
(197)
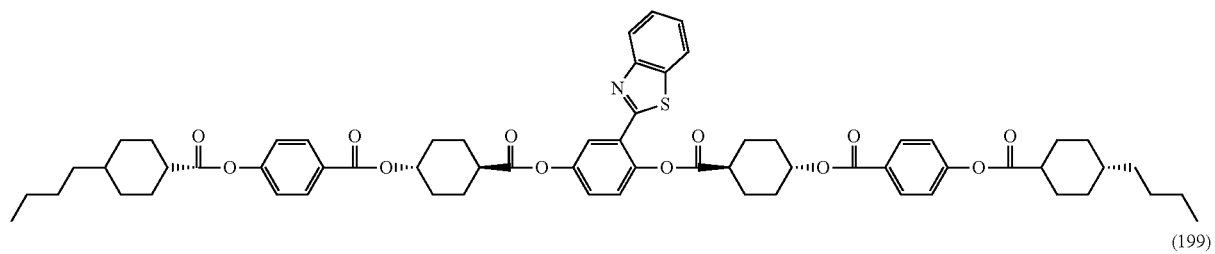
(198)
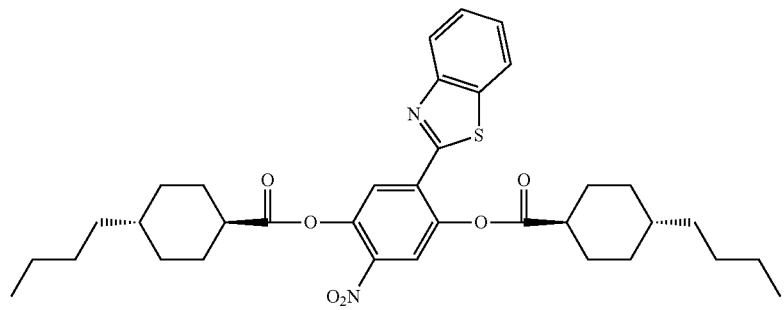
(199)
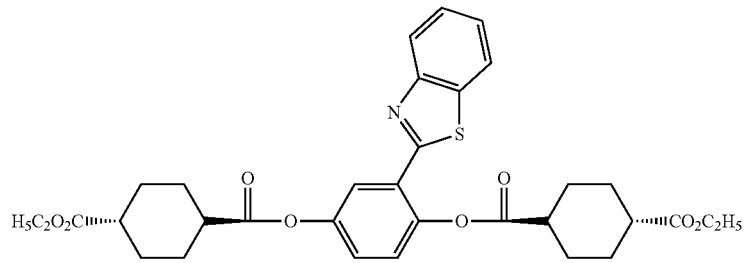
(200)
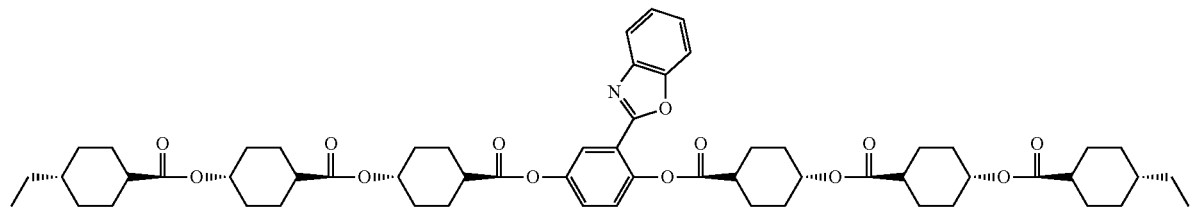
(201)

-continued
(202)
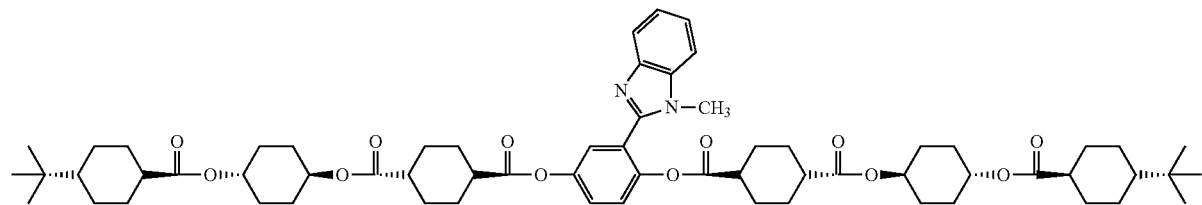
(203)
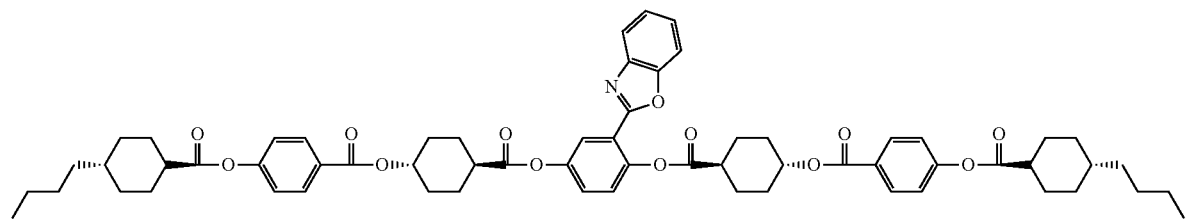
(204)
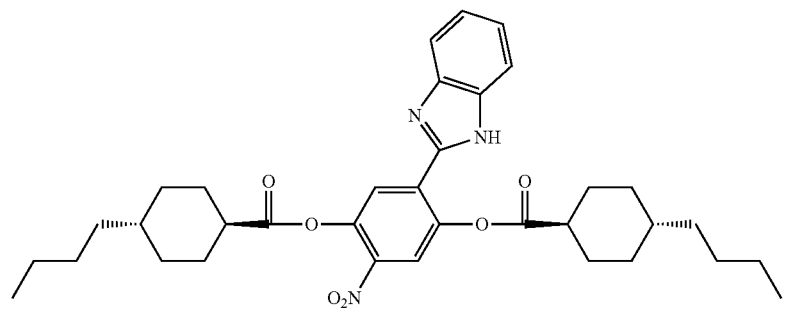
(205)
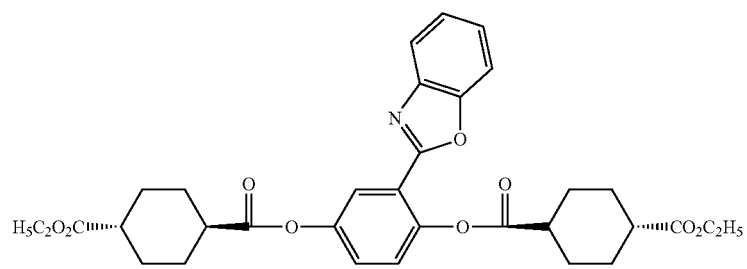
(206)
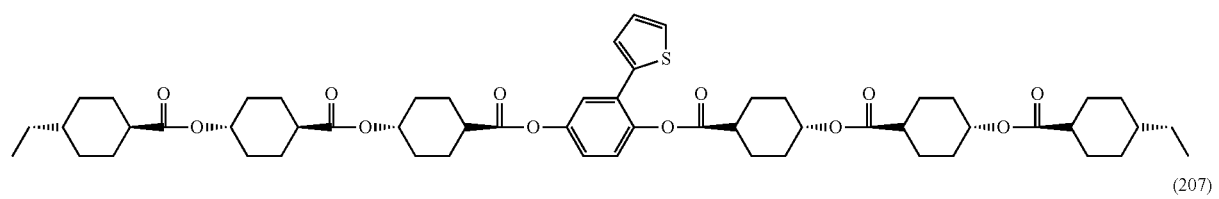
(207)
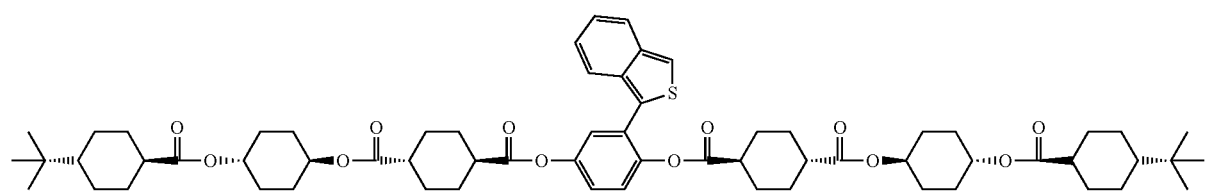

-continued
(208)
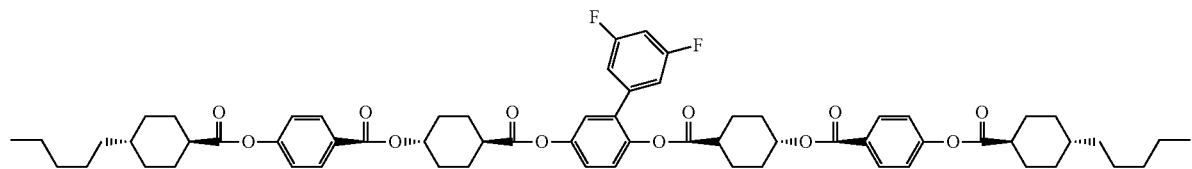
(209)
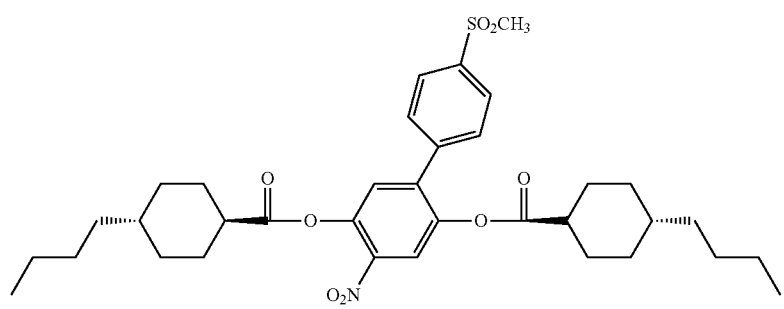
(210)
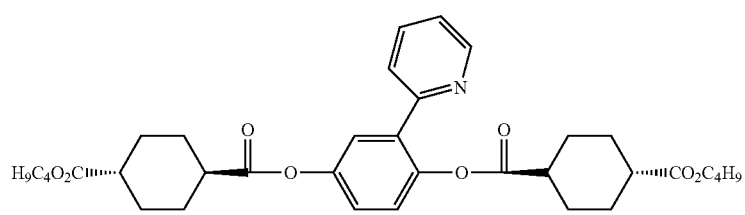
(211)
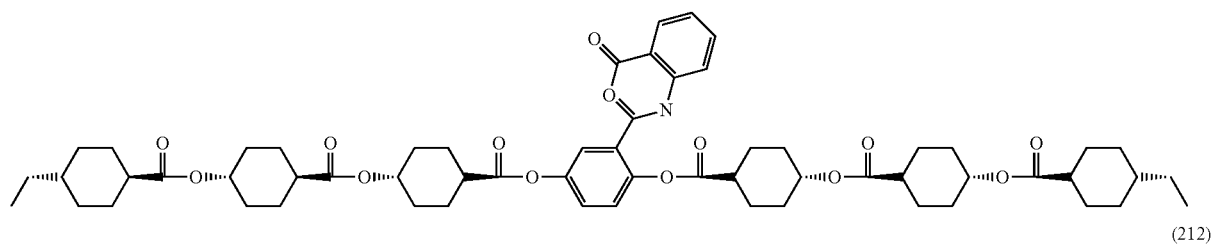
(212)
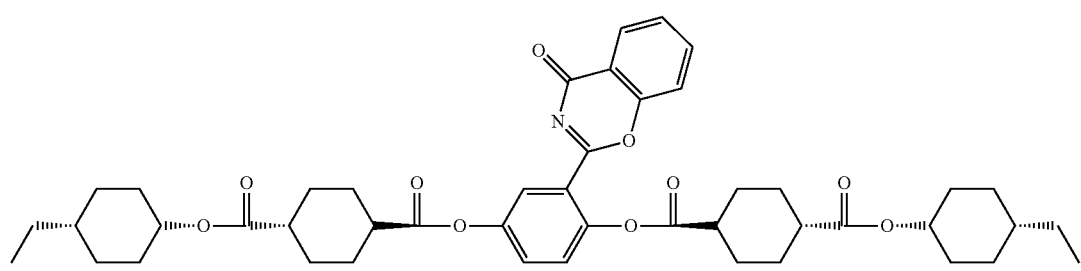
(213)
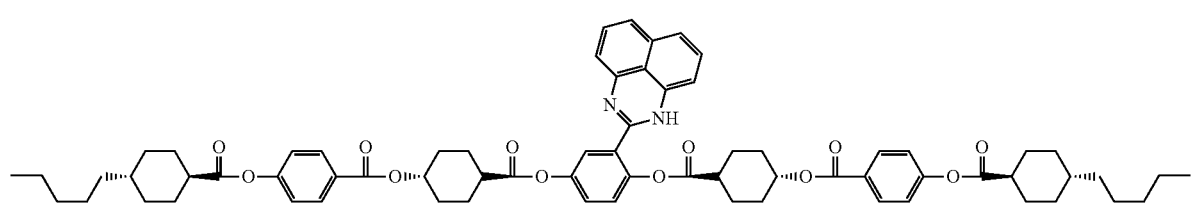

-continued
(214)
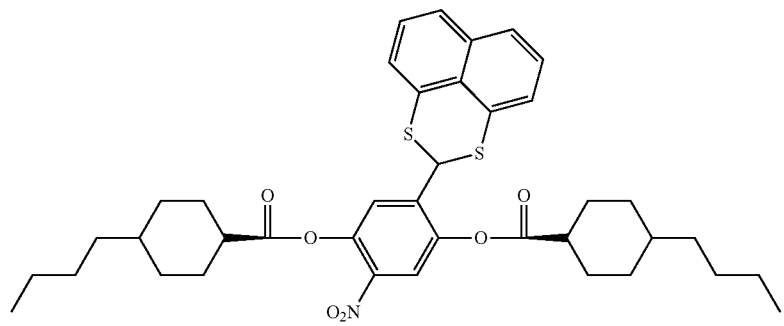
(215)
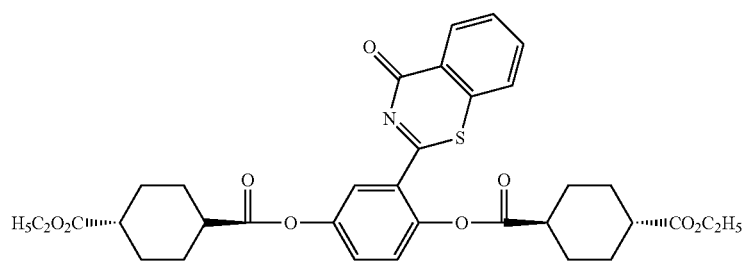
(216)
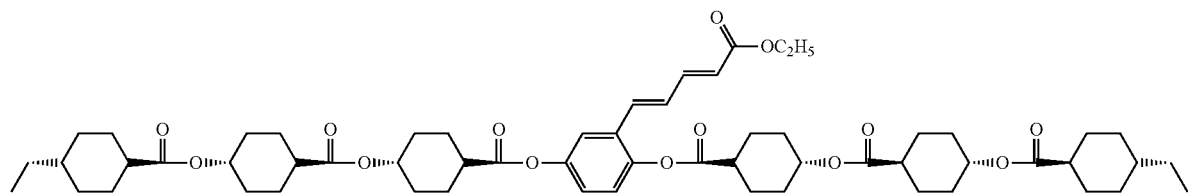
(217)
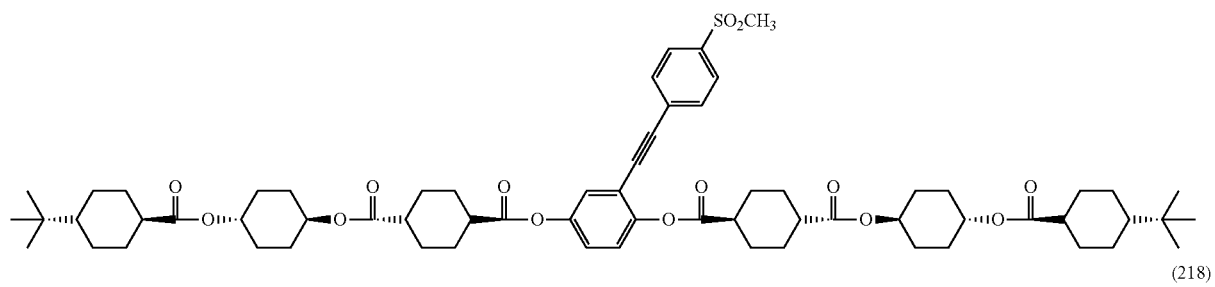
(218)
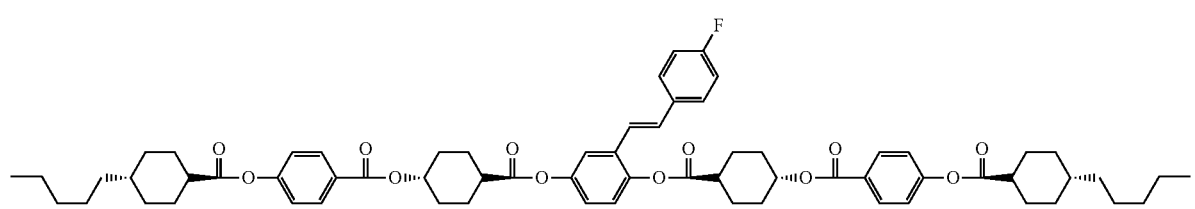

-continued
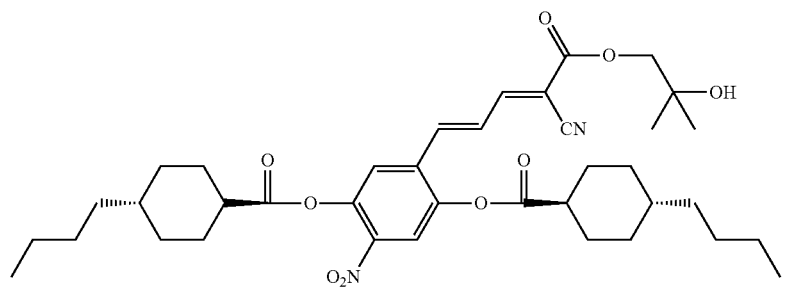
(219)
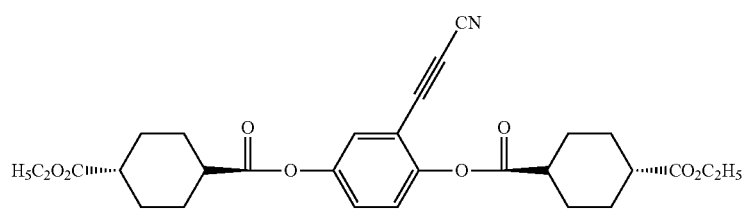
(220)
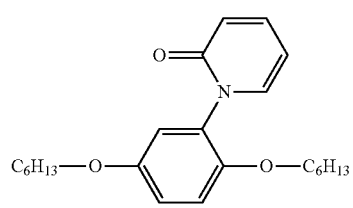
(221)
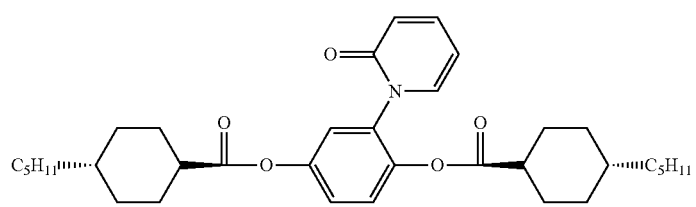
(222)
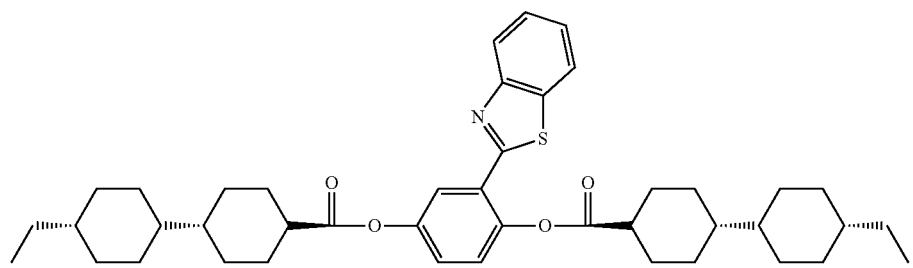
(223)
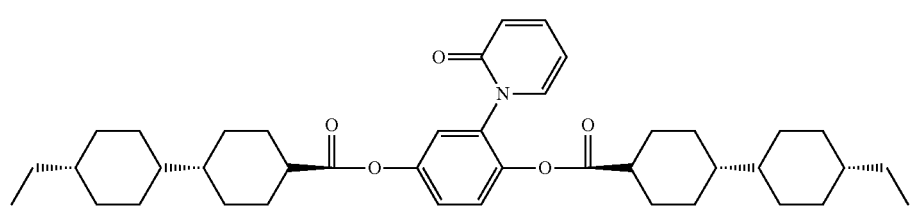
(224)

-continued
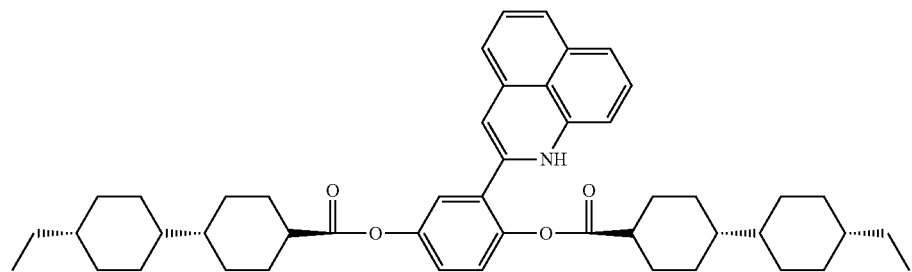
(225)
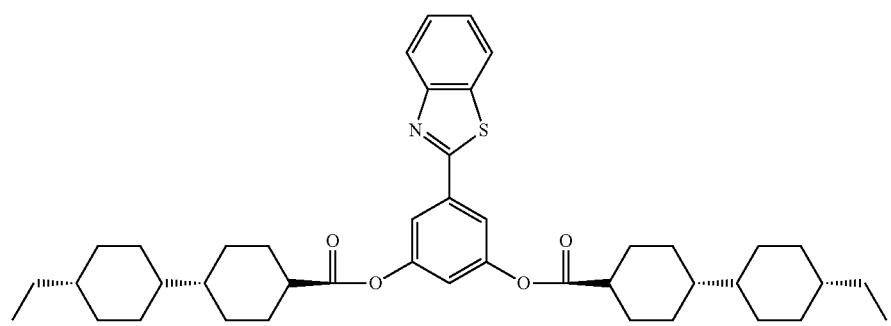
(226)
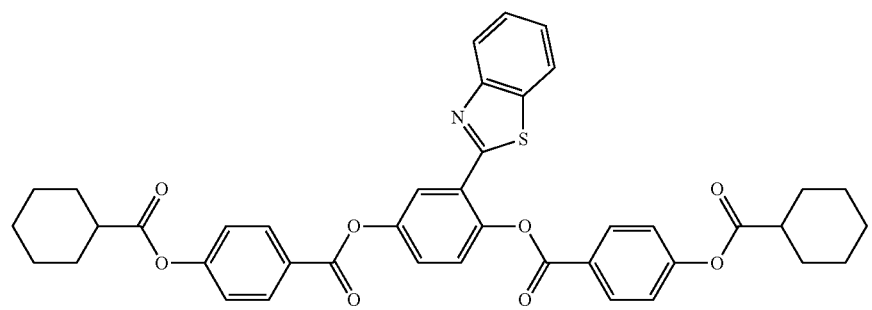
(227)
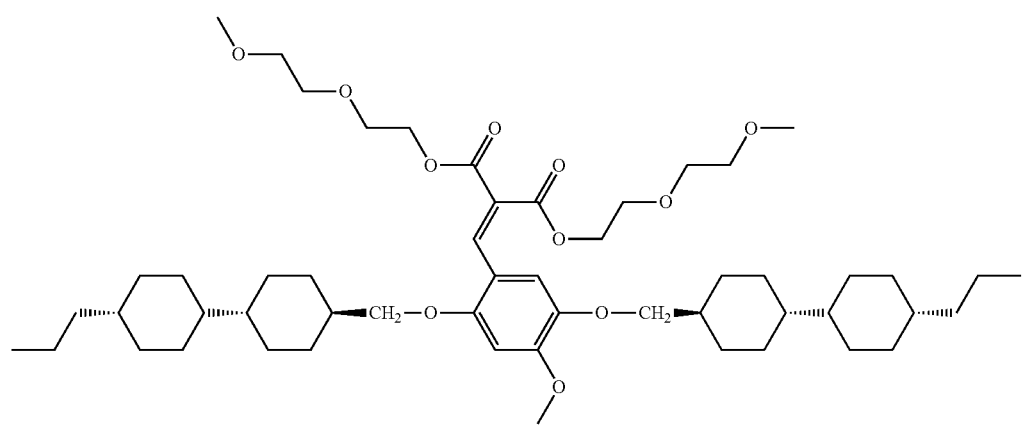

-continued

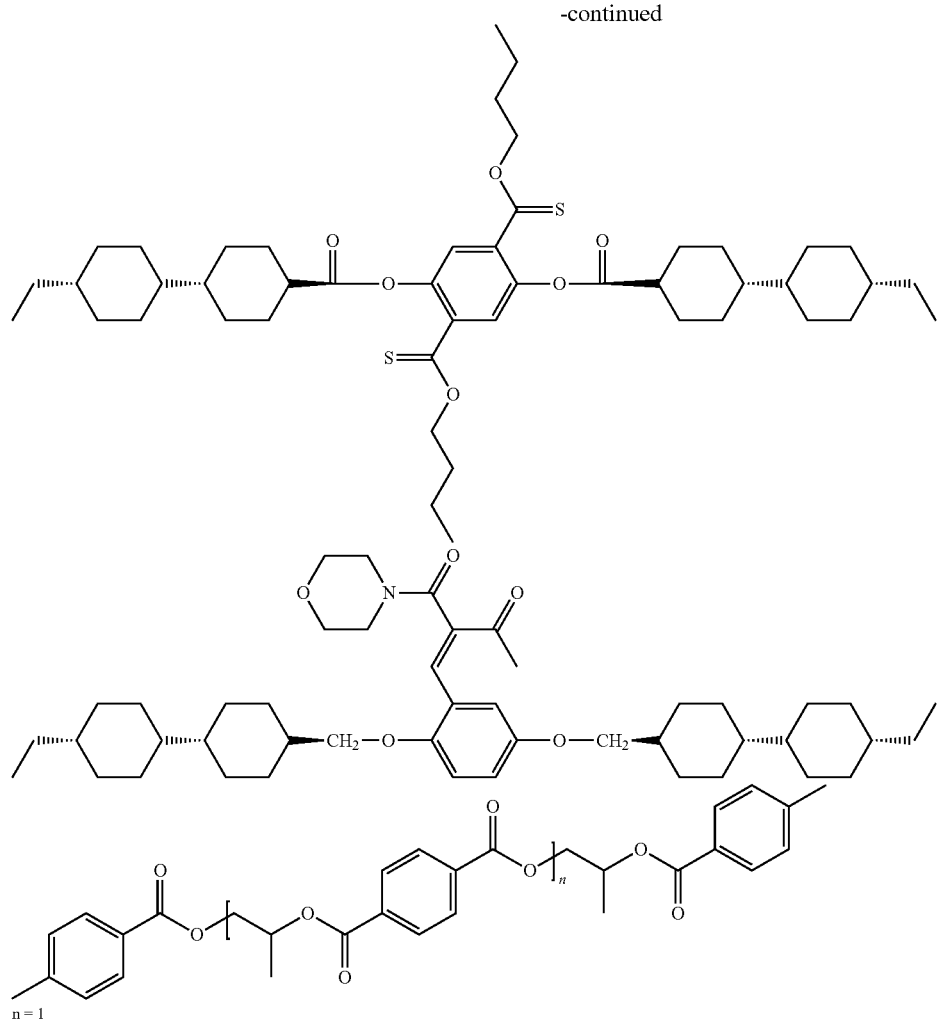

n = 1

Synthesis of the compound represented by the general formula (A) can be performed by using a known synthesis process. Specifically, the synthesis can be performed with reference to processes described, for example, in the Journal of Chemical Crystallography ((1997); 27(9); 512-526), JP 2010-31223A and JP 2008-107767A.

<Other Additives>

In addition to the aforementioned resin components and the optical performance regulating agent, various other additives may be contained in the retardation film according to this embodiment. For example, an organic solvent can be used to dissolve cellulose acylate therein to prepare a cellulose acylate solution or a dope. As the organic solvent, it is possible to primarily use a chlorine-based organic solvent and a non-chlorine-based organic solvent.

Examples of the chlorine-based organic solvent may include methylene chloride. Examples of the non-chlorine-based organic solvent may include methyl acetate, ethyl acetate, amyl acetate, acetone, tetrahydrofuran, 1,3-dioxolane, 1,4-dioxane, cyclohexanone, ethyl formate, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, and nitroethane. From the viewpoint of recent environmental problems, the non-chlorine-based organic solvent is preferably used.

In the case where such an organic solvent is used for the cellulose acylate, it is preferable to reduce an un-dissolved substance by using a heretofore-known dissolution method such as a dissolution method at normal temperature, a high-temperature dissolution method, a cooled dissolution method or a high-pressure dissolution method. While methylene chloride may be used for the cellulose acylate, it is preferable to use methyl acetate, ethyl acetate or acetone. Among them, methyl acetate is particularly preferred.

In this specification, an organic solvent having excellent solubility to the cellulose acylate will be referred to as "good solvent", and an organic solvent capable of exhibiting a main effect on dissolution and used in a significant amount for the dissolution is called a main (organic) solvent or a primary (organic) solvent.

Preferably, a dope to be used in film formation of the retardation film according to this embodiment contains alcohol having a carbon number of 1 to 4, in an amount ranging from 1 to 40 mass %, in addition to the organic solvent. The alcohol can act as a gelation-causing solvent for, when vaporization of the organic solvent is started after casting the dope on a metal support, and thereby a relative ratio of the alcohol component is increased, causing the dope film (web) to gelate, thereby making the web strong to facilitate peel-off of the web from the metal support, and also has a function of promoting dissolution of the cellulose acylate into a non-chlorine-based organic solvent, when a content ratio of the alcohol is small.

Examples of the alcohol having a carbon number of 1 to 4 include methanol, ethanol, n-propanol, iso-propanol, n-butanol, sec-butanol, and tert-butanol. Among them, it is preferable to use ethanol, in view of excellent stability to a dope, a relatively low boiling point, good dryability, etc. These alcohols do not have solubility to the cellulose acylate by itself, and therefore classified into a poor solvent.

Preferably, a concentration of the cellulose acylate in the dope is in the range of 15 to 30 mass %, and a viscosity of the dope is adjusted to fall within the range of 100 to 500 Pa·s, in view of obtaining excellent film surface quality.

Examples of an additive addable into the dope include a plasticizer, an UV absorbent, an antioxidant, an anti-degradation agent, a peeling aid, a surfactant, a dye and fine particles. In this embodiment, one or more of the additives, except for the fine particles, may be added during preparation of a cellulose acylate solution, or may be added during preparation of a particle dispersion solution. As regards to a polarizing plate for use in an image display device, it is preferable to add a plasticizer for imparting heat resistance and humidity resistance, an antioxidant, a UV absorber, etc.

As additive for the retardation film according to this embodiment, various types of plasticizers may be used in combination in order to improve fluidity and flexibility of a composition. Examples of the plasticizers include a phthalate ester-based plasticizer, a fatty acid ester-based plasticizer, a trimellitic acid ester-based plasticizer, a phosphate ester-based plasticizer, a polyester-based plasticizer, a sugar ester-based plasticizer, an epoxy-based plasticizer, and a polyalcohol ester-based plasticizer. According to the intended purpose, these plasticizers may be selectively used or used in combination, to cope with a wide range of application.

The additive is not particularly limited, but it is preferable to use an aromatic terminal ester-based compound and a compound having a triazine ring. The aromatic terminal ester-based compound may be either of an oligoester-based compound and a polyester-based compound, wherein a molecular weight thereof is preferably in the range of 100 to 10,000, more preferably, in the range of 350 to 3000. It is possible to use a type having an acid value of 1.5 mg KOH/g or less and a hydroxy value of 25 mg KOH/g or less, more preferably, an acid value of 0.5 mg KOH/g or less and a hydroxy value of 15 mg KOH/g or less.

Further, with respect to 100 mass parts of the retardation film, an aromatic compound having at least three aromatic rings may be added preferably in an amount of 0.5 to 30 mass parts, more preferably, in an amount of 2.0 to 15 mass parts.

Although one example of each of the various additives usable in this embodiment will be given below, the additives are not limited thereto.

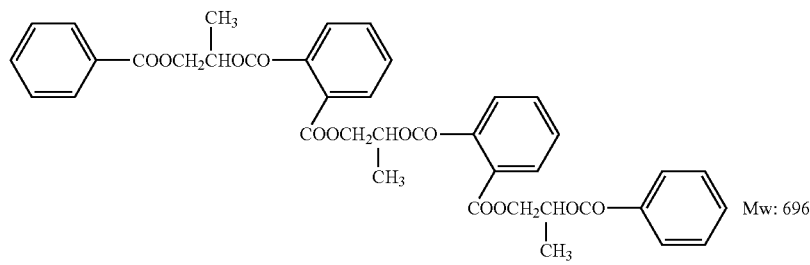

2-1

Mw: 696

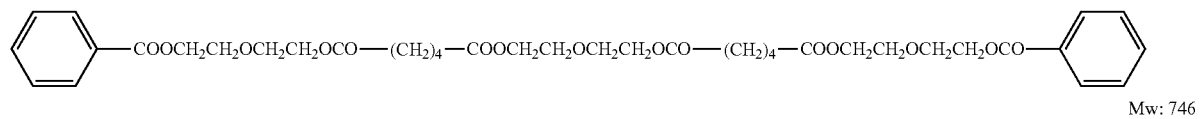

2-2

Mw: 746

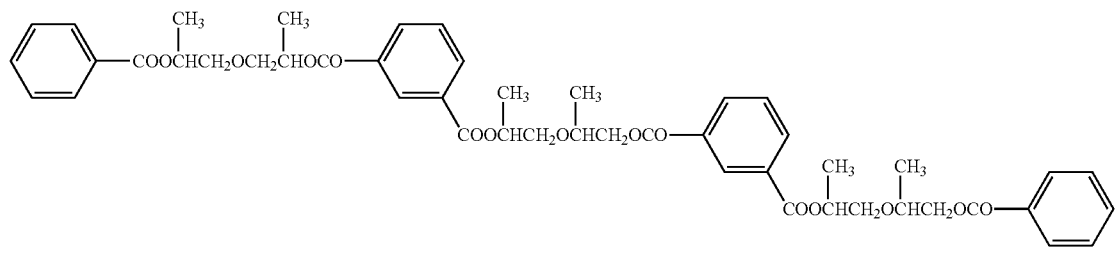

2-3

Mw: 830

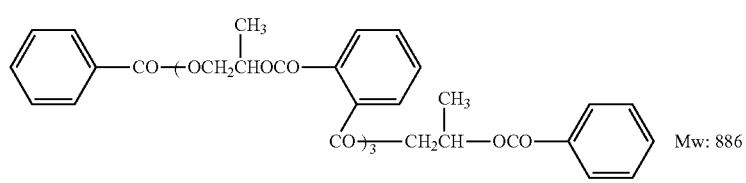

2-4

Mw: 886

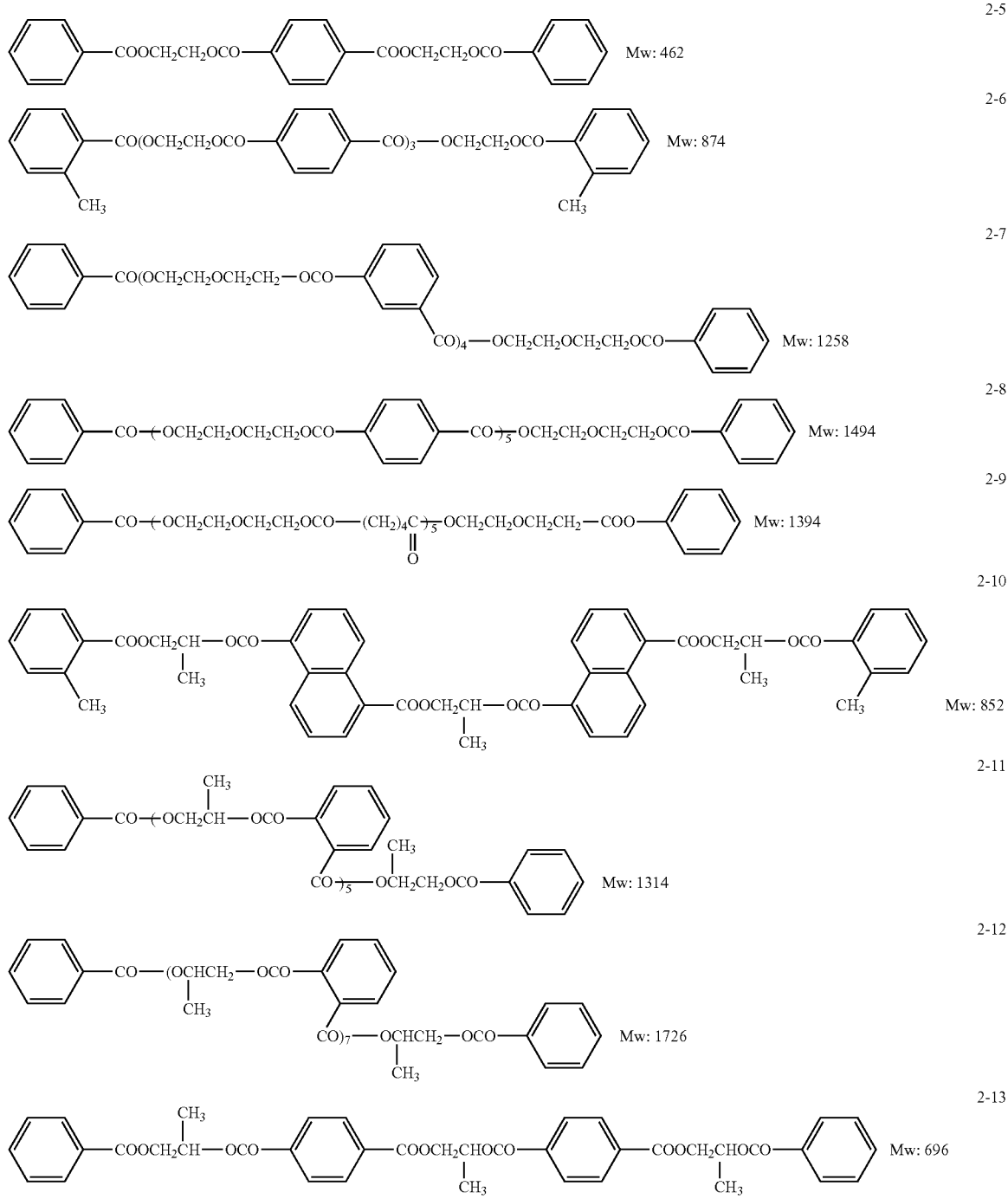

A polyalcohol ester to be preferably used in this embodiment consists of an ester of aliphatic polyalcohol having a valence of two or more, and monocarboxylic acid, wherein it preferably has an aromatic ring or a cycloalkyl ring in a molecule.

The polyalcohol to be used in this embodiment is represented by the following general formula (a):

$R_1$—(OH)$_n$ (a)

In the above general formula (a), $R_1$ represents an organic group having a valence of n, and n represents an integer of two or more. The OH group represents an alcoholic or phenolic hydroxy (hydroxyl) group.

Examples of preferred polyalcohol may include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol. Among them, triethylene glycol, tetraethylene glycol, dipropylene glycol, tripropylene glycol, sorbitol, trimethylolpropane and xylitol are preferred.

The monocarboxylic acid to be used in the polyalcohol ester is not particularly limited, but it is possible to use heretofore-known monocarboxylic acid such as aliphatic monocarboxylic acid, alicyclic monocarboxylic acid or aromatic monocarboxylic acid.

Alicyclic monocarboxylic acid or aromatic monocarboxylic acid may be used in the retardation film according to this embodiment to improve moisture permeability and retention capability. Although examples of preferred monocarboxylic acid may include the following, the monocarboxylic acid usable in this embodiment is not limited thereto.

As the aliphatic monocarboxylic acid, it is preferable to use a straight-chain or side-chain fatty acid having a carbon number of 1 to 32. The carbon number is more preferably 1 to 20, further preferably, 1 to 10. It is preferable to use acetic acid because it can improve compatibility with respect to the cellulose acylate, and it is also preferable to use a mixture of acetic acid and another carboxylic acid.

Examples of a preferable aliphatic monocarboxylic acid may include: saturated fatty acids, such as acetic acid, propionic acid, butylic acid, valeric acid, caproic acid, enantic acid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanic acid, arachic acid, behenic acid, lignocelic acid, cerotic acid, heptacosanic acid, montanic acid, melisic acid, and lacceric acid; and unsaturated fatty acids, such as undecylenic acid, oleic acid, sorbic acid, linolic acid, linolenic acid, and arachidonic acid.

Examples of preferable alicyclic monocarboxylic acid include cyclopentene carboxylic acid, cyclohexane carboxylic acid, cyclooctane carboxylic acid, and derivatives thereof.

Examples of preferable aromatic monocarboxylic acid include: benzoic acid; a type obtained by introducing an alkyl group into a benzene ring of benzoic acid such as toluic acid; an aromatic monocarboxylic acid having two or more benzene rings of biphenylcarboxylic acid, naphthalene carboxylic acid, tetralin carboxylic acid or the like; and derivatives thereof. Among them, benzoic acid is particularly preferred.

The molecular weight of the polyalcohol ester is not particularly limited, but is set preferably in the range of 300 to 1,500, more preferably, in the range of 350 to 750, in view of low volatility, and excellent moisture permeability and compatibility with respect to the cellulose acylate.

The carboxylic acid to be used in the polyhydric alcohol ester may be a single type or may be a mixture of two or more types. The OH group in the polyhydric alcohol may be entirely esterified, or a part of the OH group may be left intact.

Although specific compounds of the polyhydric alcohol ester will be given below, the polyhydric alcohol esters usable in this embodiment is not limited thereto.

1

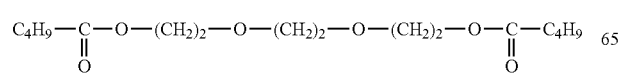

2

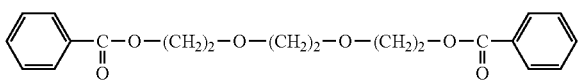

3

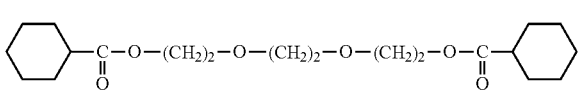

4

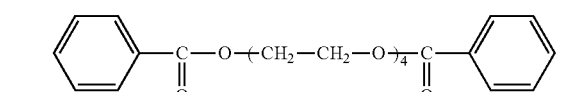

5

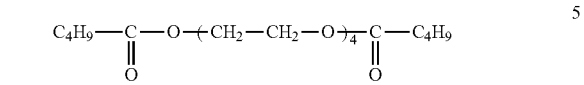

6

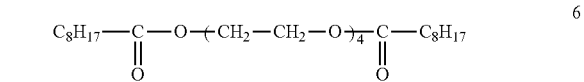

7

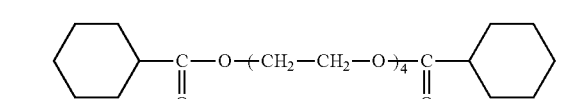

8

9

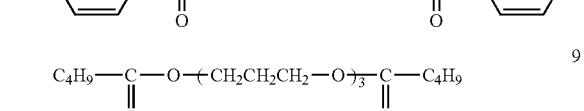

10

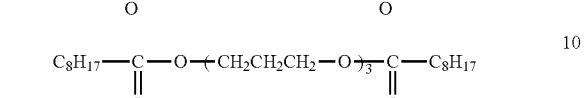

11

12

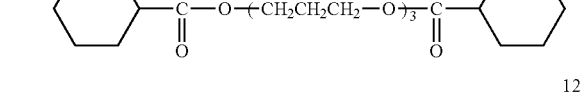

13

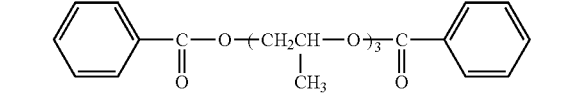

14

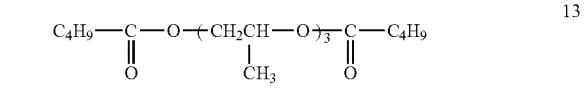

15

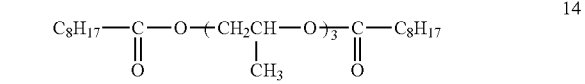

16
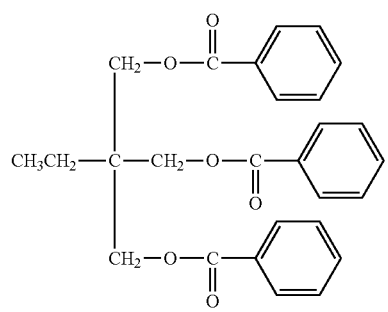
17
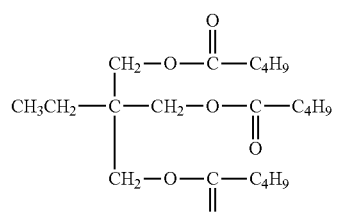
18
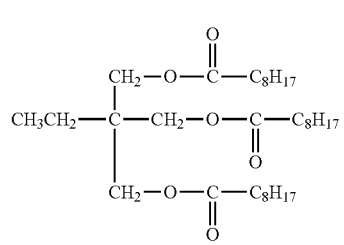
19
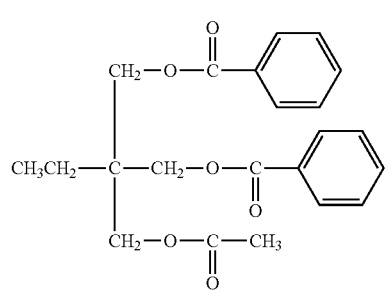
20
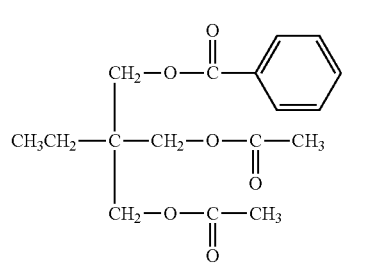
21
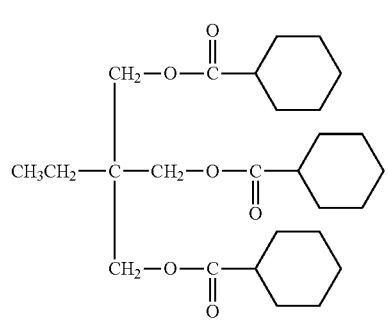
22
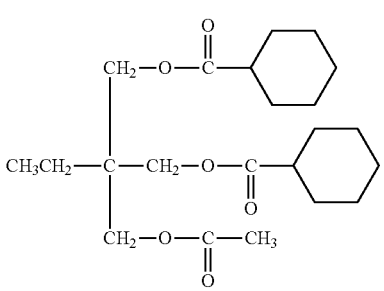
23
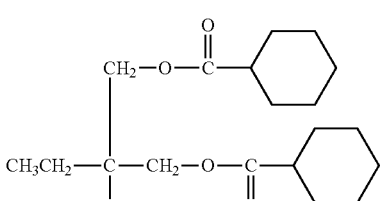
24
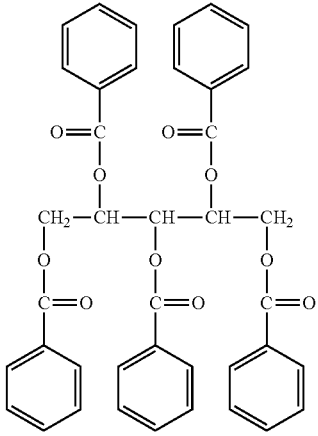
25
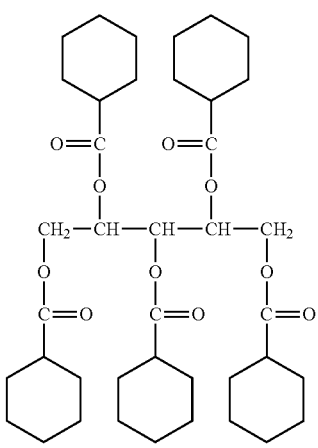

26

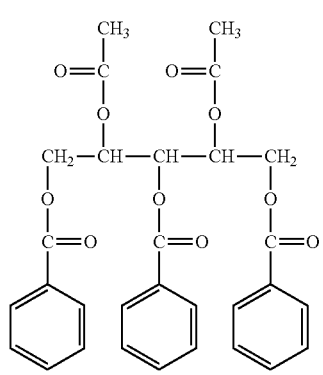

27

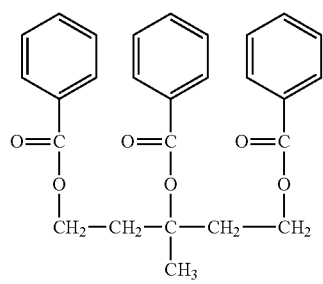

28

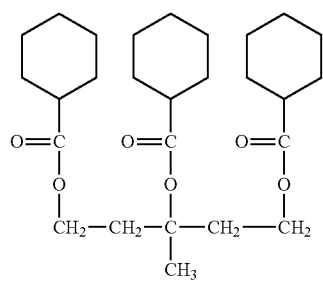

29

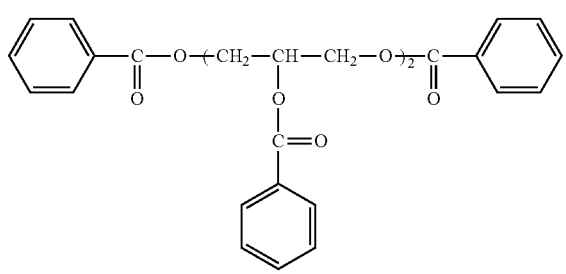

30

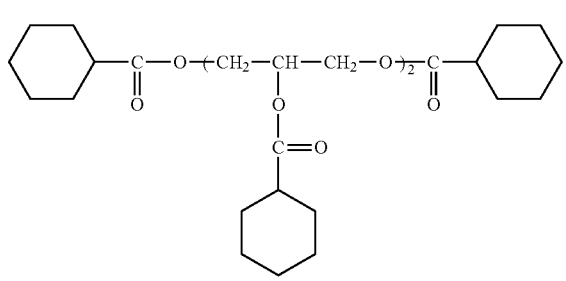

31

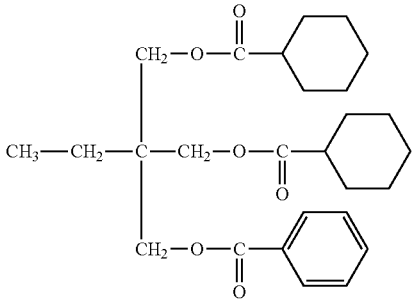

32

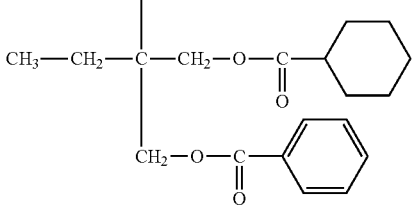

33

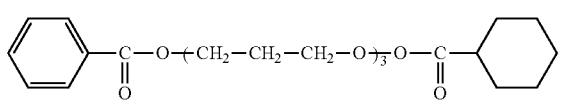

34

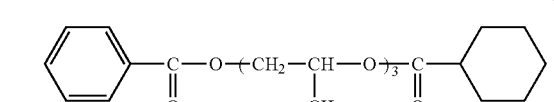

35

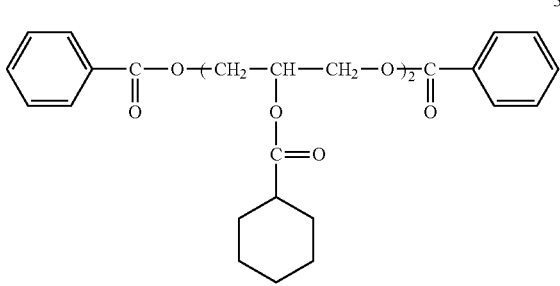

In this embodiment, a compound having a triazine ring is preferably a disk-shaped compound, in view of developing retardation while reducing a water content, in the retardation film, wherein a molecular weight thereof is preferably 300 to 2,000. In this embodiment, a boiling point of the disk-shaped compound is preferably 260° C. or more. The boiling point can be measured by a commercially-available measuring apparatus (e.g., TG/DTA100, produced by Seiko Instruments Inc.).

Although specific examples of the triazine ring-containing compound suitably usable in this embodiment will be given below, the triazine ring-containing compound usable in this embodiment is not limited thereto.

TA1-1 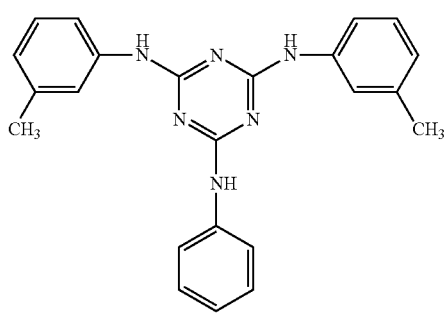
TA1-2 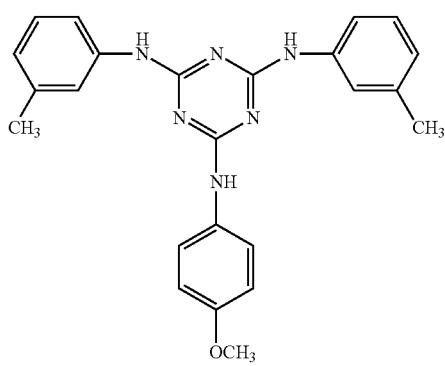
TA1-3 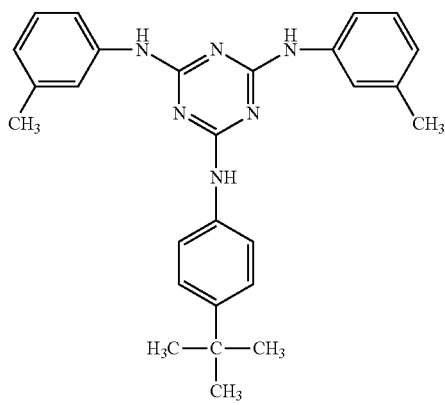
TA1-4 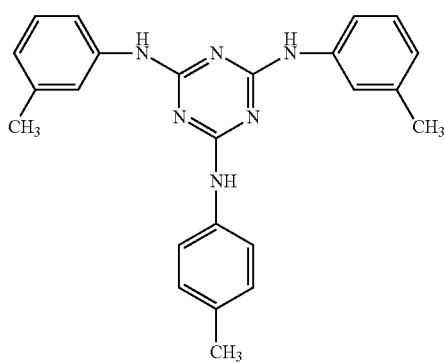
-continued
TA1-5 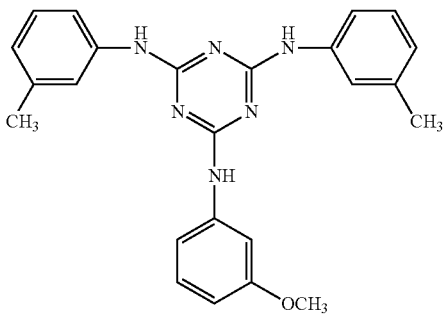
TA1-6 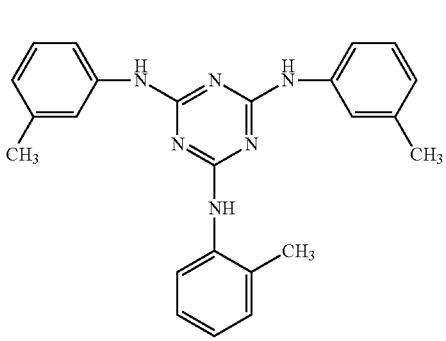
TA1-7 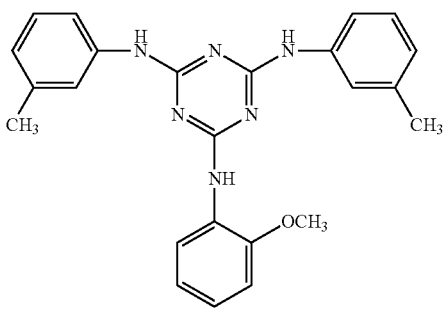
TA1-8 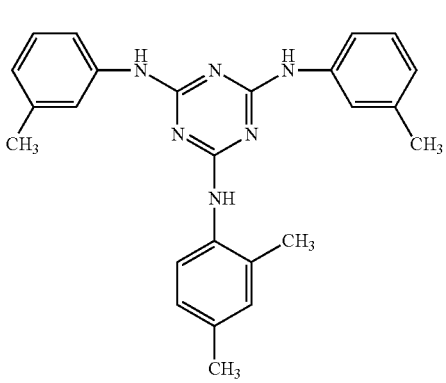

-continued
TA1-9
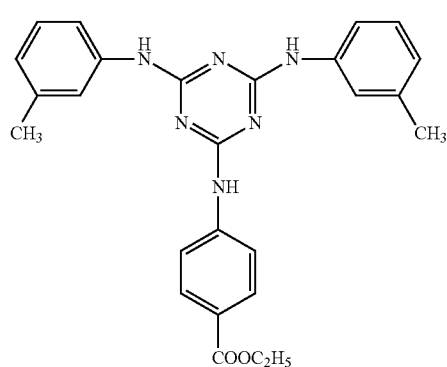
TA1-10
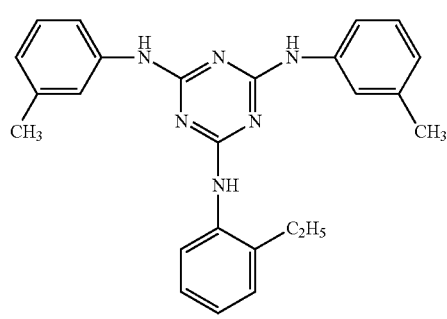
TA1-11
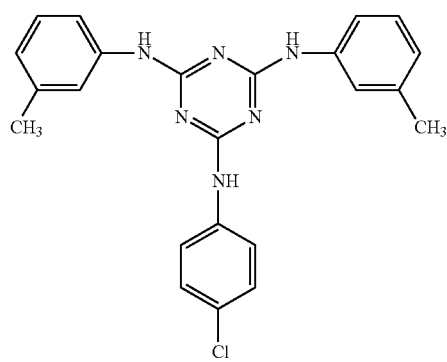
TA1-12
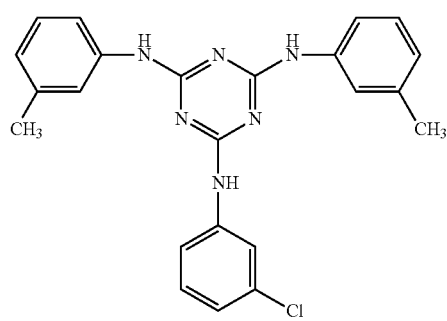
TA1-13
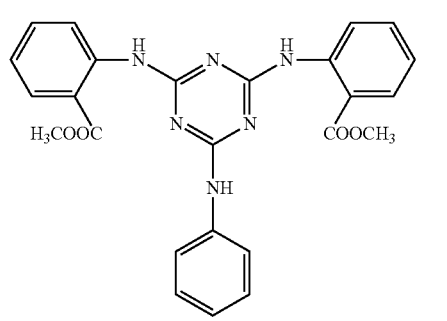
-continued
TA1-14
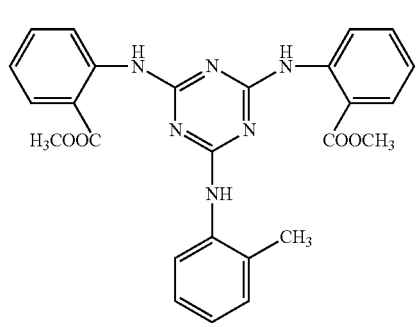
TA1-15
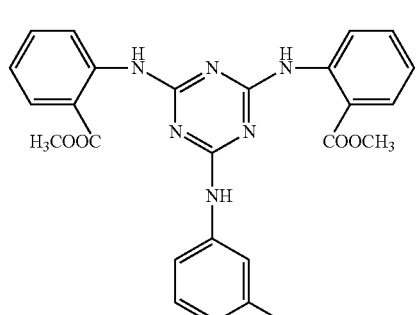
TA1-16
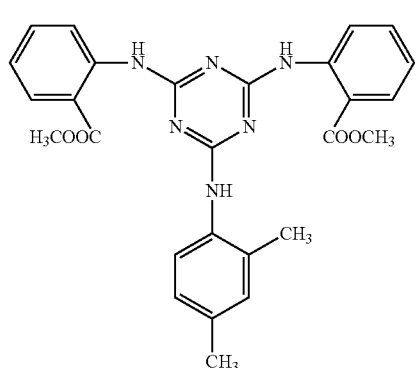
TA1-17
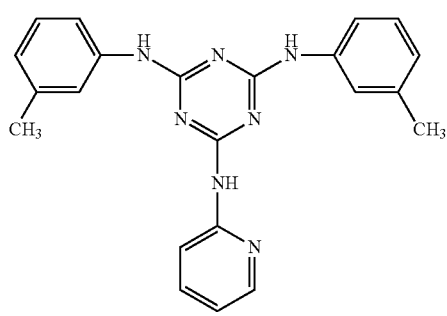
TA1-18
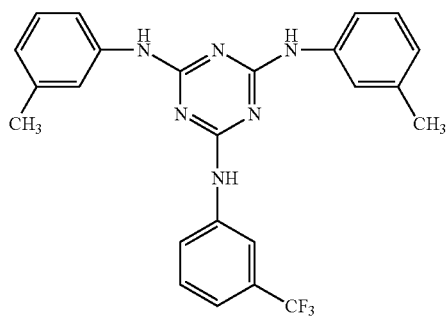

TA1-19
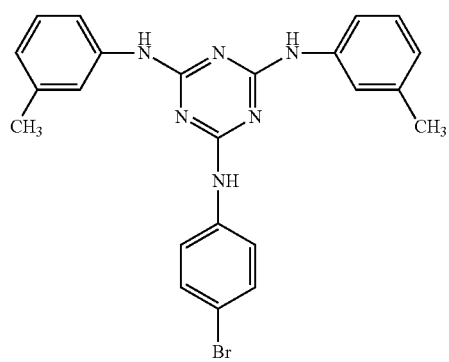
TA1-20
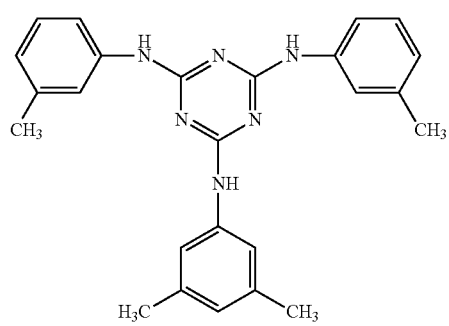
TA1-21
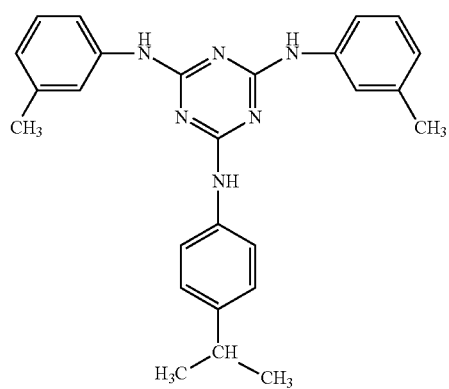
TA1-22
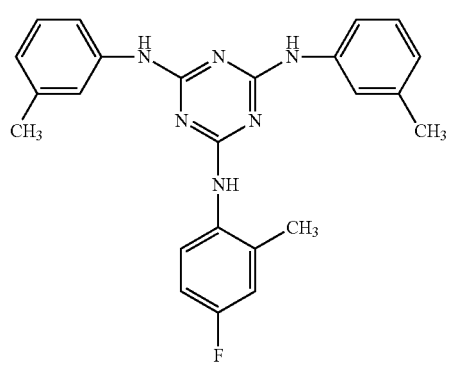
TA1-23
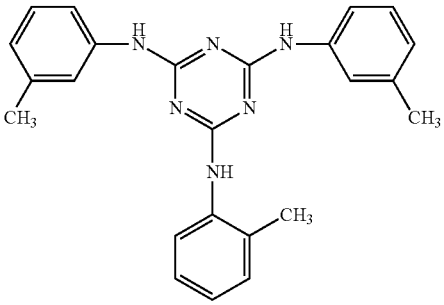
TA1-24
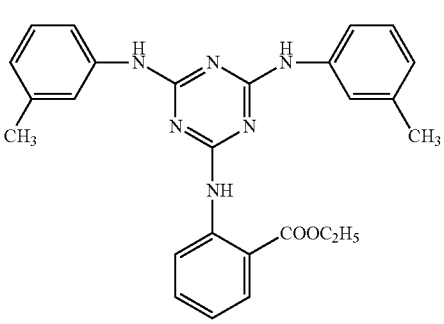
TA1-25
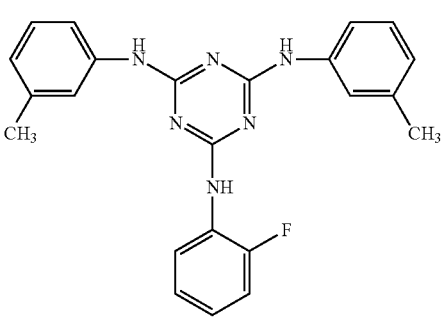
TA1-26
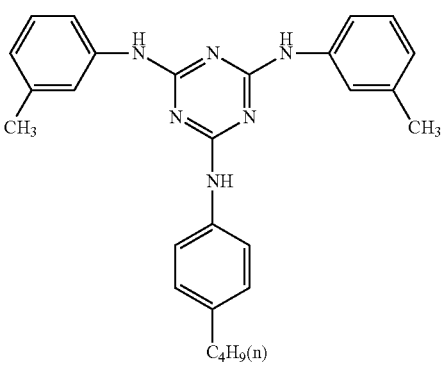
TA1-27
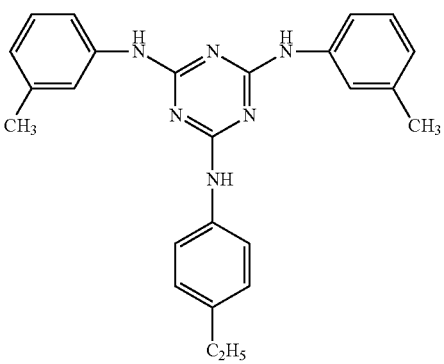

TA1-28
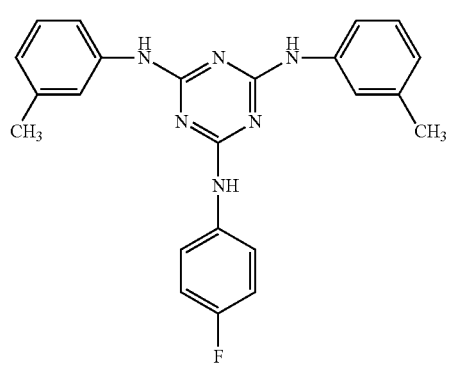
TA1-29
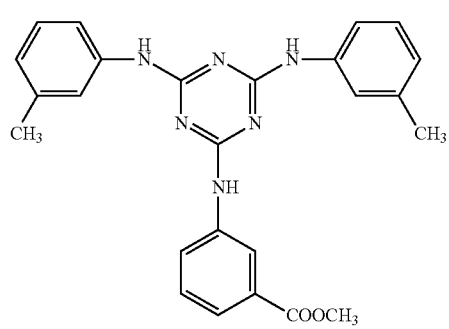
TA1-30
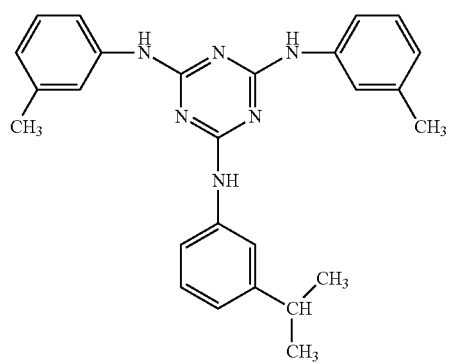
TA1-31
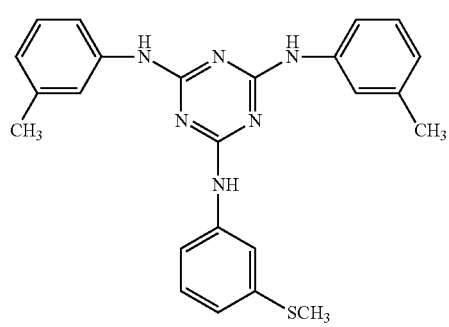
TA1-32
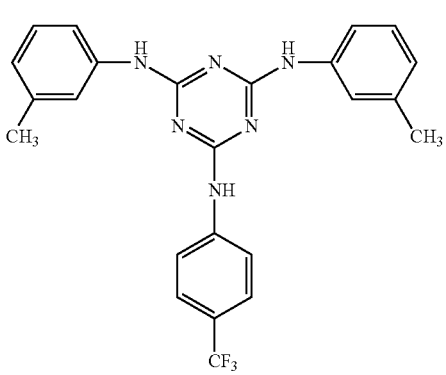
TA1-33
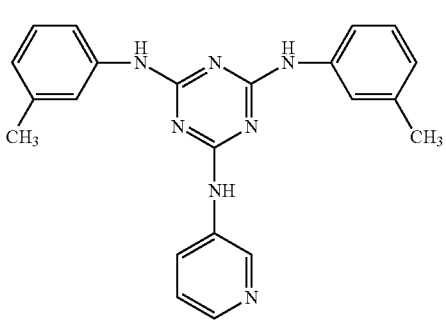
TA1-34
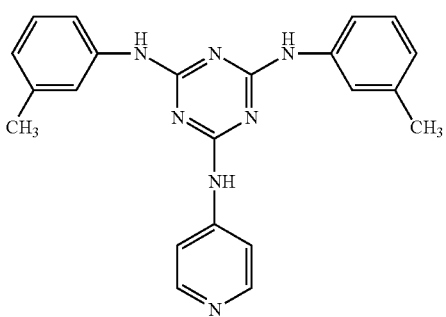
TA1-35
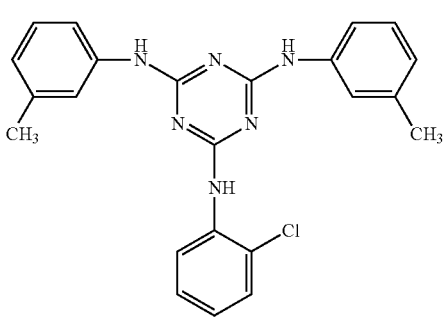
TA1-36
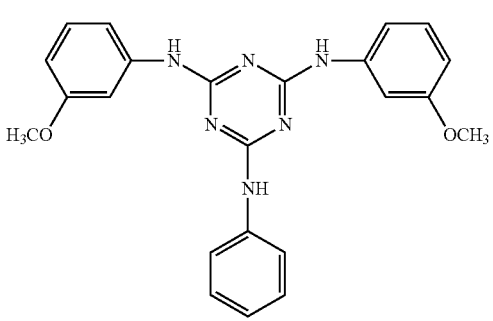

TA1-37
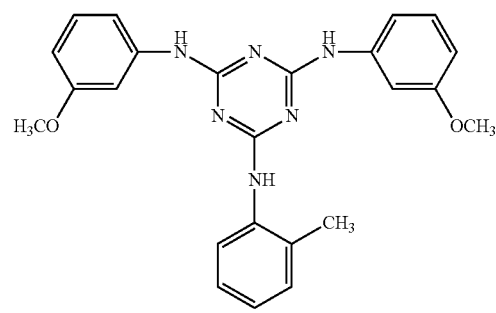
TA1-38
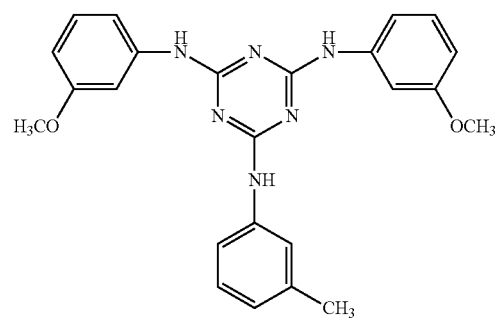
TA1-39
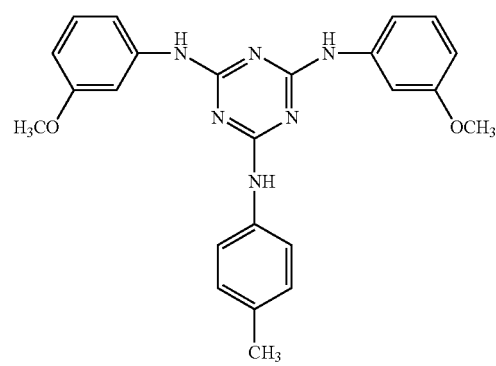
TA1-40
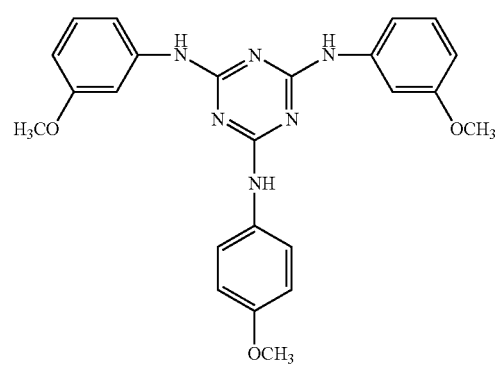
TA1-41
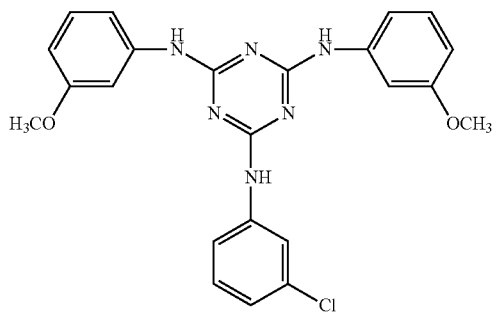
TA1-42
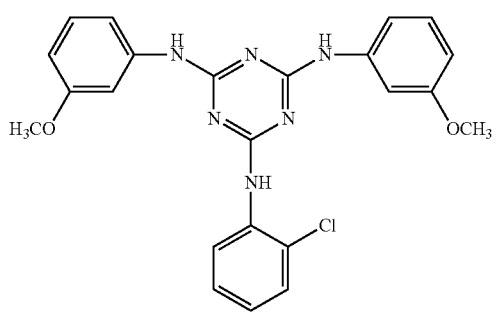
TA1-43
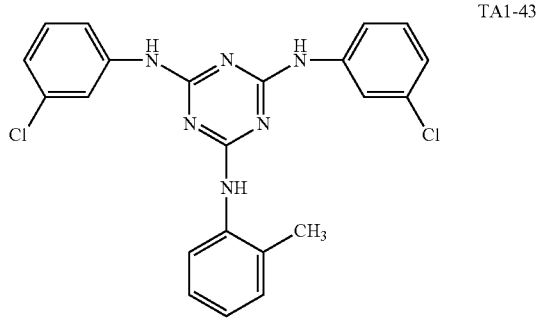
TA1-44
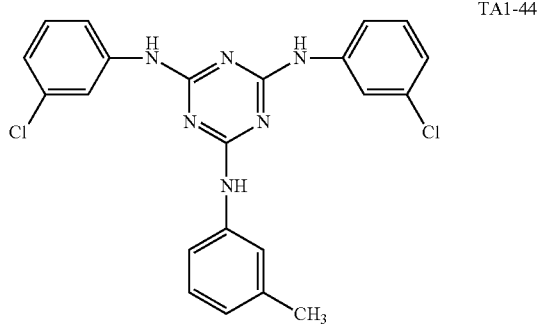

-continued
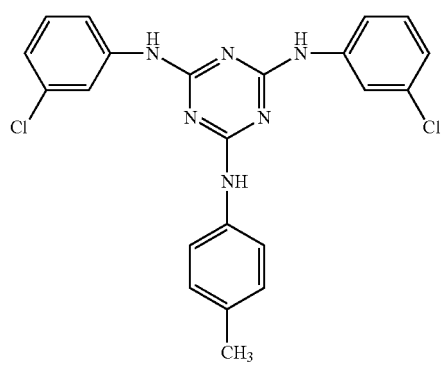
TA1-45
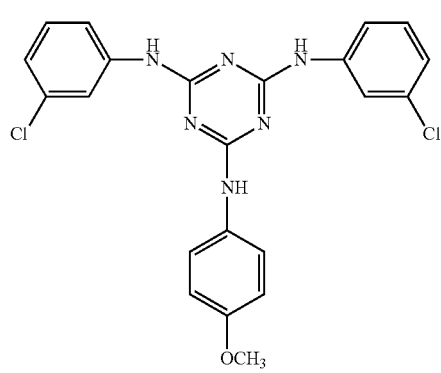
TA1-46
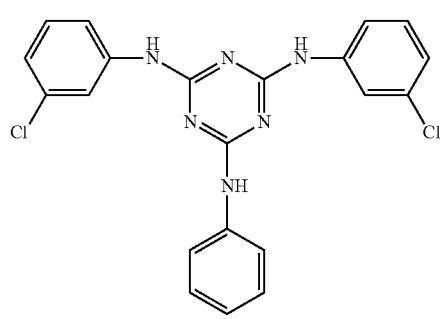
TA1-47
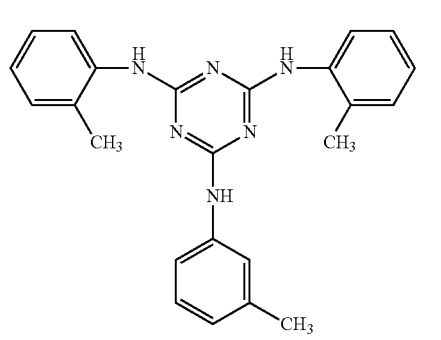
TA1-48
-continued
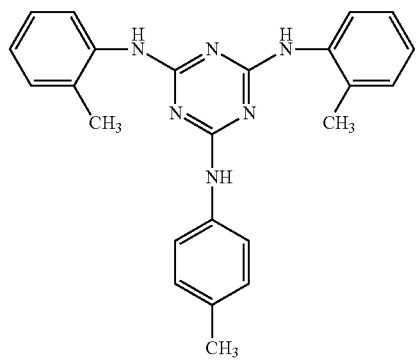
TA1-49
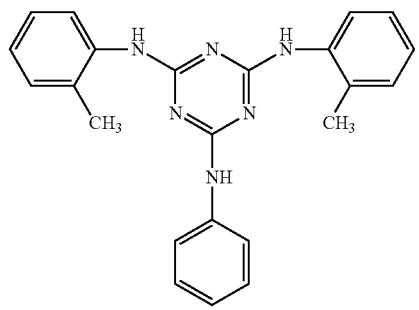
TA1-50
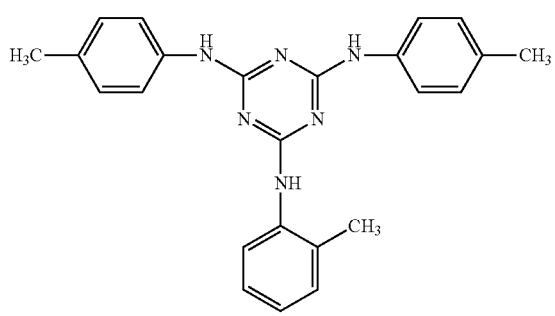
TA2-1
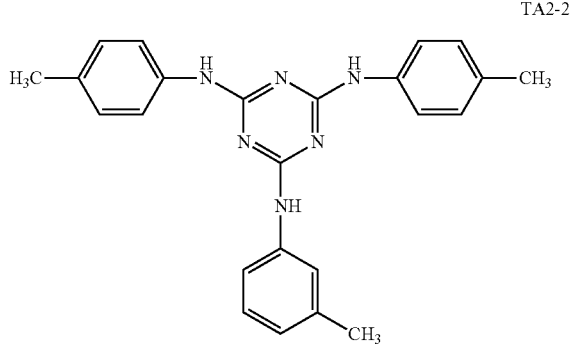
TA2-2

-continued
TA2-3
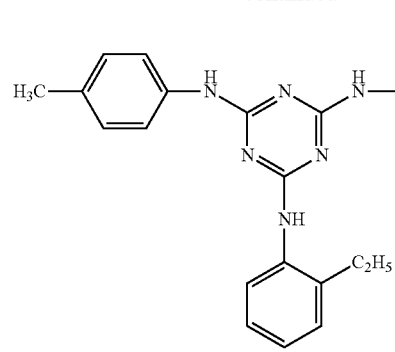
TA2-4
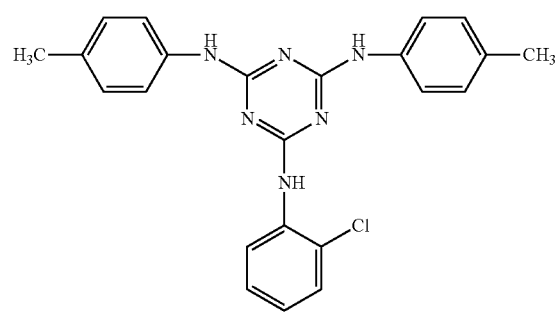
TA2-5
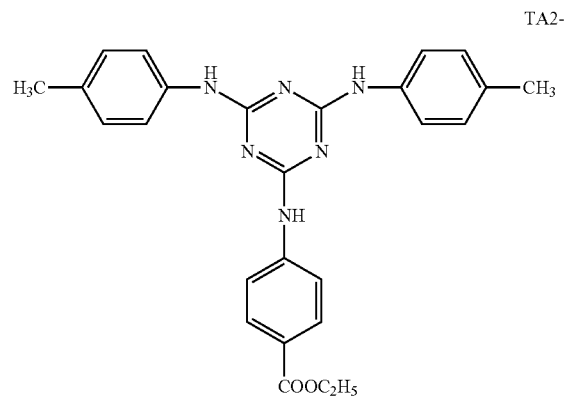
TA2-6
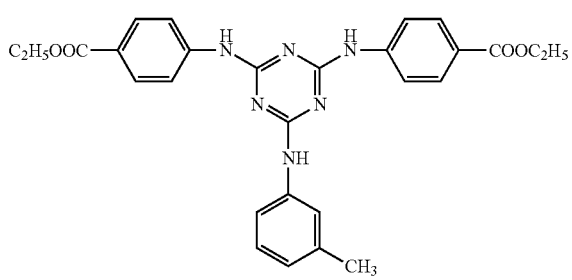
TA2-7
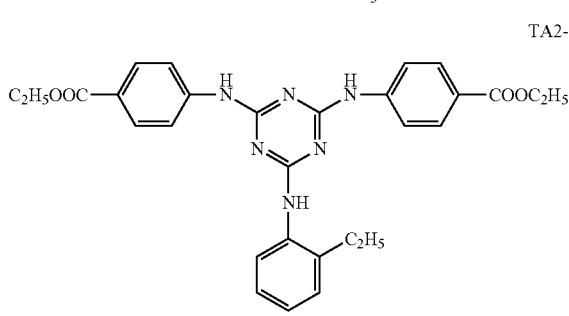
-continued
TA2-8
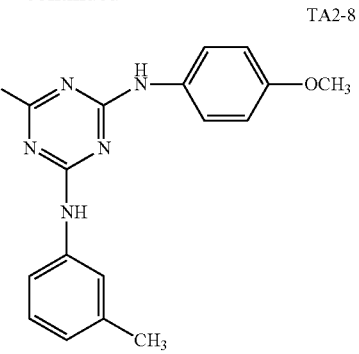
TA2-9
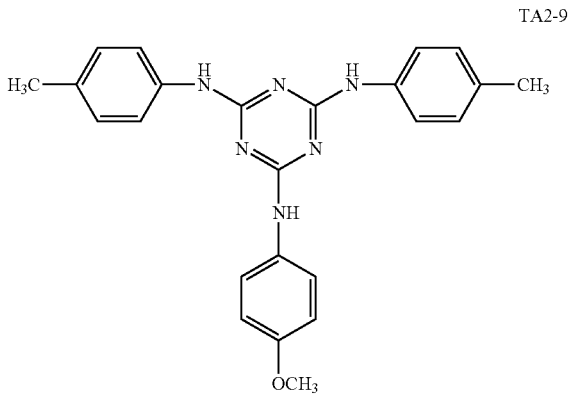
TA3-1
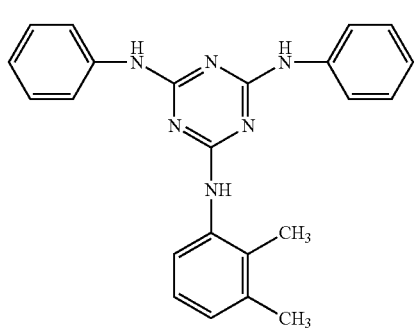
TA3-2
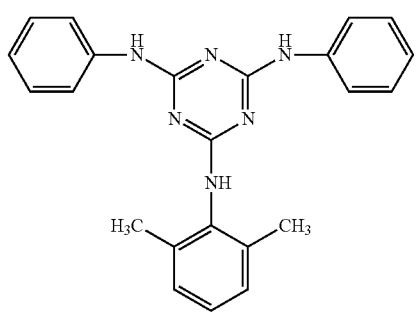

-continued
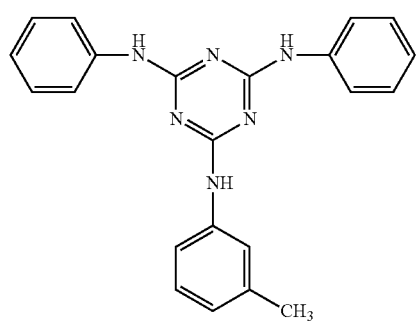
TA3-3
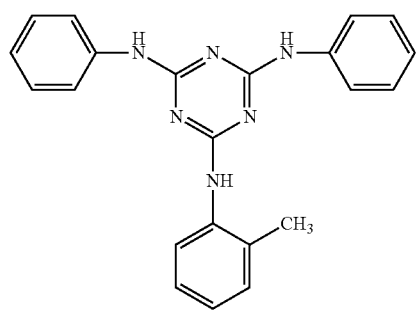
TA3-4
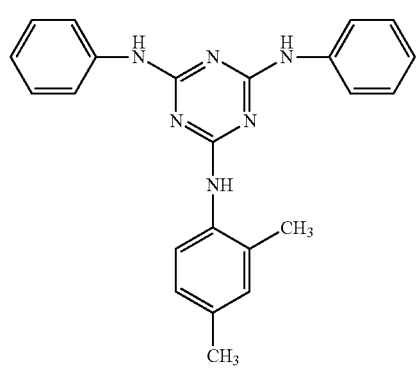
TA3-5
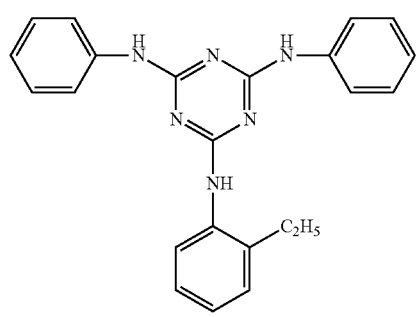
TA3-6
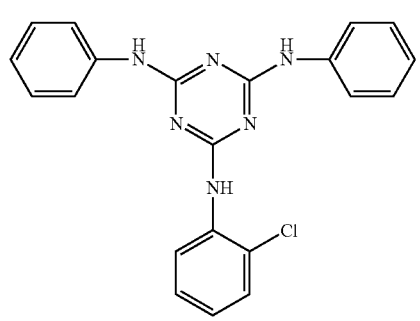
TA3-7
-continued
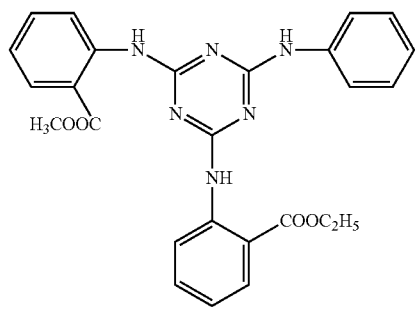
TA3-8
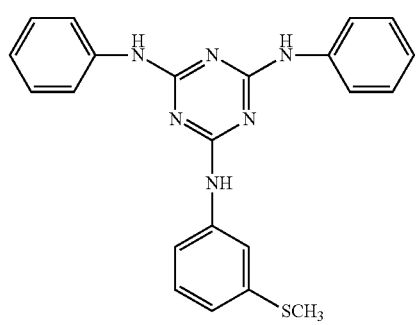
TA3-9
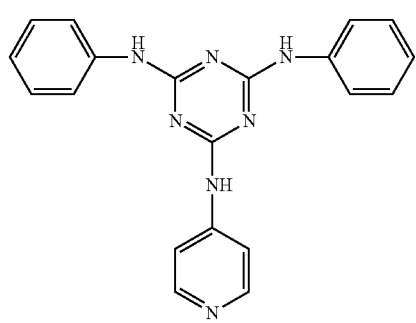
TA3-10
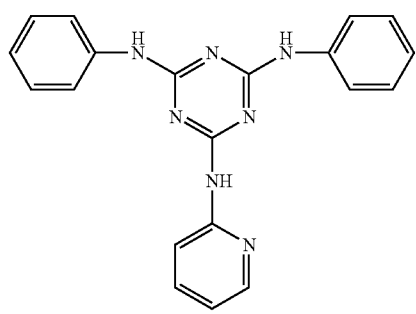
TA3-11
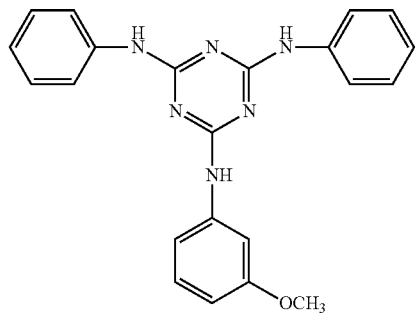
TA3-12

-continued
TA4-1
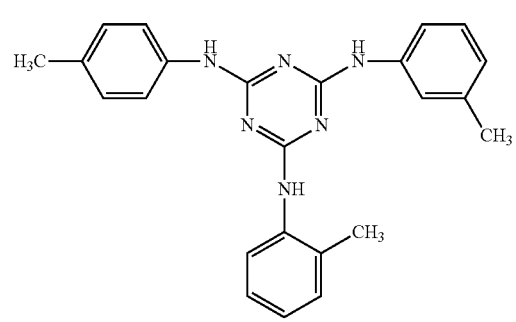
TA4-2
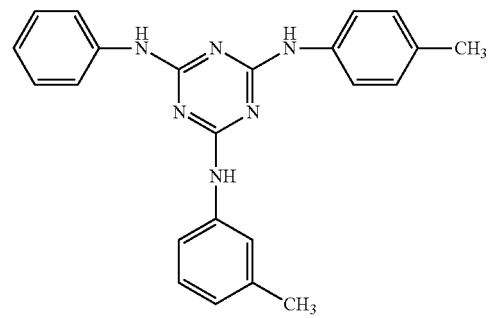
TA4-3
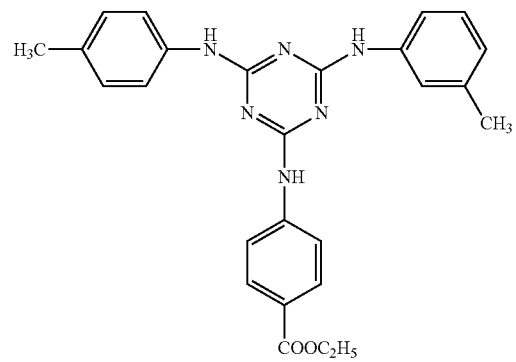
TA4-4
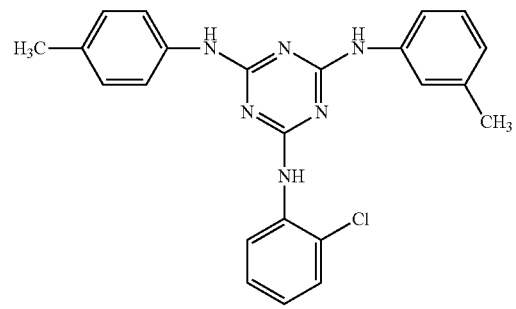
TA4-5
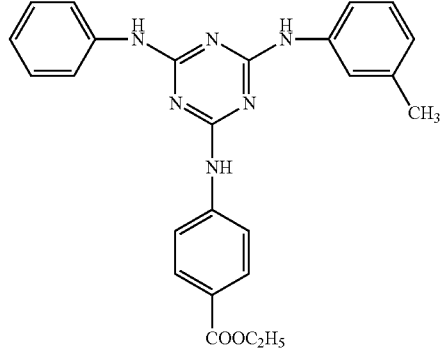
TA4-6
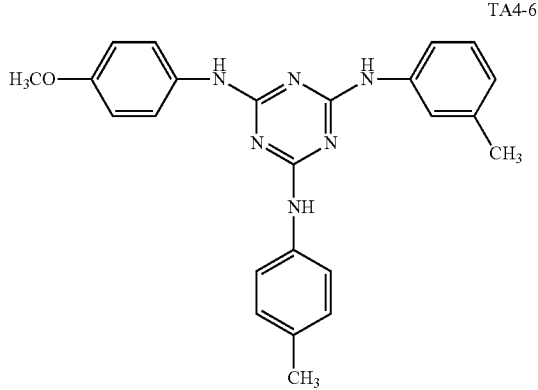
TA4-7
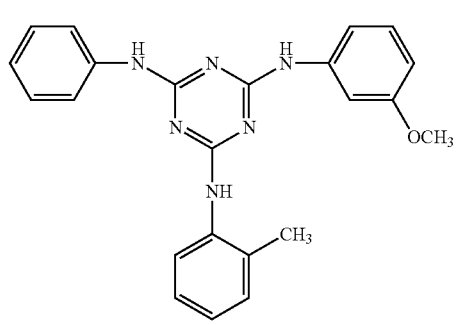
TA4-8
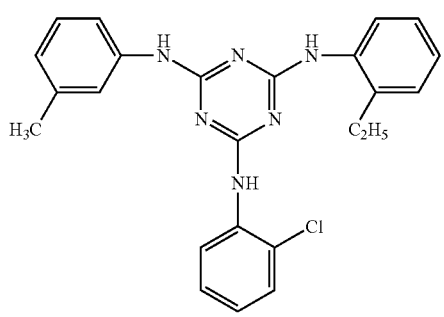

-continued

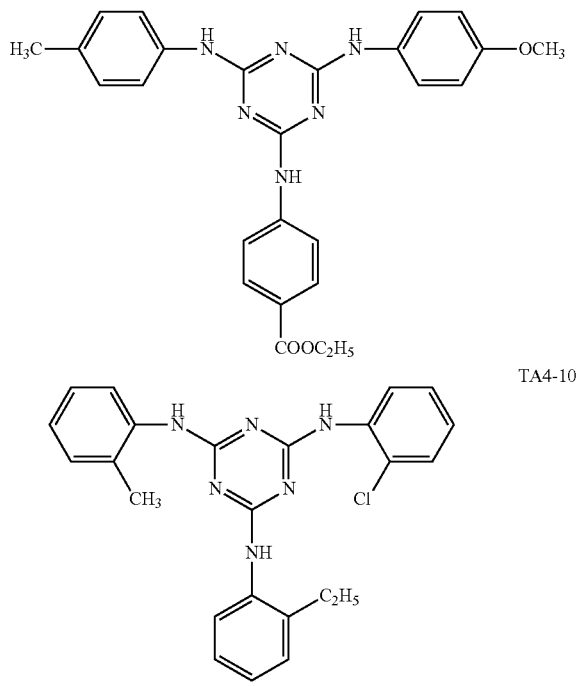

TA4-9

TA4-10

Preferably, the retardation film of this embodiment or a protective film to be used in an aftermentioned circularly polarizing plate contains a UV absorber.

Examples of the UV absorber include a benzotriazole-based UV absorber, a 2-hydroxybenzophenone-based UV absorber, and a phenyl salicylate ester-based UV absorber. More specifically, examples thereof may include: triazoles such as 2-(5-methyl-2-hydroxyphenyl)benzotriazole, 2-[2-hydroxy-3,5-bis(α,α-dimethylbenzyl)phenyl]-2H-benzotriazole, and 2-(3,5-di-t-butyl-2-hydroxyphenyl)benzotriazole; and benzophenones such as 2-hydroxy-4-methoxybenzophenone, 2-hydroxy-4-octoxybenzophenone, and 2,2'-dihydroxy-4-methoxybenzophenone.

Among them, a UV absorber having a molecular weight of 400 or more has a high boiling point so that it is less volatile, and less likely to undergo scattering during formation at high temperatures. Thus, weather resistance can be effectively improved based on addition thereof in a relatively small amount.

Examples of the UV absorber having a molecular weight of 400 or more include: benzotriazole-based UV absorbers, such as 2-[2-hydroxy-3,5-bis(α, α-dimethylbenzyl)phenyl]-2-benzotriazole, and 2,2-methylene bis[4-(1,1,3,3-tetrabutyl)-6-(2H-benzotriazole-2-yl)phenol]; hindered amine-based UV absorbers, such as bis(2,2,6,6-tetramethyl-4-piperidyl)sebacate, and bis(1,2,2,6,6-pentamethyl-4-piperidyl)sebacate; and hybrid UV absorbers each having in a molecule thereof both hindered phenol and hindered amine structures, such as bis(1,2,2,6,6-pentamethyl-4-piperidyl) 2-(3,5-di-t-butyl-4-hydroxybenzyl)-2-n-butylmalonate, and 1-[2-[3-(3,5-di-t-butyl-4-hydroxyphenyl)propionyloxy]ethyl]-4-[3-(3,5-di-t-butyl-4-hydroxyphenyl)propionyloxy]-2,2,6,6-tetramethylpiperidine. They may be used independently, or in combination in the form of a mixture of two or more types thereof. Among them, 2-[2-hydroxy-3,5-bis(α, α-dimethylbenzyl)phenyl]-2-benzotriazole and 2,2-methylene bis[4-(1,1,3,3-tetrabutyl)-6-(2H-benzotriazole-2-yl)phenol] are particularly preferred. It is possible to use commercially-available products for them. For example, Tinuvin Series produced by BASF Japan Ltd, such as Tinuvin 109, Tinuvin 171, Tinuvin 234, Tinuvin 326, Tinuvin 327, Tinuvin 328, and Tinuvin 928, can be preferably used.

With a view to improving thermal decomposition or thermal coloration during formation and processing, the retardation film may further be added with various types of antioxidants. Further, an antistatic agent may be added to impart an antistatic property to the retardation film.

The retardation film according to this embodiment may be formed using a flame-retardant acrylic-based resin composition blended with a phosphorus-based flame retarder. Examples of the phosphorus-based flame retarder may include one or a mixture of two or more selected from the group consisting of red phosphorus, triaryl phosphate ester, diaryl phosphate ester, monoaryl phosphate ester, aryl phosphate compound, aryl phosphine oxide compound, condensed aryl phosphate ester, halogenated alkyl phosphate ester, halogen-containing condensed phosphate ester, halogen-containing condensed phosphate ester, and halogen-containing phosphite ester. Specific examples thereof include triphenyl phosphate, 9,10-dihydro-9-oxa-10-phosphaphenanthrene-10-oxide, phenyl phosphonic acid, tris(β-chloroethyl)phosphate, tris(dichloropropyl)phosphate, and tris(tribromoneopentyl)phosphate.

With a view to improving handleability, the retardation film according to this embodiment preferably contains a matte agent, such as inorganic fine particles of silicon dioxide, titanium dioxide, aluminum oxide, zirconium oxide, calcium carbonate, kaolin, talc, calcined calcium silicate, hydrated calcium silicate, aluminum silicate, magnesium silicate or calcium phosphate or cross-linked polymer. Among them, silicon dioxide is preferably used, because it is capable of reducing haze of the retardation film.

An average primary particle size of the fine particles is preferably 20 nm or less, more preferably, 5 to 16 nm, further preferably, 5 to 12 nm.

<Physical Properties of Retardation Film>
(Film Thickness and Width)

A film thickness of the retardation film according to this embodiment is not particularly limited, but may be set in the range of 10 to 250 μm. As mentioned above, this retardation film makes it possible to allow both of the cellulose acylate and the component other than the cellulose acylate to contribute to the retardation developability and the reverse wavelength dispersion property, so that the in-plane retardation can be increased without increasing the film thickness as in a conventional manner. For example, the film thickness may be set to 20 to 100 μm, or may be set to a reduced value of 20 to 80 μm, or to a further reduced value of 20 to 60 μm, or to a particularly reduced value of 20 to 40 μm. Even with such a film thickness, the retardation film can exhibit sufficiently good retardation developability and reverse wavelength dispersion property.

As the retardation film usable in this embodiment, it is possible to use a type having a width of 1 to 4 m. As the retardation film, a type having a width of 1.4 to 4 m is preferably used, and a type of having a width of 1.6 to 3 m is more preferably used. As long as the width is 4 m or less, conveyance stability thereof can be endured.

(Surface Roughness)

A surface of the retardation film according to this embodiment has an arithmetic average roughness of about 2.0 to 4.0 nm, preferably, 2.5 to 3.5 nm.

(Dimensional Change Rate)

With a view to preventing the occurrence of problems, such as unevenness or variation in retardation value, deterioration in contrast, and color unevenness, due to dimensional changes caused by moisture absorption under a usage environment atmosphere (e.g., high humidity environment) when the retardation film according to this embodiment is applied to an organic EL display, a dimensional change rate (%) is preferably less than 0.5%, more preferably less than 0.3%.

(Failure Resistance)

In the retardation film according to this embodiment, it is preferable that a failure (hereinafter referred to as "defect") in the retardation film less occurs. Specifically, the number of a defect having a diameter of 5 μm or more, in a film plane, is preferably one or less per 10 cm square, more preferably, 0.5 or less per 10 cm square, further preferably, 0.1 or less per 10 cm square. As used in this specification, the term "defect" means an in-film void caused by rapid vaporization of the solvent in a drying step during film formation by an aftermentioned solution casting process (foaming defect), and an in-film contaminant due to a foreign substance contained in a film-forming solution or a foreign substance mixed during the film formation (contaminant defect). When the defect has a circular shape, a diameter of the defect is defined as a diameter of the circle, and when the defect has a non-circular shape, a range of the defect is microscopically observed and determined in the following manner, and a maximum diameter (diameter of a circumscribed circle to the range) is defined as the diameter of the defect. When the defect is a pore or a contaminant, the defect is measured based on a size of a shadow when observing the defect by transmitted light of a differential interference microscope. On the other hand, when the defect is a scratch, a transfer mark of a flaw on a roll, or the like, which involves a change in a surface configuration, a size of the defect is checked through observation by refection light of a differential interference microscope. In the observation by the refection light, when the size of the defect is unclear, the observation may be performed under a condition that aluminum or platinum is vapor-deposited on the surface. For obtaining a film with an excellent quality level represented by a defect frequency, it is effective to filtrate a polymer solution with high accuracy, immediately before the casting, or to enhance cleanness around a casting apparatus, or to set drying conditions after the casting, in a stepwise manner, to efficiently perform the drying while minimizing the foaming.

When the number of defects is greater than one per 10 cm square, and, for example, a tension is applied to a film during processing in a subsequent step, the film is likely to start fracturing from the defect, thereby causing deterioration in productivity. Further, when the diameter of the defect becomes equal to or greater than 5 μm, the defect can be visually checked, for example, by observing a polarizing plate, and a bright point is likely to occur when used as an optical member.

(Fracture Elongation)

The retardation film according to this embodiment preferably exhibits a fracture elongation at least in one direction (width direction (TD direction) or a conveyance direction (MD direction) of 10% or more, more preferably, 20% or more, as measured in accordance with JIS-K7127-1999. An upper limit of the fracture elongation is not particularly limited, but is realistically set to about 250%. For increasing the fracture elongation, it is effective to suppress a defect in the film due to contaminant or foaming.

(Total Light Transmittance)

The retardation film according to this embodiment preferably exhibits a total light transmittance of 90% or more, more preferably, 93% or more. An upper limit of the total light transmittance is not particularly limited, but is realistically set to about 99%. For achieving excellent transparency as represented by the total light transmittance, it is effective to avoid introduction of an additive capable of absorbing visible light or copolymer component, or reduce diffusion and absorption of light inside the film by removing a foreign substance in a polymer through highly-accurate filtration. It is also effective to reduce scattering and reflection of light on a film surface by reducing a surface roughness of a film contact portion during film formation (a cooling roller, a calendar roller, a drum, a belt, a coatable base material for film formation during solution casting, a conveyance roller, etc.) to reduce a surface roughness of the film surface.

<Production Process of Retardation Film>

Next, a production process of the aforementioned retardation film will be described.

The retardation film according to this embodiment can be formed according to a heretofore-known process. The following description will be made based on a solution casting process and a melt casting process, as representative examples.

[Solution Casting Process]

The retardation film according to this embodiment can be produced by a solution casting process. The solution casting process comprises: a step of heating and dissolving cellulose acylate and additions in an organic solvent to prepare a dope; a step of casting the prepared dope on a belt-shaped or drum-shaped metal support; a step of drying the cast dope to form a web; a step of peeling the web from the metal support; a step of stretching or contracting the peeled web; a step of additionally drying the stretched or contracted web; and a step of winding up a finished film.

(Dope Preparation Step)

In the dope preparation step, a concentration of the cellulose acylate contained in the dope is preferably set to a higher value, because a drying load after casting onto the metal support can be more largely reduced. However, if the concentration of the cellulose acylate is excessively high, a load during filtration is increased, resulting in poor filtration accuracy. Thus, in order to satisfy both of the needs, the concentration is set preferably in the range of 10 to 35 mass %, more preferably, in the range of 15 to 25 mass %.

(Casting Step)

The metal support to be used in the casting step is preferably a type having a mirror-finished surface, and preferably composed of a stainless steel belt, or a drum formed of a cast metal having a plated surface.

A width of the casting is preferably set in the range of 1 to 4 m. A surface temperature of the metal support during the casting step is appropriately selectively set in the range of −50° C. to a temperature at which the solvent is not foamed due to boiling. The temperature is preferably set to a higher value, because a drying speed of the web can be more largely increased. However, if the temperature is excessively high, the web is likely to be foamed, resulting in deterioration in flatness thereof. A preferred temperature of the support is appropriately determined within the range of 0 to 100° C., more preferably, within the range of 5 to 30° C. Then, the web is cooled to cause gelation, so that the gelated web can be peeled off from the drum in a state in which it largely contains a residual solvent. A technique for controlling the temperature of the metal support is not particularly limited, but it is conceivable to employ a method of blowing warm or cool air thereonto, or a method of allowing warm water to come into contact with a back side of the metal support. The method using warm water is more preferable, because heat transfer is efficiently performed to shorten a time period before the temperature of the metal support becomes constant. In the method using warm air, considering a temperature decrease of the web due to latent heat of vaporization of the solvent, warm air having a temperature equal to or greater than a boiling point of the solvent and greater than a target temperature is used while preventing the foaming, in some cases. In particular, it is preferable to efficiently perform the drying by changing the temperature of the support and the temperature of the drying air during a time period from start of the casting to completion of the peeling.

For allowing the retardation film to exhibit good flatness, an amount of the residual solvent at a time when the web is peeled off from the metal support is set preferably within the range of 10 to 150 mass %, more preferably, within the range of 20 to 40 mass % or of 60 to 130 mass %, further preferably within the range of 20 to 30 mass % or of 70 to 120 mass %.

In this specification, the residual solvent amount is defined by the following formula: residual solvent amount (mass %)=$\{(M-N)/N\}\times 100$ (where M represents a mass of a sample collected at any time during or after production of the web or the film, and N represents a mass of the collected sample after it is subjected to heating at 115° C. for 1 hour.

(Drying Step)

In the drying step, the web is peeled off from the metal support, and further dried to allow the residual solvent amount to be preferably 1.0 mass % or less, more preferably, 0 to 0.01 mass %.

In the drying step, it is generally able to employ a roll drying method, for example, a method of allowing the web to alternately pass through a large number of rollers arranged up and down, and a method of drying the web while conveying it according to a tenter system.

(Stretching Step)

As mentioned above, in the retardation film according to this embodiment, the in-plane retardation $Ro_{550}$ measured at a wavelength 550 nm is preferably 115 to 160 nm. Such a retardation can be imparted by stretching a film.

A technique for stretching is not particularly limited, but may be, for example; a method of driving a plurality of rollers at respective different circumferential speeds, and performing a stretching operation in a longitudinal direction by means of the difference in circumferential speed between the rollers; a method of fixing opposite edges of a web by clips or pins, and performing a stretching operation in the longitudinal direction by increasing a distance between the clips or pins in their traveling direction; a method of performing a stretching operation in a transverse direction by increasing the above distance in the transverse direction; and a method of performing a stretching operation in the longitudinal and transverse directions by increasing the above distance in the longitudinal and transverse directions. That is, the stretching operation may be performed in the transverse direction with respect to a film formation direction (the machine or conveyance direction), or may be performed in the machine direction, or may be performed in the two directions. Further, when the stretching operation is performed in the two directions, it may be performed in a simultaneous manner, or may be performed in a sequential manner. In a so-called tenter system, a linear driving scheme is preferably used to drive a clip portion so as to achieve a smooth stretching operation and thus reduce a risk of fracture or the like.

Generally, in the stretching step, a stretching operation is performed in a width direction (TD direction) while causing a contraction in a conveyance direction (MD direction). In this case, during the contraction, a conveyance operation may be performed in an oblique direction. This makes it easier to uniform orientation of main chains, and thereby a retardation developing effect is further enhanced. A contraction ratio can be set by a conveyance angle.

FIG. 1 is a schematic diagram for explaining a contraction ratio in an oblique stretching. In FIG. 1, when a cellulose acylate film F is obliquely stretched in a direction indicated by the reference sign A2, the cellulose acylate film F is obliquely bent and thus contracted to M2. That is, in the case where a gripper holding the cellulose acylate film F travels without turning at a bending angle θ, the gripper should travel by a length M1' within a given period of time. However, the gripper actually turns at the bending angle θ, and travels by M1 (where M1=M1'). In this process, the gripper travels by M2 in a film entering direction (direction perpendicular to a stretching direction A1 (TD direction)), which means that the cellulose acylate film F is contracted by a length M3 (where M3=M1−M2).

In the above case, the contraction ratio (%) is expressed as follows:

Contraction ratio(%)=$(M1-M2)/M1\times 100$

Further,

M2=M1×sin (π−θ), where θ represents the bending angle. Thus, the contraction ratio is expressed as follows:

Contraction ratio(%)=$(1-\sin(\pi-\theta))\times 100$

In FIG. 1, the reference sign A3 represents the conveyance direction (MD direction), and the reference sign A4 represents a slow axis.

Considering productivity of an elongated circularly polarizing plate, in the retardation film according to this embodiment, it is preferable that an orientation angle with respect to the conveyance direction is 45°±2°, because lamination with a polarizing film can be achieved in a roll-to-roll manner.

(Stretching by Oblique Stretching Device)

Next, an oblique stretching method for stretching in a 45-degree direction will be described in more detail. In a production process for the retardation film according to this embodiment, as means to impart an oblique orientation to a stretched cellulose acylate film, it is preferable to employ an oblique stretching device.

Preferably, an oblique stretching device applicable to this embodiment is a film stretching device capable of: freely setting an orientation angle of a film by variously changing a rail pattern; highly accurately setting an orientation axis of a film laterally evenly over a width direction of the film; and highly accurately controlling a thickness and retardation of the film.

Figure 2:
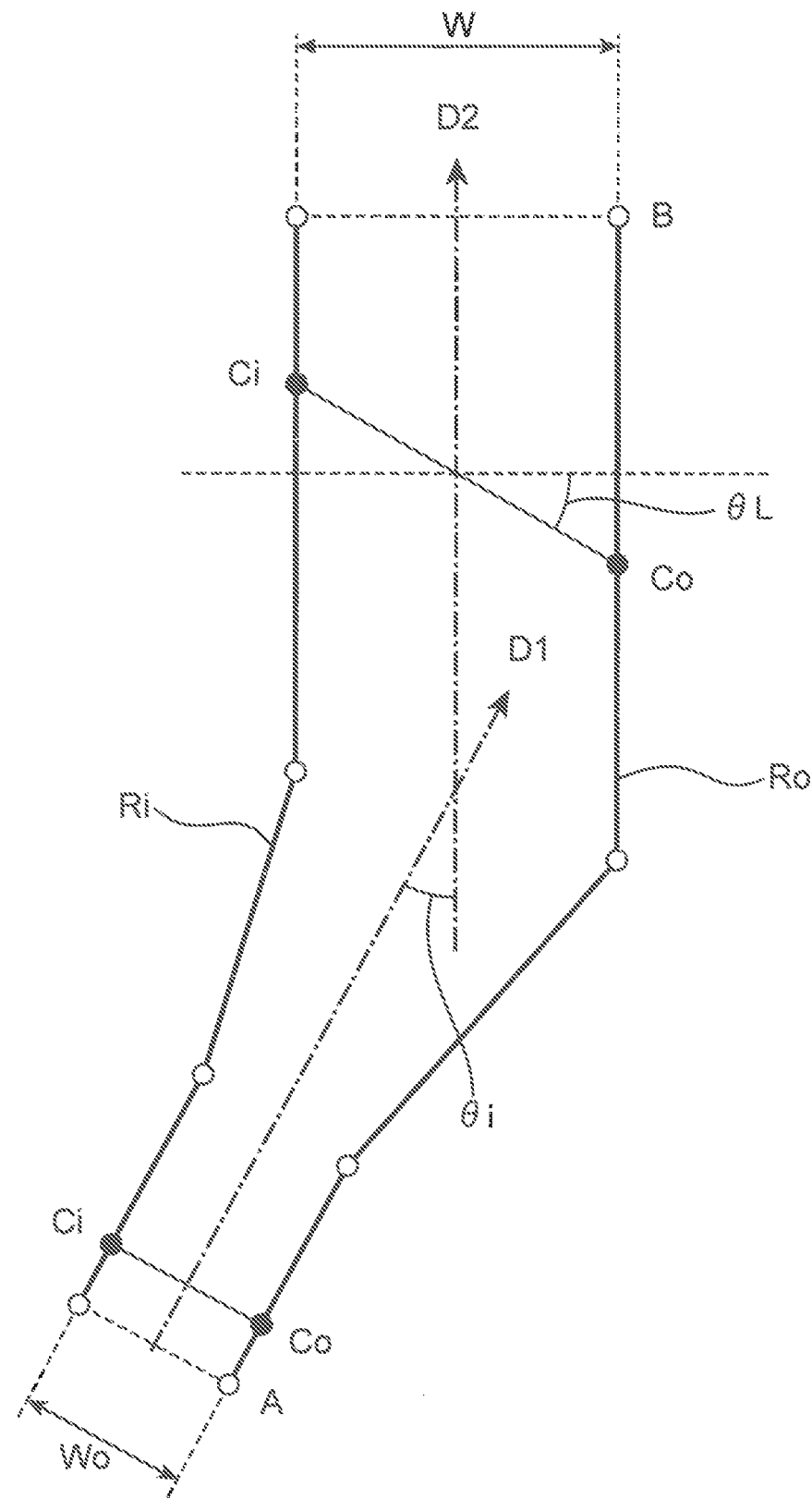
FIG. 2 is a schematic diagram illustrating one example of a rail pattern of an oblique stretching device applicable to production of a retardation film according to one embodiment of the present invention.

FIG. 2 is a schematic diagram illustrating one example of the rail pattern of the oblique stretching device applicable to production of the retardation film according to this embodiment.

The illustration depicted therein is presented only by way of example, and the stretching device applicable to this embodiment is not limited thereto.

Generally, in an oblique stretching device, as illustrated in FIG. 2, a feeding direction D1 of an elongated raw film is different from a wind-up direction D2 of a stretched film, wherein they intersect at a feeding angle θi. The feeding angle θi may be arbitrarily set to a desired angle in the range of greater than 0° to less than 90°. As used in this specification, the term "elongated" means a state in which a length of a film is at least about 5 times or more greater than a width of the film, preferably, 10 times or more greater than the width of the film.

The elongated raw film is moved to travel along with traveling of right and left grippers (tenter), after opposite lateral edges of the elongated film are held by the right and left grippers at an inlet of the oblique stretching device (position A in FIG. 2). At the inlet of the oblique stretching device (position A in FIG. 2), the right and left grippers Ci, Co arranged in opposed relation to each other in a direction approximately perpendicular to a film traveling direction (feeding direction D1) start to travel, respectively, on bilaterally asymmetrical rails $R_1$, Ro, and then, at a position where a stretching operation is ended (position B in FIG. 2), release the held film.

In the above process, when the right and left grippers Ci, Co arranged in opposed relation to each other at the inlet of the oblique stretching device (position A in FIG. 2) gradually travels forwardly on the bilaterally asymmetrical rails $R_1$, Ro, the gripper Ci being traveling on the rails Ri and the gripper Co being traveling on the rails Ro have a positional relationship in which the gripper Ci goes ahead with respect to the gripper Co.

That is, in a state in which the grippers Ci, Co which have been arranged in opposed relation to each other in a direction approximately perpendicular to the film feeding direction D1 at the inlet of the oblique stretching device (film-holding start position of the grippers) A are located at the film-stretching end position B, a straight line connecting the grippers Ci, Co is inclined by an angle θL with respect to a direction approximately perpendicular to the film wind-up direction D2.

According to the above process, the raw film is obliquely stretched. As used here, the term "approximately perpendicular" means an angle falling within 90±1°.

More specifically, in the process for producing the retardation film according to this embodiment, it is preferable to perform an oblique stretching operation by using the aforementioned stretching device capable of oblique stretching.

This stretching device is designed to heat a raw film to an arbitrary stretchable temperature and then perform an oblique stretching operation. The stretching device comprises a heating zone, a pair of right and left rails on which grippers for conveying a film travel, and a large number of grippers configured to travel on the rails. In the stretching device, the grippers are operable to sequentially hold opposite edges of a film supplied to an inlet of the stretching device, and, after introducing the film into the heating zone, release the film from the grippers at an outlet of the stretching device. The film released from the grippers is wound around a roll core. Each of the pair of rails has an endless continuous track, and thereby the grippers releasing the held state of the film at the outlet of the stretching device are sequentially returned to the inlet while traveling along an outer track.

The rail pattern of the stretching device has a bilaterally asymmetrical shape, and can be adjusted manually or automatically, depending on an orientation angle, a stretching ratio, etc., to be given to an elongated stretched film to be produced. Preferably, an oblique stretching device to be used in this embodiment is capable of freely setting positions of rail elements and rail connecting portions to arbitrarily change the rail pattern (areas indicated by circular marks in FIG. 2 show one example of the connecting portions).

In this embodiment, each of the grippers of the stretching device is configured to travel at a constant speed, while maintain a constant distance with respect to each of the preceding and subsequent grippers. While a traveling speed of the grippers may be appropriately selected, it is generally set to 1 to 100 m/min. A difference in traveling speed between the pair of right and left grippers is generally set to 1% or less of the traveling speed, preferably, 0.5% or less, more preferably, 0.1% or less. This is because, if there is a difference in traveling speed between right and left of a film at the outlet of the stretching device, wrinkles and shifting occur at the outlet of the stretching device, and therefore it is necessary for the right and left grippers to have substantially the same speed. In a commonly-used stretching device and the like, depending on a period of teeth of a sprocket for driving a chain, a frequency of a drive motor and others, there occur speed fluctuations in sub-second order, often at a level of several %. These do not fall under a category of the speed difference set forth in this embodiment.

In the stretching device according to this embodiment, particularly in a location where a film is obliquely conveyed, the rails defining a track of the grippers is required to have a large bending curvature. For avoiding interference between the grippers due to sharp bending or local stress concentration, it is preferable to allow the track of the grippers to form a curved line at the bent area.

In this embodiment, the elongated raw film is moved to travel along with traveling of the right and left grippers, after the opposite lateral edges of the elongated film are held by the right and left grippers at the inlet of the oblique stretching device (position A in FIG. 2). The right and left grippers arranged in opposed relation to each other in a direction approximately perpendicular to the film traveling direction (feeding direction D1) at the inlet of the oblique stretching device (position A in FIG. 2) travel on the bilaterally asymmetrical rails and pass through a heating zone which comprises a preheating zone, a stretching zone and a heat setting zone.

The preheating zone is a section which is an inlet region of the heating zone, wherein the grippers holding the opposite edges travel while maintaining a distance therebetween constant.

The stretching zone is a section in which the distance between the grippers holding the opposite edges starts increasing and finally reaches a given distance. While the aforementioned oblique stretching operation is performed in the stretching zone, a stretching operation in the longitudinal direction or a stretching operation in the transverse direction may be performed before and after the oblique stretching operation, according to needs. During bending, the oblique stretching operation involves a contraction in the MD direction (fast axis direction) which is a direction perpendicular to the slow axis.

In the retardation film according to this embodiment, a film is subjected to stretching and subsequently to contracting. Thus, through contraction in a direction (fast axis direction) perpendicular to the stretching direction, an orientation of an optical regulating agent (e.g., the compound represented by the general formula (A)) misaligned with a main chain of cellulose acylate as a matrix resin can be rotated to allow a main axis of the optical regulating agent to be aligned with the main chain of the cellulose acylate as the matrix resin. This makes it possible to increase a refractive index $ny_{280}$ which is a refractive index in the fast axis direction at 280 nm in the ultraviolet region, to thereby allow normal wavelength dispersibility in the fast axis direction ny in the visible light region to have a steep slope.

The heat setting zone is a section in which the distance between the gripper becomes constant again after the stretching zone, wherein the grippers at the opposite edges travel while maintaining a parallel relation to each other. After passing through the heat setting zone, the film may pass through a zone in which a temperature therein is set to be equal to or less than a glass transition temperature Tg of the thermoplastic resin constituting the film (cooling zone). In this case, the rail pattern may be preliminarily set in such a manner that the distance between the opposed grippers is narrowed, considering shrinkage of the film due to the cooling.

As regards respective temperatures of the above zones, the preheating zone, the stretching zone and the cooling zone are preferably set, respectively, within the range of Tg to Tg+30° C., within the range of Tg to Tg+30° C., and within the range of Tg−30° C. to Tg.

In order to control unevenness in thickness in the width direction, a temperature difference may be generated in the width direction in the stretching zone. As means to generate a temperature difference in the width direction in the stretching zone, it is possible to employ a heretofore-known technique, such as a technique of allowing a degree of opening of a nozzle for sending warm air into a constant-temperature chamber to vary in the width direction, or a technique of arranging a plurality of heaters in the width direction to perform heating control.

A length of each of the preheating zone, the stretching zone and the heat setting zone can be appropriately selectively determined Generally, with respect to the length of the stretching zone, the length of the preheating zone is set within the range of 100 to 150%, and the length of the heat setting zone is set within the range of 50 to 100%.

A stretching ratio (W/Wo) is set preferably within the range of 1.3 to 3.0, more preferably, within the range of 1.5 to 2.8. The thickness unevenness in the width direction can be reduced by setting the stretching ratio within the above range. The thickness unevenness in the width direction can be further improved by varying a stretching temperature in the width direction in the stretching zone of the oblique stretching device. In the above description, Wo represents a film width before stretching, and W represents a film width after stretching.

Examples of an oblique stretching process applicable to this embodiment may include stretching processes illustrated in FIGS. 3A to 3C and FIGS. 4A and 4B, in addition to the process illustrated in FIG. 2.

FIG. 3 are schematic diagrams illustrating one example of the production process for this embodiment (wherein an elongated raw film unrolled from a raw film roll is subjected to oblique stretching), and specifically illustrating a pattern for feeding an elongated raw film wound up once in a roll form, and subjected to oblique stretching. FIG. 4 are schematic diagrams illustrating another example of the production process for this embodiment (wherein an elongated raw film is continuously subjected to oblique stretching, without being formed in a roll), and specifically illustrating a pattern for continuously subjecting an elongated raw film to oblique stretching, without being formed in a roll.

In FIG. 3 and FIG. 4, the reference sign 15 and the reference sign 16 indicate, respectively, an oblique stretching apparatus and a film feeding device, and the reference sign 17, the reference sign 18 and the reference sign 19 indicate, respectively, a conveyance-direction changing device, a wind-up device and a film-forming device. As for the same elements or devices in the respective figures, a reference sign therefor is omitted, in some cases.

Preferably, the film feeding device 16 is configured to be slidably and turnably moved in such a manner as to feed the film at a given angle with respect to an inlet of an oblique stretching device, or to be slidably moved in such a manner as to feed the film toward the inlet of the oblique stretching device through the conveyance-direction changing device 17. FIGS. 3A to 3C illustrate patterns in which an arrangement of the film feeding device 16 and the conveyance-direction changing device 17 are changed. FIGS. 4A and 4B illustrate patterns for feeding a film formed by the film-forming device 19, directly toward the stretching device. The film feeding device 16 and the conveyance-direction changing device 17 configured as above make it possible to narrow a width of the entire apparatus and finely control a position and an angle for film feeding, thereby obtaining an elongated stretched film with a reduced variation in film thickness and optical values. Further, each of the film feeding device 16 and the conveyance-direction changing device 17 is configured to be movable, so that it becomes possible to effectively prevent biting of right and left clips into a film.

The wind-up device 18 is disposed with respect to an outlet of the oblique stretching device in such a manner as to take over a film at a given angle, so that it becomes possible to finely control a position and an angle for film take-over. As a result, an elongated stretched film with a reduced variation in film thickness and optical values can be obtained. Further, it becomes possible to effectively prevent the occurrence of wrinkles in a film, and improve wind-up performance so as to wind up a longer film. In this embodiment, it is preferable to adjust a take-over tension T (N/m) after stretching, within the following range: 100 N/m<T<300 N/m, preferably, 150 N/m<T<250 N/m.

(Melt Film-Forming Process)

The aforementioned retardation film may be formed by a melt film-forming process. The melt film-forming process is designed to melt a composition comprising a resin and an additive such as plasticizer by heating it up to a temperature providing its fluidity, and then cast a resulting melt containing a fluid thermoplastic resin.

A molding process based on heating and melting can be classified, for example, into a melt extrusion molding process, a press molding process, an inflation molding process, an injection molding process, a blow molding process and a draw molding process. Among these molding processes, a melt extrusion molding process is preferable in view of mechanical strength and surface accuracy.

Generally, it is preferable that a plurality of raw materials for use in the melt extrusion molding process are preliminarily kneaded and pelletized. Pelletizing may be performed by a heretofore-known method, for example, by: supplying dried cellulose acylate, plasticizer and other additives to a single-screw or twin-screw extruder by using a feeder; kneading the mixture by the extruder; extruding the kneaded mixture from a die of the extruder to have a strand-like shape; water-cooling or air-cooling the extruded mixture; and cutting the cooled mixture.

The additives may be mixed before being supplied to the extruder, or may be supplied by independent feeders, respectively. Preferably, small amounts of additives such as fine particle and antioxidant are preliminarily mixed therein to ensure uniform mixing.

Preferably, the extruder for use in pelletizing is a type capable of performing pelletizing at the lowest temperature allowing pelletizing, so as to suppress sharing force and prevent degradation of a resin (reduction in molecular weight, coloration, gelation, etc.). For example, in a twin-screw extruder, it is preferable to use deep-groove screws configured to be rotated in the same direction. In view of uniformity in kneading, an intermeshing type is preferably.

Film-formation is performed using the pellets obtained in the above manner. It is to be understood that the film-formation may be performed just after a powder of raw materials is directly put into a feeder without pelletizing, and then heated and melted.

A melting temperature during extrusion using a single-screw or twin-screw extruder is set within the range of 200 to 300° C. A resulting melt is filtrated using a leaf disk-type filter or the like to remove foreign substances therefrom, and cast from a T-die to have a film-like shape. Then, the film is nipped between a cooling roller and an elastic touch roller, and solidified on the cooling roller.

Preferably, introduction from a feed hopper into the extruder is performed under vacuum or under reduced pressure or under an inert gas atmosphere, to thereby prevent oxidation, decomposition or the like.

Preferably, an extrusion flow rate is stabilized, for example, by means of introduction of a gear pump. As the filter for removing foreign substances, a sintered stainless steel fiber filter is preferably used. The sintered stainless steel fiber filter is obtained by: forming stainless steel fibers into a complicatedly tangled state; compressing the stainless steel fibers; and sintering contact portions of the compressed stainless steel fibers to integrate them together, wherein filtration accuracy can be adjusted by changing density of the fibers based on fiber diameter and compression amount.

The additives such as plasticizer and fine particles may be preliminarily mixed with the resin, or may be kneaded into the resin in the course of the extrusion by the extruder. For uniform addition, it is preferable to use a mixing device such as static mixer.

Preferably, a film temperature on the side of the touch roller during nipping of the film between the cooling roller and the elastic touch roller is set within the range of Tg of the film to Tg+110° C. As an elastic touch roller having an elastic surface usable for such a purpose, a heretofore-known roller may be used. The elastic touch roller is also referred to as "nipping rotor", and a commercially-available product may be used.

When the film is released from the cooling roller, it is preferable to control tension of the film to thereby prevent deformation of the film.

The film obtained in the above manner can be subjected to stretching and contraction through a stretching operation, after passing through the step being contacted with the cooling roller. For the stretching and contracting, the aforementioned heretofore-known roller stretching device or oblique stretching device can be preferably used. Generally, it is preferable that a stretching temperature is set in the range of Tg of a resin constituting the film to Tg+60° C.

Before wind-up, the film may be formed into a width of a final product by slitting and cutting off end portions thereof, and opposite ends thereof may be subjected to knurling (embossing) so as to prevent sticking or scratching during wind-up. The knurling may be achieved by means of heating and pressing of a metal ring having a convexo-concave pattern on a lateral surface thereof. Opposite edge portions of the film which have been held by the clips are cut off and recycled, because the edge portions are generally deformed and not usable as a final product.

The above retardation film is laminated to an aftermentioned polarizer in such a manner that an angle defined between the slow axis thereof and a transmission axis of the aftermentioned polarizer becomes substantially 45°, so as to form a circularly polarizing plate. As used in this specification, the term "substantially 45°" means an angle falling within the range of 40 to 50°.

The angle defined between the in-plane slow axis of the aforementioned retardation film and the transmission axis of the polarizer is set preferably within the range of 41 to 49°, more preferably, within the range of 42 to 48°, further preferably, within the range of 43 to 47°, particularly preferably, within the range of 44 to 46°.

<Elongated Circularly Polarizing Plate>

An elongated circularly polarizing plate according to one embodiment of the present invention is produced by trimming edges of an elongated roll of a laminate comprising an elongated protective film, an elongated polarizer and the aforementioned elongated retardation film which are laminating in this order. The elongated circularly polarizing plate according to this embodiment is produced using the aforementioned retardation film, so that, when applied, for example, to an aftermentioned organic EL display, it can exhibit an effect of blocking mirror reflection of a metal electrode of an organic EL element for all wavelengths of visible light. This makes it possible to prevent reflected glare during observation, and improve color expression of black.

Preferably, the elongated circularly polarizing plate has a UV absorbing function. It is preferable that a viewing-side protective film has a UV absorbing function, from the viewpoint of being able to exhibit a protective effect against UV, with respect to both a polarizer and an organic EL element. Further, a luminescent body-side retardation film may also have a UV absorbing function. In this case, when the retardation film is used in the aftermentioned organic EL display, it becomes possible to more effectively suppress degradation of an organic EL element.

The elongated circularly polarizing plate according to this embodiment employs the retardation film adjusted to allow an angle of the slow axis (i.e., orientation angle θ) to become "substantially 45°" with respect to a longitudinal direction thereof, so that it becomes possible to perform formation of an adhesive layer and lamination between a polarizing film and the retardation film plate through a single continuous production line. Specifically, after completion of a step of producing a polarizing film through stretching, during or after a subsequent drying step, a step of laminating the retardation film to the polarizing film may be incorporated, wherein each of the polarizing film and the retardation film can be continuously supplied, and a resulting laminate can be wound up in a roll form to thereby allow this step to be linked with a next step through a single continuous production line. In the step of laminating the retardation film to the polarizing film, a protective film provided in a roll form may be simultaneously supplied and continuously laminated thereto. From the standpoint of performance and production efficiency, it is preferable to simultaneously laminate the retardation film and the protective film to the polarizing film. That is, after completion of the step of producing a polarizing film through stretching, during or after the subsequent drying step, the retardation film and the protective film can be laminated, respectively, to opposite surfaces of the polarizing film to obtain a circularly polarizing plate, and the circularly polarizing plate can be formed into a roll.

In the elongated circularly polarizing plate according to this embodiment, it is preferable that a polarizer is sandwiched between the retardation film and a protective film, and a hardened layer is laminated on a viewing side of the protective film.

<Organic EL Display>

An organic EL display (organic EL image display device) according to this embodiment is produced using the aforementioned elongated circularly polarizing plate. More specifically, the organic EL display according to this embodiment comprises the elongated circularly polarizing plate using the aforementioned retardation film, and an organic EL element. Therefore, it becomes possible to prevent reflected glare during observation, and improve color expression of black. A screen size of the organic EL display is not particularly limited, but may be set to 20 inches or more.

FIG. 5 is a schematic explanatory of a configuration of the organic EL display according to this embodiment. The configuration of the organic EL display according to this embodiment is not limited to that illustrated in FIG. 5.

As illustrated in FIG. 5, an organic EL display A is constructed by providing an elongated circularly polarizing plate C on an organic EL element B, wherein the organic EL element B comprises a metal electrode 102, a TFT 103, an organic luminescent layer 104, a transparent electrode (such as ITO) 105, an insulation layer 106, a sealing layer 107 and a film 108 (which may be omitted) which are formed on a transparent substrate 101 made, for example of glass or polyimide, in this order, and the elongated circularly polarizing plate C has a polarizer 110 sandwiched between the aforementioned retardation film 109 and a protective film 111. Preferably, a hardened layer 112 is laminated on the protective layer 111. The hardened layer 112 has not only an effect of preventing scratching of a surface of the organic EL display but also an effect of preventing warpage in the elongated circularly polarizing plate. A reflection preventing layer 113 may be provided on the hardened layer. A thickness of the organic EL element itself is about 1 μm.

Generally, in an organic EL display, an element as a luminescent body (organic EL element) is formed by laminating a metal electrode, an organic luminescent layer and a transparent electrode onto a transparent substrate in this order. In this case, the organic luminescent layer is a laminate of various organic thin films. As such a laminate, there have been known various combinational laminates, such as: a laminate of a hole injection layer made, for example, of triphenylamine derivative, and a luminescent layer consisting of a fluorescent organic solid such as anthracene; a laminate of the luminescent layer, and an electron injection layer made, for example, of perylene derivative; and a laminate of the hole injection layer, the luminescent layer, and the electron injection layer.

The organic EL display can emit light based on a principle that, when a voltage is applied between the transparent electrode and the metal electrode, holes and electrons are injected into the organic luminescent layer and recombined to excite a fluorescent substance based on energy generated by the recombination, and then when the excited fluorescent substance returns to a ground state, it emits light. A mechanism of the recombination occurring in the intermediate stage is the same as that in a commonly-used diode. As can be expected from this fact, each of current and luminescence intensity exhibits a strong non-linearity involving rectification, with respect to an applied voltage.

In the organic EL display, in order to extract light emitted from the organic luminescent layer, it is necessary that at least one of two electrodes is transparent. Generally, it is preferable to use, as a positive electrode, a transparent electrode made of as a transparent electrically conductive material such as indium tin oxide (ITO). On the other hand, for facilitating electron injection to enhance luminous efficacy, it is important to use, as a negative electrode, a material having a relatively small work function. Generally, a metal electrode such as Mg—Ag or Al—Li is used.

The elongated circularly polarizing plate with the aforementioned retardation film can be applied to an organic EL display with a wide screen having a screen size of 20 inch or more, i.e., a diagonal length of 50.8 cm or more.

In the organic EL display configured as above, the organic luminescent layer is formed as a layer having an extremely small thickness of about 10 nm. Thus, the organic luminescent layer can fully transmit light therethrough, as with the transparent electrode. Thus, light entering from a surface of the transparent electrode is transmitted through the transparent electrode and the organic luminescent layer and reflected by the metal electrode, and the reflected light is transmitted toward the surface of the transparent electrode again. Thus, when viewed from the outside, a display screen of the organic EL display looks like a mirror surface.

In an organic EL display having an organic EL element which comprises a transparent electrode provided on the side of a front surface of an organic luminescent layer capable of becoming luminous in response to voltage application, and a metal electrode provided on the side of a back surface of the organic luminescent layer, a polarizer may be provided on the side of a front surface (on a viewing side) of the transparent electrode, and a retardation plate may be provided between the transparent electrode and the polarizer.

The retardation film and the polarizer has a function of polarizing light reflected by the metal electrode after incoming from the outside, so that, based on the polarization function, it can effectively prevent an mirror of the metal surface from being viewed from the outside. In particular, when the retardation film is composed of a λ/4 retardation film, and an angle defined between polarization directions of the polarizer and the retardation film is adjusted to λ/4, the mirror surface of the metal electrode can be completely concealed.

That is, after external light enters into the organic EL display, only a linearly polarized component thereof is transmitted through the polarizer, and generally formed into elliptically polarized light through the retardation plate. However, particularly when the retardation film is composed of a λ/4 retardation film, and an angle defined between polarization directions of the polarizer and the retardation film is λ/4, the linearly polarized light is formed into circularly polarized light.

This circularly polarized light is transmitted through the transparent substrate, the transparent electrode and the organic thin film, and reflected by the metal electrode, and the reflected circularly polarized light is transmitted through the organic thin film, the transparent electrode and the transparent substrate, and formed into linearly polarized light through the retardation film. This linearly polarized light is orthogonal to the polarization direction of the polarizer, and thereby cannot be transmitted through the polarizer. Therefore, it becomes possible to completely conceal the mirror surface of the metal electrode.

Technical features of the aforementioned retardation film, elongated circularly polarizing plate and organic EL display will be outlined below.

According to a first aspect of the present invention, there is provided a retardation film which has a slow axis with an angle of 10 to 80° with respect to a longitudinal direction thereof, wherein the retardation film contains cellulose acylate having a degree of acyl substitution of 2.0 to 2.7, and wherein: $Ro_{550}$ is 115 to 160 nm; a wavelength dispersion property $\Delta Ro$ defined by the following formula (1) is 3 to 30 nm, $$\Delta Ro = Ro_{550} - Ro_{450} \tag{1};$$

all of a wavelength dispersion property $\Delta Rc$ originating from the cellulose acylate and defined by the following formula (2), a wavelength dispersion property $\Delta Ra$ originating from the component other than the cellulose acylate and defined by the following formula (3), an in-plane retardation Rc at a wavelength of 550 nm, and an in-plane retardation Ra at a wavelength of 550 nm, are equal to or greater than 0, $$\Delta Rc = Rc_{550} - Rc_{450} \tag{2}$$

$$\Delta Ra = Ra_{550} - Ra_{450} \tag{3}; \text{ and}$$

a retardation share ratio of $Ra_{550}$ to $Ro_{550}$ ($Ra_{550}/Ro_{550} \times 100$) is 10 to 80, and a wavelength-dispersion share ratio of $\Delta Ra$ to $\Delta Ro$ ($\Delta Ra/\Delta Ro \times 100$) is 0 to 80, wherein $Ro_X$, $Rc_X$ and $Ra_X$ represent, respectively, an in-plane retardation, an in-plane retardation originating from the cellulose acylate and an in-plane retardation originating from a component other than the cellulose acylate, at a wavelength of X nm.

The retardation film of the present invention having the above feature makes it possible to allow both of the cellulose acylate and the component other than the cellulose acylate to contribute to the retardation developability and the reverse wavelength dispersion property. Therefore, it becomes possible to exhibit excellent retardation developability and reverse wavelength dispersion property, even with a relatively small film thickness, and reduce fluctuation in the reverse wavelength dispersion property.

In the above retardation film, a ratio of an acyl group having a carbon number of 3 or more to entire acyl groups contained in the cellulose acylate may be set to 0 to 80%. In this case, the cellulose acylate become more hydrophobic, thereby it is possible to suppress fluctuation in wavelength dispersibility in terms of retardation due to humidity.

In the above retardation film, the component other than the cellulose acylate may contain a compound represented by the following general formula (A). In this case, the compound can contribute to the retardation developability and the reverse wavelength dispersion property, together with the cellulose acylate, to thereby further improve hue variation and hue fluctuation along with humidity environments.

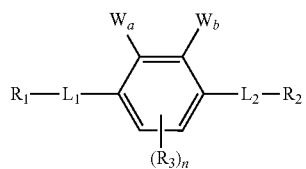

(In the above formula: $L_1$ and $L_2$ each independently represents a single bond or divalent linking group; $R_1$, $R_2$ and $R_3$ each independently represents a substituent group; n represents an integer number of 0 to 2; and Wa and Wb each represents a hydrogen atom or a substituent group, wherein (I) Wa and Wb may be bonded together to form a ring, or (II) at least one of Wa and Wb may have a ring structure, or (III) at least one of Wa and Wb may be an alkenyl group or an alkynyl group.)

Preferably, the above retardation film has a film thickness of 20 to 60 μm. The retardation film of the present invention makes it possible to allow both of the cellulose acylate and the component other than the cellulose acylate to contribute to the retardation developability and the reverse wavelength dispersion property, so that it becomes possible to exhibit excellent retardation developability and reverse wavelength dispersion property, even when the film thickness is reduced to such a small value.

According to another aspect of the present invention, there is provided an elongated circularly polarizing plate, wherein it is produced using the above retardation film, and can be applied to an organic EL display. In this case, an effect of concealing a mirror surface of a metal electrode of an organic EL element thereof can be exhibited for all wavelengths of visible light. Thus, in the obtained organic EL display, it becomes possible to prevent reflected glare during observation, and improve color expression of black.

According to yet another aspect of the present invention, there is provided an organic EL display, wherein it is produced using the above elongated circularly polarizing plate. Thus, it becomes possible to prevent reflected glare during observation, and improve color expression of black.

EXAMPLES

The present invention will be described in detail below with reference to examples. It should be understood that the present invention is not limited thereto. The unit representations "part(s)" and "%" used in the following examples denote "mass part(s)" and "mass %", respectively.

Inventive Example 1

<Production of Retardation Film>

| (Preparation of Fine Particle Dispersion Liquid) | |
|---|---|
| Fine particles (Aerosil R812 produced by Japan Aerosil) | 11 mass parts |
| Ethanol | 89 mass parts |

After stirring and mixing the above fine particles and ethanol for 50 minutes by using a dissolver, the mixture was subjected to dispersion using a Manthon-Gaulin disperser to prepare a fine particle dispersion liquid.

(Preparation of Fine Particle-Added Solution)

50 mass parts of methylene chloride was put in a dissolving tank, and 50 mass parts of the prepared fine particle dispersion liquid was slowly added to the methylene chloride while sufficiently stirring the methylene chloride. Then, the resulting mixture was subjected to dispersion by using an attriter in such a manner as to allow secondary particles to have a particle size of about 0.01 to 1.0 μm. The resulting dispersion solution was filtrated by a Finemet NF produced by Nippon Seisen Co., Ltd. to prepare a fine particle-added solution.

(Preparation of Dope)

First of all, the following methylene chloride and ethanol were put in a pressurized solution tank. The following cellulose acylate was put in the pressurized solution tank containing the organic solvent with stirring. The resulting mixture was completely solved under heating and stirring, and then filtrated using a filter paper Azumi No. 244 produced by Azumi Filterpaper Co., Ltd to prepare a main dope. Subsequently, a compound having the following structure and serving as the compound represented by the general formula (A), a sugar ester (benzyl sucrose having an average substitution degree of 7.3) and the prepared fine particle-added solution were put into a main dissolving pan at the following ratio. After hermetically sealing the pan, the mixture was solved under stirring to prepare a dope solution.

| ⟨ Composition of Dope ⟩ | |
|---|---|
| Methylene chloride | 340 mass parts |
| Ethanol | 64 mass parts |
| Cellulose acylate (acetyl group substitution degree: 2.00) | 100 mass parts |
| Optical performance regulating agent (compound represented by general formula (A): compound a) | 3 mass parts |
| Sugar ester compound (benzyl sucrose with an average substitution degree of 7.3) | 5 mass parts |
| Fine particle-added solution | 2 mass parts |

The Compound represented by the general formula (A): compound a

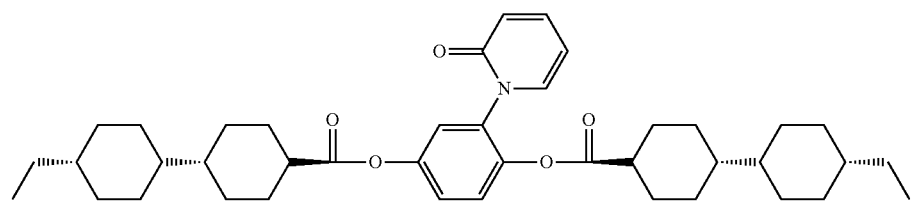

(Film Formation)

The dope prepared in the above manner was cast on a stainless belt support, and the solvent was vaporized until a resultant solvent amount in the cast film became 75 mass %. Then, the film was peeled off from the stainless steel belt support with a peeling force of 130 N/m.

The peeled film was subjected to uniaxial stretching only in a width direction (TD direction) at a stretching rate of 1% by using a stretching device, under heating at 180° C., while adjusting a conveyance tension so as to prevent contraction in a conveyance direction (MD direction). The resultant solvent at start of the stretching was 15 mass %.

Subsequently, in a drying zone, the stretched film was completely dried while being conveyed via a large number of rollers. A drying temperature and a conveyance tension were set to 130° C. and 100 N/m, respectively. In the above manner, a roll of a raw film having a dried film thickness of 33 μm was prepared.

<Stretching Operation>

The raw film was stretched by using an oblique stretching device having the configuration illustrated in FIG. 2, under the following conditions: stretching temperature=Tg+20° C.; stretching ratio=2.0 times; bending angle θi=49°; contraction ratio (MD direction)=25%: and orientation angle=45°, to produce a retardation film having a film thickness of 22 μm, in a roll form.

Inventive Examples 2 to 15 and Comparative Examples 1 to 2

Except that a type and a substitution degree of an acyl group in the cellulose acylate, a type and an amount of addition of the compound, the stretching temperature, the stretching ratio and the film thickness are changed to the conditions described in Table 1 and Table 2, retardation films were produced in the same manner as that for the Inventive Example 1. In Inventive Examples 2 to 15 and Comparative Examples 1 to 2, the following compounds b to e were used in addition to the compound a.

The Compound represented by the general formula (A): compound b

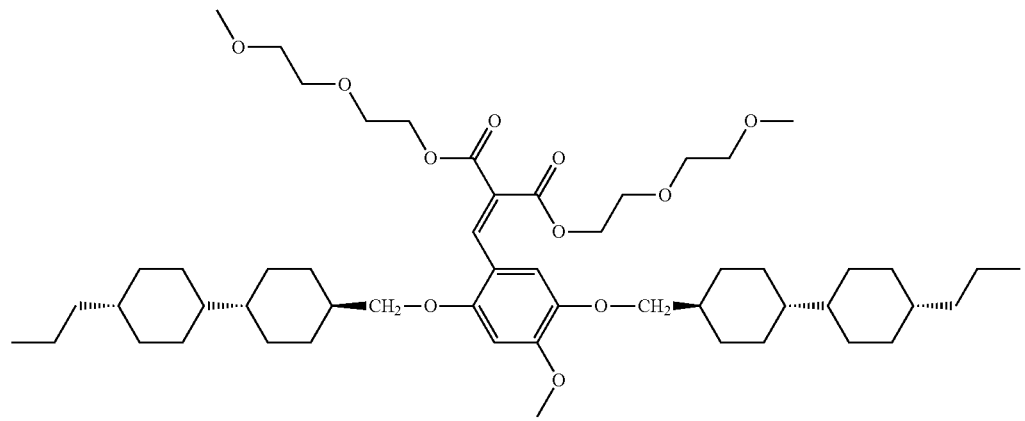

The Compound represented by the general formula (A): compound c

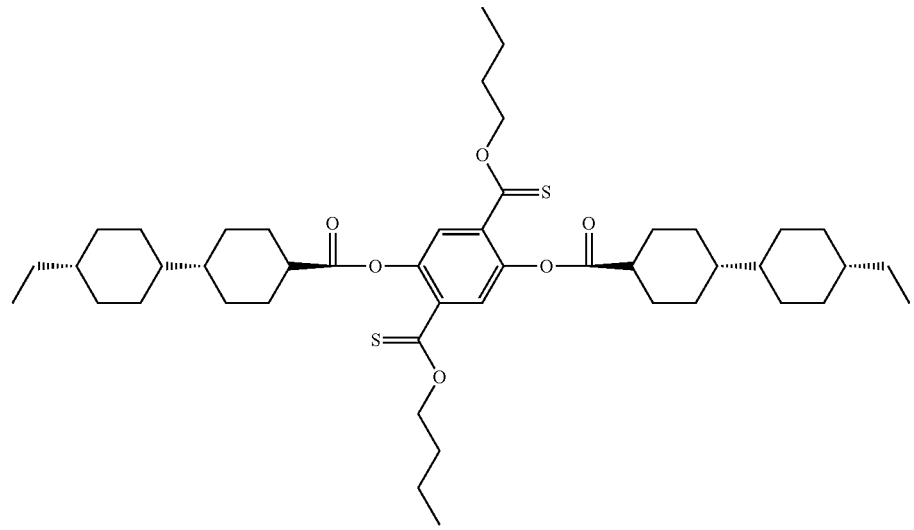

The Compound represented by the general formula (A): compound d

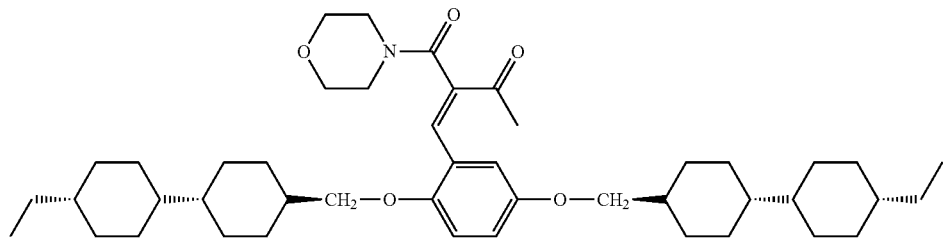

The Compound represented by the general formula (A): compound e

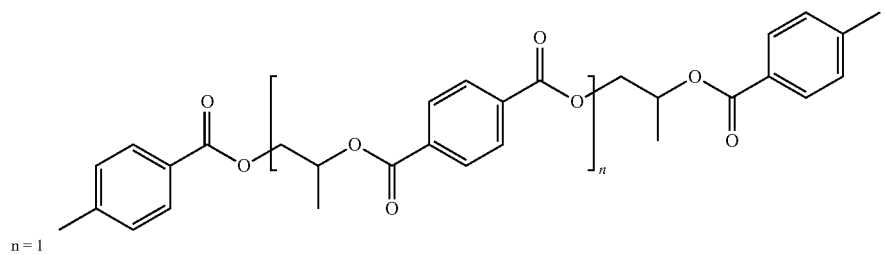

n = 1

Comparative Example 3

A retardation film was produced in the same manner as that for Inventive Example 21 described in the JP 2007-52079A.

Comparative Example 4

A retardation film 17 was produced in the same manner as that for Inventive Example 22 described in the JP 2007-52079A.

Comparative Example 5

Except that the film thickness was changed from 52 μm to 67 μm to allow $Ro_{550}$ to become 140 nm, a retardation film was produced in the same manner as that for 121 described in Inventive Example 2 in the JP 2010-254949A.

Comparative Example 6

A retardation film was produced in the same manner as that for 124 described in the Inventive Example 2 in the JP 2010-254949A.

Comparative Example 7

A retardation film was produced in the same manner as that for Inventive Example 1 described in the JP 2012-37899A.

A retardation film was produced in the same manner as that for Inventive Example 3 described in the JP 2012-37899A.

<Measurement of Film Property Values>

For each of the retardation films produced in the Inventive Examples 1 to 15 and the Comparative Examples 1 to 8, in-plane retardations $Ro_{450}$ and $Ro_{550}$ at respective wavelengths of 450 nm and 550 nm were measured by using Axoscan produced by Axometrics Inc., in a 23° C. and 55% RH environment to calculate ΔRo and $Ro_{450}/Ro_{550}$. The orientation angle was also measured by using Axoscan produced by Axometrics Inc.

Further, for each of the retardation films, except that a solid component other than the optical performance regulating agent (compound represented by the general formula (A)), the plasticizer and the matte agent is limited to cellulose acylate, the retardation film was produced under the same conditions, and in-plane retardations $Rc_{450}$ and $Rc_{550}$ at respective wavelengths of 450 nm and 550 nm were measured to calculate $Ra_{450}$, $Ra_{550}$, ΔRc and ΔRa. The film thickness was measured by commercially available micrometer. Film property values obtained in the above manner are presented in Table 1 and Table 2.

<Measurement of Humidity Environment-Caused Film Retardation Fluctuation>

For each of the retardation films produced in the Inventive Examples 1 to 15 and the Comparative Examples 1 to 8, the in-plane retardation $Ro_{550}$ at a wavelength of 550 nm was measured by using Axoscan produced by Axometrics Inc., in a 23° C. and 20% RH environment and a 23° C. and 80% RH environment. Assuming that a value measured in the 23° C. and 20% RH environment is defined as Ro 20%$_{550}$, and a value measured in the 23° C. and 80% RH environment is defined as Ro 80%$_{550}$, a humidity-caused retardation fluctuation value (=Ro 20%$_{550}$–Ro 80%$_{550}$) was calculated. A result of the calculation is presented in Table 1 and Table 2.

<Measurement of Stress-Caused Film Retardation Variation>

For each of the retardation films produced in the Inventive Examples 1 to 15 and the Comparative Examples 1 to 8, the in-plane retardation $Ro_{550}$ at a wavelength of 550 nm was measured by using Axoscan produced by Axometrics Inc., while applying a tension of 50 N/m to the retardation film. Assuming that a measured value is defined as $RoT_{550}$, a stress-caused retardation variation value (=$RoT_{550}$–$Ro_{550}$) was calculated. A result of the calculation is presented in Table 1 and Table 2.

<Production of Elongated Circularly Polarizing Plate>

A 120 μm-thick polyvinyl alcohol film was subjected to uniaxial stretching (temperature: 110° C., stretching ratio: 5 times). The stretched film was immersed in a solution consisting of 0.075 g of iodine, 5 g of potassium iodide and 100 g of water, for 60 seconds, and then immersed in a 68° C. solution consisting of 6 g of potassium iodide, 7.5 g of boric acid and 100 g of water. The resulting film was washed with water and dried to obtain a polarizer.

Subsequently, according to the following steps 1 to 5, the polarizer, the retardation films produced in the Inventive Examples 1 to 15 and the Comparative Examples 1 to 2 and an aftermentioned protective film were laminated, in a roll-to-roll manner, to produce an elongated circularly polarizing plate, so that the longitudinal directions of the polarizer, the retardation films and the protective film are consistent each other. The protective film was laminated on the back side surface of the polarizer.

Step 1: The retardation film was immersed in a 60° C. and 2 mol/L sodium hydroxide solution for 90 seconds, and then, after being washed with water, dried. Then, a surface of the dried film to be laminated to the polarizer was saponified.

Step 2: The polarizer was immersed in a polyvinyl alcohol adhesive bath having a solid content of 2 mass % for 1 to 2 seconds.

Step 3: The polarizer was lightly patted to remove an excess adhesive adhering thereto in the Step 2, and placed and positioned on the retardation film treated in the Step 1. During the positioning, a tension of 50 N/m was applied to the retardation film and the polarizer to prevent the occurrence of sagging.

Step 4: The retardation film, the polarizer and the protective film superimposed on each other in the Step 3 were laminated at a pressure of 20 to 30 N/cm$^2$, and at a conveyance speed of about 2 m/min.

Step 5: A sample of a laminate of the polarizer, the retardation film and the protective film, produced in the Step 4, was dried for 2 minutes in a drying machine of 80° C.

As regards each of the retardation films produced in the Comparative Examples 3 to 8, the orientation angle with respect to the conveyance direction is not set to approximately 45°, and therefore it is impossible to perform lamination in the roll-to-roll manner. Thus, except that, the retardation film was cut at an angle of 45° with respect to a longitudinal direction thereof and in conformity to a size of a panel of an image display device, a circularly polarizing plate was produced in the same manner as described above.

<Production of Protective Film>

(Preparation of Ester Compound)

251 g of 1,2-propylene glycol, 278 g of phthalic anhydride, 91 g of adipic acid, 610 g of benzoic acid and 0.191 g of tetraisopropyl titanate serving as esterification catalyst were put in a 2 L four neck flask equipped with a thermometer, a stirrer and a reflex condenser tube, and the mixture was gradually heated up to 230° C. in a nitrogen stream under stirring. The mixture was subjected to a dehydration-condensation reaction for 15 hours. After completion of the reaction, un-reacted 1,2-propylene glycol was removed by vacuum distillation at 200° C. to obtain an ester compound. An acid value and a number-average molecular weight thereof were 0.10 mgKOH/g and 450, respectively.

(Preparation of Dope)

| | |
|---|---|
| Cellulose acetate (acetyl group substitution degree: 2.88, weight-average molecular weight: about 180,000) | 90 mass parts |
| Ester compound | 10 mass parts |
| Tinuvin 928 (produced by BASF Japan Ltd.) | 2.5 mass parts |
| Fine particle-added solution | 4 mass parts |
| Methylene chloride | 432 mass parts |
| Ethanol | 38 mass parts |

The above were put in a closed vessel, and fully solved under heating and steering. The resulting solution was filtrated using a filter paper Azumi No. 24 produced by Azumi Filterpaper Co., Ltd to prepare a dope solution.

(Film Formation)

Then, using a belt casting apparatus, the dope solution was uniformly cast on a stainless band support. The solvent was vaporized on the stainless band support until a resultant solvent amount became 100%, and then a resulting film was peeled off from the stainless steel band support. The web of cellulose ester film was placed at 35° C. to vaporize the solvent, and slit into 1.65 m width. Then, the web was stretched using a stretching device while heating at 160° C., at a stretching ratio of 30% in the TD direction (film width direction) and at a stretching ratio of 1% in the MD direction. The resultant solvent amount at start of the stretching was 20%. Subsequently, the stretched web was dried for 15 minutes while being conveyed via a large number of rollers within a drying device at 120° C. Then, the dried web was slit into 1.49 m width, and subjected to knurling to form a knurl having a width of 15 mm and a height of 10 μm in each of opposite edge portions thereof. Then, the resulting web was wound around a roll core to obtain a protective film in a roll form. A residual solvent amount, a film thickness and a winding length of the protective film were, respectively, 0.2%, 40 μm and 3900 m. As a result of measurement using KOBRA-21ADH produced by Oji Scientific Instruments Co., Ltd., an orientation angle θ of the protective film was within 90°±1° with respect to a longitudinal direction of the film.

<Production of Organic EL Element>

An organic EL element having the configuration described in FIG. 8 of JP 2010-20925A was produced by using a 3 mm-thick alkali-free glass for a 50 inch (127 cm) screen, according to a method described in the embodiment in the JP 2010-20925A.

<Production of Organic EL Display>

After an adhesive was applied onto a surface of the retardation film of each of the circularly polarizing plates produced in the above manner, each of the circularly polarizing plates was laminated to a viewing side of the organic EL element to produce a plurality of types of organic EL displays.

<Evaluation of Organic EL Displays>

The organic EL displays produced in the above manner were evaluated as follows.

(Evaluation on Visibility: Black Display)

A black image was displayed on each of the organic EL displays in a 23° C. and 55% RH environment and under a condition that an illuminance at a position higher than a frontmost surface of the organic EL display by 5 cm was 1000 Lx. Then, with regard to the displayed black image, black image visibility when viewed from a position just forward of the organic EL display (0° with respect to a normal line to the surface) and black image visibility when viewed from an oblique angle of 40° with respect to the normal line were evaluated by ten third-party evaluators, according to the following criteria. In the present invention, when the display was evaluated as A or better, it was determined to be practicable. An obtained result is presented in Table 1 and Table 2.

(Evaluation Criteria)

⊙: Nine evaluators determined that the displayed image was black.

○: Seven or eight evaluators determined that the displayed image was black.

Δ: Five or six evaluators determined that the displayed image was black.

×: The number of evaluators determined that the displayed image was black is 4 or less.

| | | | Inventive Example | | | | | | | | | | | | | | |
|---|---|---|---|---|---|---|---|---|---|---|---|---|---|---|---|---|---|
| | | | 1 | 14 | 15 | 2 | 3 | 4 | 5 | 6 | 7 | 8 | 9 | 10 | 11 | 12 | 13 |
| Resin | Type of Resin | | DAC | DAC | DAC | Cap | Cap | Cap | Cap | Cap | Cap | Cap | Cap | CAB | CABz | Cap | Cap |
| | Substitution degree | Total substitution degree | 2.00 | 2.00 | 2.30 | 2.44 | 2.44 | 2.44 | 2.44 | 2.42 | 2.44 | 2.53 | 2.45 | 2.45 | 2.45 | 2.66 | 2.70 |
| | | Acetyl group | 2.00 | 2.00 | 2.30 | 1.53 | 1.53 | 1.53 | 1.53 | 2.42 | 1.53 | 1.55 | 0.55 | 1.55 | 1.55 | 1.95 | 0.10 |
| | | Propyl group | — | — | — | 0.91 | 0.91 | 0.91 | 0.91 | — | 0.91 | 0.98 | 1.90 | — | — | 0.71 | 2.60 |
| | | Butyl group | — | — | — | — | — | — | — | — | — | — | — | 0.90 | — | — | — |
| | | Benzoyl group | — | — | — | — | — | — | — | — | — | — | — | — | 0.90 | — | — |
| | Ratio of substituent group with carbon number of 3 or more | | 0 | 0 | 0 | 37 | 37 | 37 | 37 | 0 | 37 | 39 | 78 | 37 | 37 | 27 | 96 |
| Optical performance regulating agent | Type | | a | a | b | b | b | b | c | b | d | b | b | b | b | a | a |
| | Amount of addition (weight parts) | | 3 | 6 | 6 | 3 | 3 | 3 | 4 | 2 | 6 | 4 | 4 | 4 | 4 | 5 | 5 |
| Stretching Conditions | Temperature (° C.) | | Tg + 25 | Tg + 25 | Tg + 20 | Tg + 20 | Tg + 20 | Tg + 10 | Tg + 20 | Tg + 20 | Tg + 20 | Tg + 20 | Tg + 20 | Tg + 20 | Tg + 20 | Tg + 20 | Tg + 20 |
| | Ratio (times) | | 2.0 | 1.6 | 2.0 | 2.0 | 2.5 | 2.0 | 2.0 | 2.0 | 2.0 | 2.0 | 2.0 | 2.0 | 2.0 | 2.0 | 2.0 |
| Orientation angle (°) | | | 45 | 45 | 45 | 45 | 45 | 45 | 45 | 45 | 45 | 45 | 45 | 45 | 45 | 45 | 45 |
| Retardation | Retardation film | Ro450 | 111 | 137 | 123 | 23 | 123 | 123 | 115 | 124 | 130 | 110 | 116 | 116 | 116 | 121 | 131 |
| | | Ro550 | 115 | 140 | 140 | 140 | 140 | 140 | 140 | 140 | 160 | 140 | 140 | 140 | 140 | 140 | 140 |
| | | ΔRo | 4 | 3 | 17 | 17 | 17 | 17 | 25 | 16 | 30 | 30 | 24 | 24 | 24 | 19 | 9 |
| | | Ro450/Ro550 | 0.97 | 0.98 | 0.88 | 0.88 | 0.88 | 0.88 | 0.82 | 0.89 | 0.81 | 0.79 | 0.83 | 0.83 | 0.83 | 0.86 | 0.94 |
| | Cellulose acylate | Rc450 | 81 | 17 | 101 | 102 | 102 | 102 | 50 | 108 | 102 | 51 | 74 | 74 | 74 | 32 | 19 |
| | | Rc550 | 85 | 50 | 108 | 110 | 110 | 110 | 55 | 117 | 110 | 57 | 80 | 80 | 80 | 41 | 28 |
| | | ΔRc | 4 | 3 | 7 | 8 | 8 | 8 | 5 | 9 | 8 | 6 | 6 | 6 | 6 | 9 | 9 |
| | Other than cellulose acylate | Ra450 | 30 | 90 | 22 | 21 | 21 | 21 | 65 | 16 | 28 | 59 | 42 | 42 | 42 | 89 | 112 |
| | | Ra550 | 30 | 90 | 32 | 30 | 30 | 30 | 85 | 23 | 50 | 83 | 60 | 60 | 60 | 99 | 112 |
| | | ΔRa | 0 | 0 | 10 | 9 | 9 | 9 | 20 | 7 | 22 | 24 | 18 | 18 | 18 | 10 | 0 |
| | | Share of Ra550 | 26 | 64 | 23 | 21 | 21 | 21 | 61 | 16 | 31 | 59 | 43 | 43 | 43 | 71 | 80 |
| | | Share of ΔRa | 0 | 0 | 59 | 53 | 52 | 52 | 80 | 43 | 73 | 80 | 75 | 75 | 75 | 53 | 0 |
| Thickness | | | 22 | 20 | 28 | 40 | 30 | 20 | 20 | 40 | 40 | 30 | 30 | 30 | 30 | 40 | 40 |
| Effects | Black display | | △ | △ | ⊚ | ○ | ○ | ○ | ⊚ | ○ | △ | ⊚ | ⊚ | ⊚ | ⊚ | ○ | △ |
| | Applicability to production of elongated circularly polarizing plate | | ○ | ○ | ○ | ○ | ○ | ○ | ○ | ○ | ○ | ○ | ○ | ○ | ○ | ○ | ○ |
| | Humidity-caused wavelength dispersion fluctuaiton (Δ nm) | | 4 | 2 | 1 | 2 | 2 | 2 | 2 | 4 | 2 | 2 | 2 | 1 | 1 | 2 | 1 |
| | Stress-caused wavelength dispersion variation (Δ nm) | | 1 | 2 | 1 | 1 | 1 | 1 | 1 | 1 | 2 | 2 | 2 | 2 | 2 | 1 | 3 |

Cap: cellulose acetate propionate,
CAB: cellulose acetate butyrate,
CABz: cellulose acetate benzoate,
TAC: cellulose triacetate,
PC: copolymerized polycarbonat

TABLE 2

| | | | Comparative Example | | | | | | | |
|---|---|---|---|---|---|---|---|---|---|---|
| | | | 1 | 2 | 3 | 4 | 5 | 6 | 7 | 8 |
| Resin | Type of resin | | Cap | Cap | Cap | Cap | TAC | TAC | PC | PC |
| | Substitution degree | Total substitution degree | 2.44 | 2.00 | 2.70 | 2.70 | 2.80 | 2.80 | — | — |
| | | Acetyl group | 1.53 | 1.00 | 0.10 | 0.10 | 2.80 | 2.80 | — | — |
| | | Propyl group | 0.91 | 1.00 | 2.60 | 2.60 | — | — | — | — |
| | | Butyl group | — | — | — | — | — | — | — | — |
| | | Benzoyl group | — | — | — | — | — | — | — | — |
| | Ratio of substituent group with carbon number of 3 or more | | 37 | 50 | 96 | 96 | 0 | 0 | — | — |
| Optical performance regulating agent | Type | | d | e | — | — | — | — | — | — |
| | Amount of addition (weight parts) | | 7 | 4 | — | — | — | — | — | — |
| Stretching Conditions | Temperature (° C.) | | Tg + 20 | Tg + 20 | — | — | — | — | — | — |
| | Ratio (times) | | 1.8 | 2.0 | — | — | — | — | — | — |
| Orientation angle (°) | | | 45 | 45 | 0 | 0 | 90 | 90 | 0 | 0 |
| Retardation | Retardation film | Ro450 | 114 | 138 | 152 | 135 | 126 | 91 | 119 | 116 |
| | | Ro550 | 150 | 136 | 169 | 152 | 140 | 109 | 138 | 138 |
| | | ΔRo | 36 | −2 | 17 | 17 | 14 | 18 | 19 | 22 |
| | | Ro450/Ro550 | 0.76 | 1.01 | 0.90 | 0.89 | 0.90 | 0.83 | 0.86 | 0.84 |
| | Cellulose acytate | Rc450 | 76 | 121 | 92 | 91 | −22 | −17 | 0 | 0 |
| | | Rc550 | 83 | 125 | 111 | 110 | −5 | −4 | 0 | 0 |
| | | ΔRc | 7 | 4 | 19 | 19 | 17 | 13 | 0 | 0 |
| | Other than cellulose acylate | Ra450 | 38 | 17 | 60 | 43 | 148 | 108 | 119 | 116 |
| | | Ra550 | 67 | 11 | 58 | 42 | 145 | 113 | 138 | 138 |
| | | ΔRa | 29 | −6 | −2 | −1 | −3 | 5 | 19 | 22 |
| | | Share of Ra550 | 45 | 8 | 34 | 28 | 104 | 104 | 100 | 100 |
| | | Share of ΔRa | 81 | — | −12 | −6 | −21 | −28 | 98 | 100 |
| Thickness | | | 30 | 20 | 99 | 98 | 67 | 52 | 47 | 40 |
| Effects | Black display | | x | x | x | ○ | Δ | ○ | ○ | ○ |
| | Applicability to production of elongated circularly polarizing plate | | ○ | ○ | x | x | x | x | x | x |
| | Humidity-caused wavelength dispersion fluctuation (Δ nm) | | 3 | −4 | 6 | 5 | 6 | 4 | 0 | 0 |
| | Stress-caused wavelength dispersion variation (Δ nm) | | 5 | −5 | 1 | 1 | 5 | 5 | 7 | 7 |

Cap: cellulose acetate propionate,
CAB: cellulose acetate butyrate,
CABz: cellulose acetate benzoate,
TAC: cellulose triacetate,
PC: copolymerized polycarbonate Tables 1 to 2 show that the retardation film of the present invention is improved in humidity environment-caused fluctuation and stress-caused variation of the wavelength dispersion property, and suited to production of an elongated circularly polarizing plate, and the organic EL display of the present invention comprising the elongated circularly polarizing plate is excellent in black image display performance.

INDUSTRIAL APPLICABILITY

The present invention can be widely utilized in the technical field of retardation films or the like usable in image display devices such as organic EL displays.

The invention claimed is:

1. A retardation film consisting of a single layer having a slow axis with an angle of 10 to 80° with respect to a longitudinal direction thereof, wherein the retardation film contains cellulose acylate having a degree of acyl substitution of 2.0 to 2.7, and wherein:
   $Ro_{550}$ is 115 to 160 nm;
   a wavelength dispersion property ΔRo defined by the following formula (1) is 3 to 30 nm, $$\Delta Ro = Ro_{550} - Ro_{450} \quad (1);$$

all of a wavelength dispersion property ΔRc originating from the cellulose acylate and defined by the following formula (2), a wavelength dispersion property ΔRa originating from the component other than the cellulose acylate and defined by the following formula (3), an in plane retardation Rc at a wavelength of 550 nm, and an in-plane retardation Ra at a wavelength of 550 nm, are equal to or greater than 0, $$\Delta Rc = Ro_{550} - Rc_{450} \quad (2)$$

$$\Delta Ra = Ra_{550} - Ra_{450} \quad (3); \text{ and}$$

a retardation share ratio of $Ra_{550}$ to $Ra_{550}$ ($Ra_{550}/Ro_{550} \times 100$) is 10 to 80, and a wavelength-dispersion share ratio of ΔRa to ΔRo (ΔRa/ΔRo×100) is 0 to 80;
   wherein $Ro_X$, $Rc_X$ and $Ra_X$ represent, respectively, an in-plane retardation, an in-plane retardation originating from the cellulose acylate and an in-plane retardation originating from a component of the retardation film other than the cellulose acylate, at a wavelength of X nm.

2. The retardation film as defined in claim 1, wherein a ratio of an acyl group having a carbon. number of 3 or more to entire acyl groups contained in the cellulose acylate is 0 to 80%.

3. The retardation. film as defined in claim 1, wherein the component other than the cellulose acylate contains a compound represented by the following general formula (A),

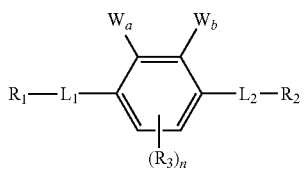

(A)

wherein L₁ and L₂ each independently represents a single bond or divalent linking group;
R₁, R₂ and R₃ each independently represents a substituent group;
n represents an integer number of 0 to 2; and
Wa and Wb each represents a hydrogen atom or a substituent group, wherein Wa and Wb may be bonded together to form a ring, or at least one of Wa and Wb may have a ring structure, or at least one of Wa and Wb may be an alkenyl group or an alkynyl group.

4. The retardation film as defined in claim 1, which has a film thickness of 20 to 60 μm.

5. An elongated circularly polarizing plate produced using the retardation film as defined in claim 1, and a polarizer.

6. An organic EL display produced using the elongated circularly polarizing plate as defined in claim 5.

7. A retardation film having a slow axis with an angle of 10 to 80° with respect to a longitudinal direction thereof, wherein the retardation film contains cellulose acylate having a degree of acyl substitution of 2.0 to 2.7, and wherein:
Ro$_{550}$ is 115 to 160 nm;
a wavelength dispersion property ΔRo defined by the following formula (1) is 3 to 30 nm, $$\Delta Ro = Ro_{550} - Ro_{450} \quad (1);$$

all of a wavelength dispersion property ΔRc originating from the cellulose acylate and defined by the following formula (2), a wavelength dispersion property ΔRa originating from the component other than the cellulose acylate and defined by the following formula (3), an in-plane retardation Rc at a wavelength of 550 nm, and an in-plane retardation Ra at a wavelength of 550 nm, are equal to or greater than 0, $$\Delta Rc = Rc_{550} - Rc_{450} \quad (2)$$

$$\Delta Ra = Ra_{550} - Ra_{450} \quad (3); \text{ and}$$

a retardation share ratio of Ra$_{550}$ to Ro$_{550}$ (Ra$_{550}$/Ro$_{550}$×100) is 10 to 80, and a wavelength-dispersion share ratio of ΔRa to ΔRo (ΔRa/ΔRo×100) is 0 to 80;
wherein Ro$_X$, Rc$_X$ and Ra$_X$ represent, respectively, an in-plane retardation, an in-plane retardation originating from the cellulose acylate and an in-plane retardation originating from a component of the retardation film other than the cellulose acylate, at a wavelength of X nm, and
wherein the component other than the cellulose acylate contains a compound represented by the following general formula (A),

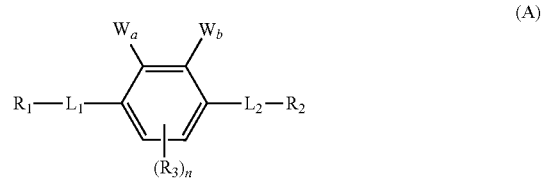

(A)

wherein L₁ and L₂ each independently represents a single bond or divalent linking group;
R₁, R₂ and R₃ each independently represents a substituent group;
n represents an integer number of 0 to 2; and
Wa and Wb each represents a hydrogen atom or a substituent group, wherein Wa and Wb may be bonded together to form a ring, or at least one of Wa and Wb may have a ring structure, or at least one of Wa and Wb may be an alkenyl group or an alkynyl group.

8. The retardation film as defined in claim 7, wherein a ratio of an acyl group having a carbon number of 3 or more to entire acyl groups contained in the cellulose acylate is 0 to 80%.

9. The retardation film as defined in claim 7, which has a film thickness of 20 to 60 μm.

10. An elongated circularly polarizing plate produced using the retardation film as defined in claim 7, and a polarizer.

11. An organic EL dlsplay produced using the elongated circularly polarizing plate as defined in claim 10.

* * * * *